US011442881B2

(12) United States Patent
Ware et al.

(10) Patent No.: US 11,442,881 B2
(45) Date of Patent: Sep. 13, 2022

(54) MAC PROCESSING PIPELINES, CIRCUITRY TO CONTROL AND CONFIGURE SAME, AND METHODS OF OPERATING SAME

(71) Applicant: Flex Logix Technologies, Inc., Mountain View, CA (US)

(72) Inventors: Frederick A. Ware, Los Altos Hills, CA (US); Cheng C. Wang, San Jose, CA (US)

(73) Assignee: Flex Logix Technologies, Inc., Mountain View, CA (US)

( * ) Notice: Subject to any disclaimer, the term of this patent is extended or adjusted under 35 U.S.C. 154(b) by 0 days.

(21) Appl. No.: 17/212,411

(22) Filed: Mar. 25, 2021

(65) Prior Publication Data

US 2021/0326286 A1   Oct. 21, 2021

Related U.S. Application Data

(60) Provisional application No. 63/012,111, filed on Apr. 18, 2020.

(51) Int. Cl.
*G06F 13/40* (2006.01)
*G06F 7/544* (2006.01)

(52) U.S. Cl.
CPC ........ *G06F 13/4027* (2013.01); *G06F 7/5443* (2013.01)

(58) Field of Classification Search
CPC .................. G06F 7/5443; G06F 13/4027
See application file for complete search history.

(56) References Cited

U.S. PATENT DOCUMENTS

| 4,958,312 A | 9/1990 | Ang et al. |
| 6,115,729 A | 9/2000 | Matheny et al. |

(Continued)

FOREIGN PATENT DOCUMENTS

| EP | 0405726 | 3/1999 |
| EP | 2280341 | 6/2013 |
| WO | WO 2018/126073 | 7/2018 |

OTHER PUBLICATIONS

Agrawal et al., "A 7nm 4-Core AI Chip with 25.6TFLOPS Hybrid FP8 Training, 102.4TOPS INT4 Inference and Workload-Aware Throttling", ISSCC, pp. 144-145, 2021.

(Continued)

*Primary Examiner* — Nimesh G Patel
(74) *Attorney, Agent, or Firm* — Neil A. Steinberg

(57) ABSTRACT

An integrated circuit including control/configure circuitry which interfaces with a plurality of interconnected (e.g., serially) multiplier-accumulator circuits and/or one or more rows of interconnected (e.g., serially) multiplier-accumulator circuits. The control/configure circuitry may include a plurality of control/configure circuits, each control/configure circuit interfaces with at least one multi-bit MAC execution pipeline, wherein each pipeline includes a plurality of interconnected (e.g., serially) multiplier-accumulator circuits. Each control/configure circuit may include one or more (or all) of (i) a configurable input data signal path to provide data to the MACs of the pipeline during the execution sequence(s), (ii) a configurable accumulation data path for the ongoing/accumulating MAC accumulation totals generated by the MACs during an execution sequence, and (iii) a configurable output data path for the output data generated by execution sequence (i.e., input data that was processed via the multiplier-accumulator circuits or MAC processors of the execution pipeline).

23 Claims, 25 Drawing Sheets

(56) References Cited

U.S. PATENT DOCUMENTS

| | | | |
|---|---|---|---|
| 6,148,101 | A | 11/2000 | Tanaka et al. |
| 6,298,366 | B1 | 10/2001 | Gatherer et al. |
| 7,107,305 | B2 | 9/2006 | Deng et al. |
| 7,299,342 | B2 | 11/2007 | Nilsson et al. |
| 7,346,644 | B1 | 3/2008 | Langhammer et al. |
| 7,698,358 | B1 | 4/2010 | Langhammer et al. |
| 8,051,124 | B2 | 11/2011 | Salama et al. |
| 8,645,450 | B1 | 2/2014 | Choe et al. |
| 8,751,551 | B2 | 6/2014 | Streicher et al. |
| 8,788,562 | B2 | 7/2014 | Langhammer et al. |
| 9,600,278 | B1 | 3/2017 | Langhammer |
| 2003/0172101 | A1 | 9/2003 | Liao et al. |
| 2006/0271764 | A1 | 11/2006 | Nilsson |
| 2007/0239967 | A1 | 10/2007 | Dally et al. |
| 2008/0114974 | A1* | 5/2008 | Chien .................. G06T 1/20 712/228 |
| 2008/0211827 | A1 | 9/2008 | Donovan et al. |
| 2009/0094303 | A1 | 4/2009 | Katayama |
| 2009/0327541 | A1* | 12/2009 | Ramchandran ......... G06F 9/383 710/305 |
| 2010/0228806 | A1 | 9/2010 | Streicher et al. |
| 2014/0019727 | A1 | 1/2014 | Zhu et al. |
| 2016/0248428 | A1* | 8/2016 | Wang ............... H03K 19/17724 |
| 2017/0011288 | A1 | 1/2017 | Brothers et al. |
| 2017/0115958 | A1 | 4/2017 | Langhammer |
| 2017/0116693 | A1 | 4/2017 | Rae et al. |
| 2017/0214929 | A1 | 7/2017 | Susnow et al. |
| 2017/0322813 | A1 | 11/2017 | Langhammer |
| 2017/0344876 | A1 | 11/2017 | Brothers |
| 2018/0052661 | A1 | 2/2018 | Langhammer |
| 2018/0081632 | A1 | 3/2018 | Langhammer |
| 2018/0081633 | A1 | 3/2018 | Langhammer |
| 2018/0157961 | A1 | 6/2018 | Henry et al. |
| 2018/0189651 | A1 | 7/2018 | Henry et al. |
| 2018/0300105 | A1 | 10/2018 | Langhammer |
| 2018/0321909 | A1 | 11/2018 | Langhammer |
| 2018/0321910 | A1 | 11/2018 | Langhammer et al. |
| 2018/0341460 | A1 | 11/2018 | Langhammer |
| 2018/0341461 | A1 | 11/2018 | Langhammer |
| 2018/0358970 | A1* | 12/2018 | Wang ............... H03K 19/17796 |
| 2019/0007047 | A1* | 1/2019 | Natu ............... H03K 19/17744 |
| 2019/0042191 | A1 | 2/2019 | Langhammer |
| 2019/0042244 | A1 | 2/2019 | Henry et al. |
| 2019/0042544 | A1 | 2/2019 | Kashyap et al. |
| 2019/0079728 | A1 | 3/2019 | Langhammer et al. |
| 2019/0123023 | A1 | 4/2019 | Hein, III |
| 2019/0196786 | A1 | 6/2019 | Langhammer |
| 2019/0243610 | A1 | 8/2019 | Lin et al. |
| 2019/0250886 | A1 | 8/2019 | Langhammer |
| 2019/0286417 | A1 | 9/2019 | Langhammer |
| 2019/0310828 | A1 | 10/2019 | Langhammer et al. |
| 2019/0324722 | A1 | 10/2019 | Langhammer |
| 2019/0340489 | A1 | 11/2019 | Mills |
| 2020/0004506 | A1 | 1/2020 | Langhammer et al. |
| 2020/0026493 | A1 | 1/2020 | Streicher et al. |
| 2020/0076435 | A1 | 3/2020 | Wang |
| 2020/0097799 | A1 | 3/2020 | Divakar et al. |
| 2020/0174750 | A1 | 6/2020 | Langhammer |
| 2020/0326948 | A1 | 10/2020 | Langhammer |
| 2020/0387564 | A1* | 12/2020 | Simpson .................. G06F 17/16 |

OTHER PUBLICATIONS

Linley Gwennap, "IBM Demonstrates New AI Data Types", Microprocessor Report, Apr. 2021.

Choi et al., "Accurate and Efficient 2-Bit Quantized Neural Networks", Proceedings of $2^{nd}$ SysML Conf, 2019, 12 pages.

Sun et al., "Hybrid 8-bit Floating Point (HFP8) Training and Inference for Deep Neural Networks", NeurIPS 2019, 10 pages.

"nVidia A100 Tensor Core GPU Architecture", v1.0, 2020, 82 pages.

Papadantonakis et al., "Pipelining Saturated Accumulation", IEEE, vol. 58, No. 2, pp. 208-219, Feb. 2009.

International Search Report and Written Opinion of International Searching Authority re: re: PCT/US2020/061689, dated Jun. 9, 2021, 19 pages.

Priyanka Nain, "Multiplier-Accumulator (MAC) Unit", IJDACR, vol. 5, Issue 3, Oct. 2016, 4 pages.

Jebashini et al., "A Survey and Comparative Analysis of Multiply-Accumulate (MAC) Block for Digital Signal Processing Application on ASIC and FPGA", Journal of Applied Science, vol. 15, Issue 7, pp. 934-946, Jul. 2015.

Liang Yun, et al., "Evaluating Fast Algorithms for Convolutional Neural Networks on FPGAs", IEEE Transactions on Computer-Aided Design of Integrated Circuits and Systems, vol. 39, No. 4, Feb. 5, 2019, 14 pages (Note: The date identified on the article attached is Mar./Apr. 2020).

* cited by examiner

In this embodiment, each single 64-MAC execution pipeline has its own L0 SRAM memory, and each 16 x 64-MAC cluster includes a shared L1 SRAM memory. The shift-in and shift-out paths of each 64-MAC execution pipeline is coupled to the L2 SRAM memory. The L2 memory also couples to the L1/L0 memories.

A network-on-chip (NOC) couples the L2 memory to the PHY (physical interface) for the L3 memory (external DRAM component(s)). The NOC also couples to a PCIe PHY which, in turn, couples to an external host. Notably, in one embodiment, the NOC also couples to GPIO input/output PHYs, which allow multiple X1 components to be operated concurrently.

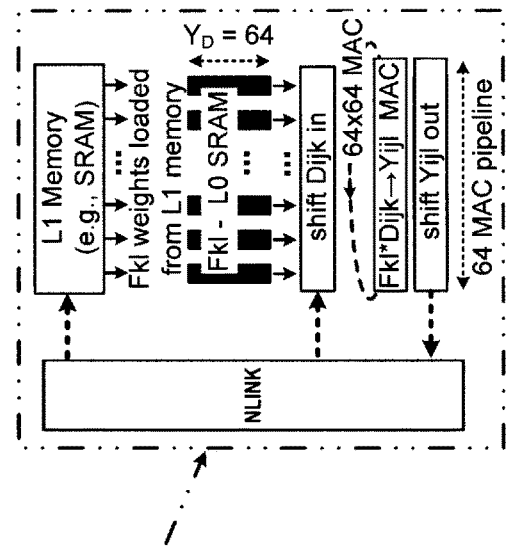

FIG. 1B

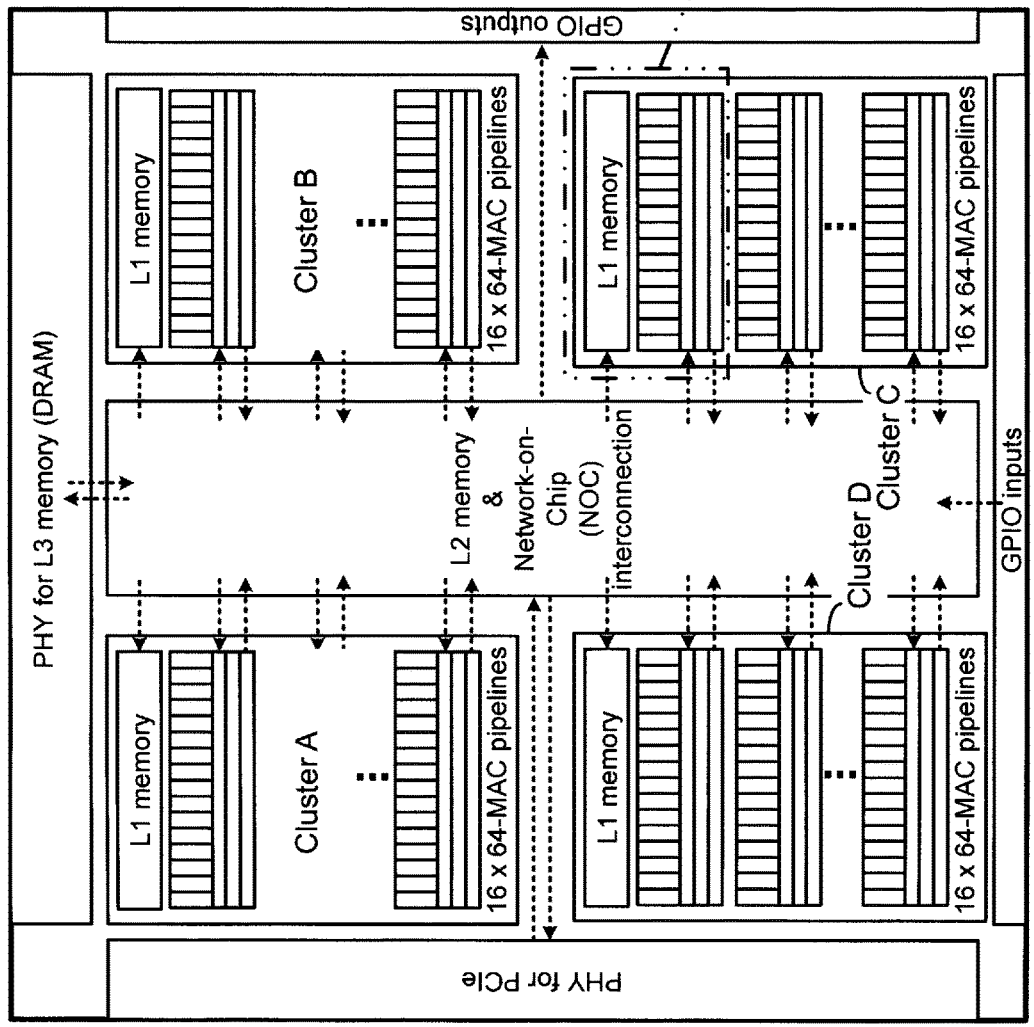

FIG. 1A (implied - execution pipeline resources at the X1 component level)

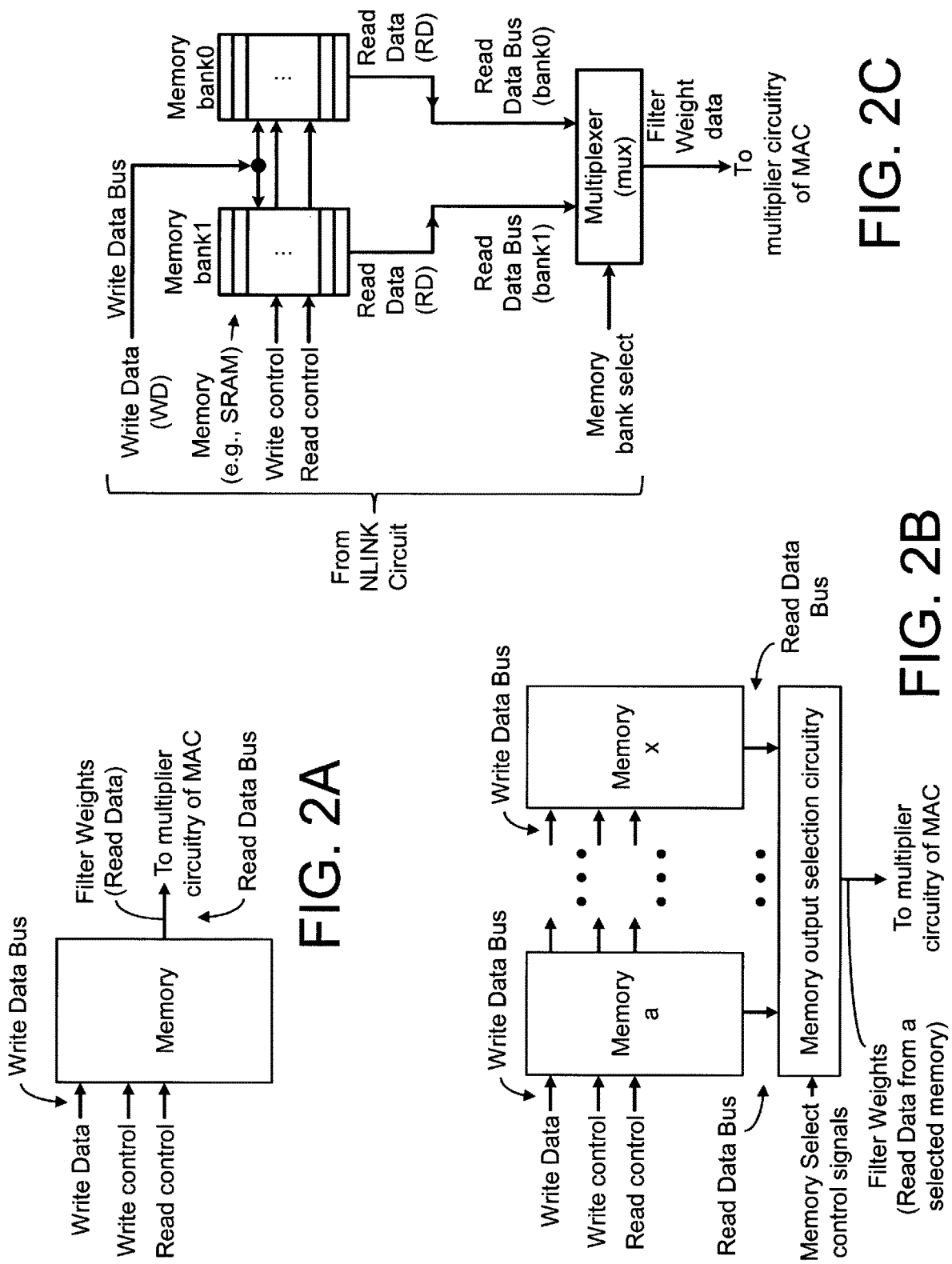

MAC PROCESSING PIPELINES, CIRCUITRY TO CONTROL AND CONFIGURE SAME, AND METHODS OF OPERATING SAME

RELATED APPLICATION

This non-provisional application claims priority to and the benefit of U.S. Provisional Application No. 63/012,111, entitled "MAC Processing Pipelines, Circuitry to Control and Configure Same, and Methods of Operating Same", filed Apr. 18, 2020. The '111 provisional application is hereby incorporated herein by reference in its entirety.

INTRODUCTION

There are many inventions described and illustrated herein. The present inventions are neither limited to any single aspect nor embodiment thereof, nor to any combinations and/or permutations of such aspects and/or embodiments. Importantly, each of the aspects of the present inventions, and/or embodiments thereof, may be employed alone or in combination with one or more of the other aspects of the present inventions and/or embodiments thereof. All combinations and permutations thereof are intended to fall within the scope of the present inventions.

In one aspect, the present inventions are directed to circuitry to configure and control multiplier-accumulator circuitry (and methods of operating and configuring such circuitry) including a plurality of multiplier-accumulator execution or processing pipelines. The circuitry of this aspect of the inventions configures (e.g., one-time or more than one-time programmable) and controls the multiplier-accumulator circuitry to implement one or more execution or processing pipelines to process data, for example, in parallel or concurrently. In one embodiment, the circuitry configures and controls a plurality of separate multiplier-accumulator circuits ("multiplier-accumulator circuit" referred to herein, at times, as "MAC" or "MAC circuit" or, in plural form, "MACs" or "MAC circuits") or rows/banks of interconnected (in series) multiplier-accumulator circuits to pipeline multiply and accumulate operations. The plurality of multiplier-accumulator circuits may also include a plurality of registers (including a plurality of shadow registers) wherein the circuitry also controls such registers to implement or facilitate the pipelining of the multiply and accumulate operations performed by the multiplier-accumulator circuits to increase throughput of the multiplier-accumulator execution or processing pipelines in connection with processing the related data (e.g., image data).

Notably, the present inventions, in one embodiment, employ one or more of the multiplier-accumulator circuits that are described and illustrated in the exemplary embodiments of FIGS. 1A-1C of U.S. patent application Ser. No. 16/545,345 and U.S. Provisional Patent Application No. 62/725,306, and the text associated therewith. Here, the multiplier-accumulator circuit described and/or illustrated in the '345 and '306 applications facilitates concatenating the multiply and accumulate operations, and reconfiguring the circuitry thereof and operations performed thereby; in this way, a plurality of multiplier-accumulator circuits may be configured and/or re-configured to process data (e.g., image data) in a manner whereby the processing and operations are performed more rapidly and/or efficiently. The '345 and '306 applications are incorporated by reference herein in their entirety.

In one embodiment, the circuitry to control and configure the multiplier-accumulator circuitry (referred to, at times, as control/configure circuitry) includes circuitry to control, configure and/or program (e.g., one-time or more than one-time programmable) the execution or processing path(s) of the multiplier-accumulator circuits comprising the pipelines (referred to herein, at times, as "MAC processing pipelines" or "MAC execution pipelines"). For example, in one embodiment, the control/configure circuitry may configure or connect a selected number of multiplier-accumulator circuits or rows/banks of multiplier-accumulator circuits to, among other things, implement a predetermined multiplier-accumulator execution or processing pipeline or architecture thereof. Here, the control/configure circuitry may configure or determine the multiplier-accumulator circuits or rows/banks of interconnected multiplier-accumulator circuits that are interconnected (in series) and employed to perform the multiply and accumulate operations and/or the pipelining architecture or configuration implemented via connection of multiplier-accumulator circuits (or rows/banks of interconnected multiplier-accumulator circuits) employed to perform the multiply and accumulate operations. Thus, in one embodiment, the control/configure circuitry configures or implements an architecture of the execution or processing pipeline by controlling or providing connection(s) between multiplier-accumulator circuits and/or rows of interconnected multiplier-accumulator circuits. Although the plurality of multiplier-accumulator circuits are described/illustrated as a "row" of multiplier-accumulator circuits, the plurality may be described as a "column" of multiplier-accumulator circuits where the layout of the plurality of multiplier-accumulator circuits were vertical; both of which are intended to fall within the scope of the present inventions;

Notably, the present inventions may employ one or more the multiplier-accumulator execution or processing, and processing techniques, that are described and illustrated in the '345 and '306 applications. As indicated above, the '345 and '306 applications are incorporated by reference herein in their entirety.

In addition thereto, in one embodiment, the control/configure circuitry may facilitate or control writing filter weights or values to the plurality of multiplier-accumulator circuits to implement the multiply operations. For example, the control/configure circuitry may connect the plurality of multiplier-accumulator circuits (or rows/banks of interconnected (in series) multiplier-accumulator circuits) to memory to control or facilitate providing/writing filter weights or values to the plurality of multiplier-accumulator circuits to implement the multiply operations. In one embodiment, each of the multiplier-accumulator circuits includes "local" memory (e.g., registers or a bank of registers) to "locally" store the filter weights or values for use in connection with the multiply operations. Each "local" memory may be dedicated to an associated multiplier-accumulator circuit.

In one embodiment, each multiplier-accumulator circuit includes a plurality of "local" memory/register banks to store at least two sets of filter weights or values including a first set of filter weights for use in first multiply operations (e.g., in connection with implementing current multiply operations) and a second set of filter weights for use in multiply operations immediately after the current multiply operations (i.e., immediately after completion of the "current" multiply operations which employ the first set of filter weights). In this embodiment, in operation, the multiplier-accumulator circuits may read the first filter weights from the first memory during a first set of multiply operations and, upon completion of the first set of multiply operations (associated with processing of a first set of data), read the second filter weights from the second memory during a second set of multiply operations (associated with processing of a second set of data). In this way, the multiplier-accumulator circuit may ping-pong read operations, on a set of multiply operations basis, between the plurality of "local" memory/register banks. That is, the multiplier-accumulator circuits may read/access the first set of filter weights (i.e., stored in a first "local" memory/register bank) for use in the current multiply operations in connection with processing a first set of data and, upon completion, immediately read/access the next/second set of filter weights (i.e., stored in a second "local" memory/register bank) in connection with processing a second set of data. Here, because the second set of filter weights may be written to and stored in second memory/register bank was written and stored before completion of the multiply operations using the first set of filter weights stored in the first memory/register bank, there is no delay or overhead time stemming from access to and availability of next set of filter weights to the multiplier-accumulator circuits during the data processing performed by the multiplier-accumulator circuits of the multiplier-accumulator execution or processing pipeline. The memory output selection circuit (e.g., a multiplexer) may responsively control which (and when) memory/register bank of the plurality of memory/register banks is connected to the multiplier circuitry of the multiplier-accumulator circuit. In this way, the memory output selection circuit responsively controls the ping-pong read operations and the connection of the memory/register bank to the multiplier circuitry of the multiplier-accumulator circuit.

Moreover, the control/configure circuitry may alternately write new or updated sets of filter weights to the plurality of "local" memory/register banks. For example, the control/configure circuitry may ping-pong write operations, on a set of multiply operations basis, between the two "local" memory/register banks associated with each multiplier-accumulator circuit of the multiplier-accumulator execution or processing pipeline. That is, upon completion of a set of multiply operations using a first set of filter weights that is stored in a first memory/register bank, a new set of filter weights may be written to the first memory/register bank to be used in processing after the completion of the set of multiply operations using a second set of filter weights (i.e., the set of filter weights stored in the second "local" memory/register bank). Here, the control/configure circuitry provides or writes the new set of filter weights into the first "local" memory/register bank while the multiplier-accumulator circuits perform the multiply operations using a second set of filter weights. That new or third set of filter weights (which is stored in the first "local" memory/register bank associated with each multiplier-accumulator circuit) is then available to the multiplier-accumulator circuits immediately after data processing is completed using the second set of filter weights or values that were stored in a second "local" memory/register bank. In this way, there is no delay or overhead time introduced into the multiplier-accumulator execution or processing pipeline due to writing, updating or providing "new" filter weights or values to the "local" memory/register banks to be used circuits during the data processing.

As noted above, in one embodiment, the control/configure circuitry controls or configures connection(s) between multiplier-accumulator circuits and/or rows of interconnected multiplier-accumulator circuits to implement an architecture of the execution or processing pipeline. For example, the control/configure circuitry may determine and/or configure (i) which multiplier-accumulator circuits are employed and/or interconnected to implement or perform the multiply and accumulate operations and/or (ii) the number of interconnected multiplier-accumulator circuits (and/or rows/banks of interconnected (in series) multiplier-accumulator circuits) employed to perform the predetermined multiply and accumulate operations, and/or (iii) the pipelining architecture or configuration implemented via (a) connection of multiplier-accumulator circuits and/or (b) connection between rows of interconnected multiplier-accumulator circuits employed to perform the multiply and accumulate operations. The control/configure circuitry, in one embodiment, includes a plurality of control/configure circuits associated with and dedicated to interface with a plurality of interconnected (e.g., serially) multiplier-accumulator circuits and/or one or more rows of interconnected (e.g., serially) multiplier-accumulator circuits. The configuration may be implemented, for example, in situ (i.e., during operation of the integrated circuit) to, for example, meet or exceed temporal-based system requirements or constraints. Moreover, the configuration implemented by the control/configure circuitry may be one-time programmable (e.g., at manufacture via, for example, a programmable fuse array) or multiple-times programmable (including, e.g., at start-up/power-up, initialization, and/or in situ).

Notably, the MAC processing or execution pipelines may be organized from or disposed on one or more integrated circuits. In one embodiment, the integrated circuit is a discrete field programmable gate array (FPGA) or embedded FPGA (herein after collectively "FPGA" unless indicated otherwise). Briefly, an FPGA is an integrated circuit that is configured and/or reconfigured (hereinafter, unless stated otherwise, collectively "configured" or the like (e.g., "configure" and "configurable")) by a user, operator, customer and/or designer before and/or after manufacture. The FPGA may include programmable logic components (often called "logic cells", "configurable logic blocks" (CLBs), "logic array blocks" (LABs), or "logic tiles"—hereinafter collectively "logic tiles")).

In one embodiment of the present inventions, one or more (or all) logic tiles of an FPGA includes a plurality of multiplier-accumulator circuits to implement multiply and accumulate operations, for example, in a pipelining manner. The control/configure circuitry may be included in or may include a switch interconnect network in the logic tiles. The switch interconnect network may be configured as a hierarchical and/or mesh interconnect network. The logic tiles may include data storage elements associated with the switch interconnect network, input pins and/or look-up tables (LUTs) that, when programmed, determine the configuration and/or operation of the switches/multiplexers and, among other things, the communication between circuitry (e.g., logic components) within a logic tile (including the MAC circuits and/or MAC processing pipelines) and/or between circuitry of multiple logic tiles (e.g., between MAC circuits and/or MAC processing pipelines of a plurality of logic tiles).

In one embodiment, the switch interconnect network may provide a connection to/from logic circuitry of the associated logic tile or a different logic tile to/from multiplier-accumulator circuits (individually) of the multiplier-accumulator circuits of the processing or execution pipelines. In this way, MAC circuits and/or MAC processing pipelines of a plurality of logic tiles may be employed, for example, concurrently, to processes related data (e.g., related image data). Indeed, such connections may be configurable and/or re-configurable—for example, in situ (i.e., during normal operation of the integrated circuit) and/or at or during power-up, start-up, initialization, re-initialization, configuration, re-configuration or the like. In one embodiment, the switch interconnect network may employ one or more embodiments, features and/or aspects of the interconnect network described and/or illustrated in the '345 and '306 applications. Moreover, the switch interconnect network may interface with and/or include one or more embodiments, features and/or aspects of the interface connector described and/or illustrated in the '345 and '306 applications (See, e.g., FIGS. 7A-7C of the '345 application; notably, certain details of the NLINK circuits described and illustrated herein may correlate to circuitry described and/or illustrated in the '345 and '306 applications which is referred to as NLINX (e.g., NLINX conductors, NLINX interface, NLINX interface connector, etc.)). As mentioned above, the '345 and '306 applications are hereby incorporated by reference herein in their entirety.

Notably, the integrated circuit(s) may be, for example, a processor, controller, state machine, gate array, system-on-chip (SOC), programmable gate array (PGA) and/or FPGA and/or a processor, controller, state machine and SoC including an embedded FPGA. A field programmable gate array or FPGA means both a discrete FPGA and an embedded FPGA.

In one embodiment, the present inventions may also be employed or implemented in the concurrent and/or parallel processing techniques of the multiplier-accumulator execution or processing pipelines (and methods of operating such circuitry) which increase throughput of the pipelines, as described and/or illustrated in U.S. patent application Ser. No. 16/816,164 and U.S. Provisional Patent Application No. 62/831,413, both of which are incorporated by reference herein in their entirety.

Briefly, with reference to FIG. 1A, in one embodiment the multiplier-accumulator circuitry in the execution pipeline is configured in a linearly or serially connected pipeline architecture. In this configuration, Dijk data are fixed in place during execution and Yijl data that rotates (between the MACs of the pipeline) during execution. The m×m (e.g., 64×64) Fkl filter weights are distributed across L0 memory (in this illustrative embodiment, 64 L0 SRAMs—one L0 SRAM in each MAC processing circuit of the m (e.g., m=64) MAC processing circuit of the pipeline). In each execution cycle, m (e.g., m=64) Fkl values will be read and passed to the MAC elements or circuits. The Dijk data values are stored or held in one processing element during the m (e.g., m=64) execution cycles after being loaded from the Dijk shifting chain—which is connected to DMEM memory (here, L2 memory—such as SRAM).

Further, during processing, the Yijlk MAC values are rotated through all m (e.g., m=64) MAC processors during the m (e.g., m=64) execution cycles after being loaded from the Yijk shifting chain (see $Y_{MEM}$ memory), and will be unloaded with the same shifting chain.

Further, in this exemplary embodiment, "m" (e.g., 64 in the illustrative embodiment) MAC processing circuits in the execution pipeline operate concurrently whereby the multiplier-accumulator processing circuits perform m×m (e.g., 64×64) multiply-accumulate operations in each m (e.g., 64) cycle interval (here, a cycle may be nominally 1 ns). Thereafter, a next set of input pixels/data (e.g., 64) is shifted-in and the previous output pixels/data are shifted-out during the same m (e.g., 64) cycle interval. Notably, each m (e.g., 64) cycle interval processes a Dd/Yd (depth) column of input and output pixels/data at a particular (i,j) location (the indexes for the width Dw/Yw and height Dh/Yh dimensions). The m cycle execution interval is repeated for each of the Dw*Dh depth columns for this stage. In this exemplary embodiment, the filter weights or weight data are loaded into memory (e.g., the L1/L0 SRAM memories) from, for example, an external memory or processor before the stage processing started (see, e.g., the '345 and '306 applications). In this particular embodiment, the input stage has Dw=512, Dh=256, and Dd=128, and the output stage has Yw=512, Yh=256, and Yd=64. Note, in one embodiment, only 64 of the 128 Dd input are processed in each 64×64 MAC execution operation.

With continued reference to FIG. 1A, the method implemented by the configuration illustrated may accommodate arbitrary image/data plane dimensions (Dw/Yw and Dh/Yh) by simply adjusting the number of iterations of the basic 64×64 MAC accumulation operation that are performed. The loop indices "I" and "j" are adjusted by control and sequencing logic circuitry to implement the dimensions of the image/data plane. Moreover, the method may also be adjusted and/or extended to handle a Yd column depth larger than the number of MAC processing elements (e.g., 64 in one illustrative example) in the execution pipeline. In one embodiment, this may be implemented by dividing the depth column of output pixels into blocks (e.g., 64), and repeating the MAC accumulation of FIG. 1A for each of these blocks.

Indeed, the method illustrated in FIG. 1A may be further extended to handle a Dd column depth larger than the number of MAC processing elements/circuits (64 in one illustrative example) in the execution pipeline. This may be implemented, in one embodiment, by initially performing a partial accumulation of a first block of m data (e.g., m=64) of the input pixels Dijk into each output pixel Yijl. Thereafter, the partial accumulation values Yijl are read (from the memory $Y_{mem}$) back into the execution pipeline as initial values for a continuing accumulation of the next block of m input data/pixels Dijk into each output pixel Yijl. The memory which stores or holds the continuing accumulation values (e.g., L2 memory) may be organized, partitioned and/or sized to accommodate any extra read/write bandwidth to support the processing operation.

With reference to FIG. 1B, the integrated circuit may include a plurality of multi-bit MAC execution pipelines which are organized as one or more clusters of a processing component. Here, the component may include "resources" such as a bus interfaces (e.g., a PHY and/or GPIO) to facilitate communication with circuitry external to the component and memory (e.g., SRAM and DRAM) for storage and use by the circuitry of the component. For example, with reference to FIG. 1B, in one embodiment, four clusters are included in the component (labeled "X1") wherein each cluster includes a plurality of multi-bit MAC execution pipelines (in this illustrative embodiment 16 64-MAC execution pipelines). Notably, one MAC execution pipeline (which in this illustrative embodiment includes 64 MAC processing circuits) of FIG. 1A is illustrated at the lower right for reference purposes.

With continued reference to FIG. 1B, the memory hierarchy in this exemplary embodiment includes an L0 memory (e.g., SRAM) that stored filter weights or coefficients to be employed by multiplier-accumulator circuits in connection with the multiplication operations implemented thereby. In one embodiment, each MAC execution pipeline includes an L0 memory to store the filter weights or coefficients associated with the data under processing by the circuitry of the MAC execution pipeline. An L1 memory (a larger SRAM resource) is associated with each cluster of MAC execution pipelines. These two memories may store, retain and/or hold the filter weight values Fijklm employed in the accumulation operations.

Notably, the embodiment of FIG. 1B may employ an L2 memory (e.g., an SRAM memory that is larger than the SRAM of L1 or L0 memory). A network-on-chip (NOC) couples the L2 memory to the PHY (physical interface) to provide connection to an external memory (e.g., L3 memory—such as, external DRAM component(s)). The NOC also couples to a PCIe PHY which, in turn, couples to an external host. The NOC also couples to GPIO input/output PHYs, which allow multiple X1 components to be operated concurrently. The control/configure circuit (referred to, at times, as "NLINK" or "NLINK circuit") connect to multiplier-accumulator circuitry (which includes a plurality (here, 64) multiplier-accumulator circuits or MAC processors) to, among other things, configure the overall execution pipeline by providing or "steering" data between one or more MAC pipeline(s), via programmable or configurable interconnect paths. In addition, the control/configure circuit may configure the interconnection between the multiplier-accumulator circuitry and one or more memories—including external memories (e.g., L3 memory, such as external DRAM)—that may be shared by one or more (or all) of the clusters of MAC execution pipelines. These memories may store, for example, the input image pixels Dijk, output image pixels Yijl (i.e., image data processed via the circuitry of the MAC pipeline(s), as well as filter weight values Fijklm employed in connection with such data processing.

Notably, although the illustrative or exemplary embodiments described and/or illustrated a plurality of different memories (e.g., L3 memory, L2 memory, L1 memory, L0 memory) which are assigned, allocated and/or used to store certain data and/or in certain organizations, one or more of other memories may be added, and/or one or more memories may be omitted and/or combined/consolidated—for example, the L3 memory or L2 memory, and/or the organizations may be changed. All combinations are intended to fall within the scope of the present inventions.

Moreover, in the illustrative embodiments set forth herein (text and drawings), the multiplier-accumulator circuitry and/or multiplier-accumulator pipeline is, at times, labeled "NMAX", "NMAX pipeline", "MAC processing pipeline", "MAC execution pipeline" or "MAC pipeline".

With continued reference to FIG. 1B, the integrated circuit(s) include a plurality of clusters (e.g., two, four or eight) wherein each cluster includes a plurality of multiplier-accumulator circuit ("MAC") execution pipelines (e.g., 16). Each MAC execution pipeline may include a plurality of separate multiplier-accumulator circuits (e.g., 64) to implement multiply and accumulate operations. In one embodiment, a plurality of clusters are interconnected to form a processing circuit/component (such component is often identified in the figures as "X1" or "X1 component") that may include memory (e.g., SRAM, MRAM and/or Flash), a switch interconnect network to interconnect circuitry of the component (e.g., the multiplier-accumulator circuits and/or MAC execution pipeline(s) of the X1 component) and/or circuitry of the component with circuitry of one or more other X1 components or other circuitry that is external to the associated X1 component. Here, the multiplier-accumulator circuits of the one or more MAC execution pipelines of a plurality of clusters of a X1 component may be configured to concurrently process related data (e.g., image data). That is, the plurality of separate multiplier-accumulator circuits of a plurality of MAC execution pipelines may concurrently process related data to, for example, increase the data throughput of the X1 component.

Notably, the X1 component may also include interface circuitry (e.g., PHY and/or GPIO circuitry) to interface with, for example, external memory (e.g., DRAM, MRAM, SRAM and/or Flash memory).

In one embodiment, the MAC execution pipeline may be any size or length (e.g., 16, 32, 64, 96 or 128 multiplier-accumulator circuits). Indeed, the size or length of the pipeline may be configurable or programmable (e.g., one-time or multiple times—such as, in situ (i.e., during operation of the integrated circuit) and/or at or during power-up, start-up, initialization, re-initialization, configuration, re-configuration or the like). Here, the size or length of the MAC execution pipeline (i.e., the number of MACs connected in the pipeline, e.g., linear or serially interconnected pipeline) may be increased or decreased—one-time (at manufacture or test) or multiple times, for example, in situ and/or at or during power-up, start-up, initialization, re-initialization, configuration, re-configuration or the like.

In another embodiment, the one or more integrated circuits include a plurality of components or X1 components (e.g., 2, 4, . . . ), wherein each component includes a plurality of the clusters having a plurality of MAC execution pipelines. For example, in one embodiment, one integrated circuit includes a plurality of components or X1 components wherein each X1 component including a plurality of the clusters having a plurality of MAC execution pipelines (e.g., 4 clusters). As noted above, each cluster includes a plurality of execution or processing pipelines (e.g., 16, 32 or 64) which may be configured or programmed to process, function and/or operate concurrently to process related data (e.g., image data) concurrently. In this way, the related data are processed by each of the execution pipelines of a plurality of the clusters concurrently to, for example, decrease the processing time of the related data and/or increase data throughput of the X1 components.

As discussed in the '164 and '413 applications, both of which are incorporated by reference herein in their entirety, a plurality of execution or processing pipelines of one or more clusters of a plurality of the X1 components may be interconnected to process data (e.g., image data). In one embodiment, such execution or processing pipelines may be interconnected in a ring configuration or architecture to concurrently process related data. Here, a plurality of MAC execution pipelines of one or more (or all) of the clusters of a plurality of X1 components (which may be integrated/manufactured on a single die or multiple dice) may be interconnected in a ring configuration or architecture (wherein a bus interconnects the components) to concurrently process related data. For example, a plurality of MAC execution pipelines of one or more (or all) of the clusters of each X1 component are configured to process one or more stages of an image frame such that circuitry of each X1 component processes one or more stages of each image frame of a plurality of image frames. In another embodiment, a plurality of MAC execution pipelines of one or more (or all) of the clusters of each X1 component are configured to process one or more portions of each stage of each image frame such that circuitry of each X1 component is configured to process a portion of each stage of each image frame of a plurality of image frames. In yet another embodiment, a plurality of MAC execution pipelines of one or more (or all) of the clusters of each X1 component are configured to process all of the stages of at least one entire image frame such that circuitry of each X1 component is configured to process all of the stage of at least one image frame. Here, each X1 component is configured to process all of the stages of one or more image frames such that the circuitry of each X1 component processes a different image frame.

As mentioned above, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated in detail separately herein.

BRIEF DESCRIPTION OF THE DRAWINGS

The present inventions may be implemented in connection with embodiments illustrated in the drawings hereof. These drawings show different aspects of the present inventions and, where appropriate, reference numerals, nomenclature, or names illustrating like circuits, architectures, structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended reflect or indicate the embodiment(s) is/are "example" embodiment(s).

Notably, the configurations, block/data/signal width, data/signal path width, bandwidths, data lengths, values, processes, pseudo-code, operations, and/or algorithms described herein and/or illustrated in the FIGURES, and text associated therewith, are exemplary. Indeed, the inventions are not limited to any particular or exemplary circuit, logical, block, functional and/or physical diagrams, number of multiplier-accumulator circuits employed in an execution pipeline, number of execution pipelines employed in a particular processing configuration, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams. Moreover, although the illustrative/exemplary embodiments include a plurality of memories (e.g., L3 memory, L2 memory, L1 memory, L0 memory) which are assigned, allocated and/or used to store certain data (e.g., filter weights) and/or in certain organizations. Indeed, the organizations of the memories may be changed wherein one or more of memories may be added, and/or one or more memories may be omitted and/or combined/consolidated with other memories—for example, (i) the L3 memory or L2 memory and/or (ii) the L1 memory or L0 memory. Again, the inventions are not limited to the illustrative/exemplary embodiments set forth herein.

Figure 1A:
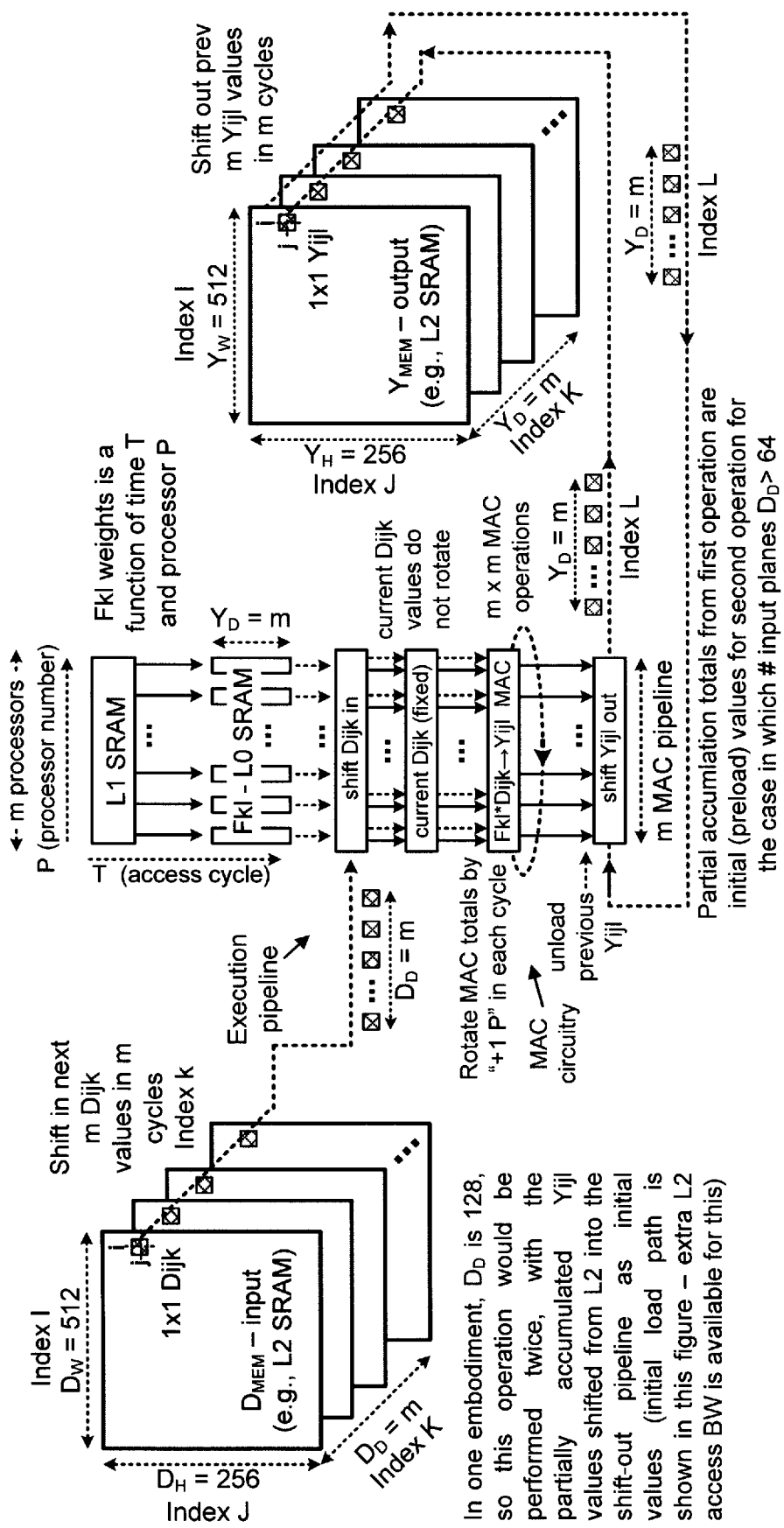
Figure 2D:
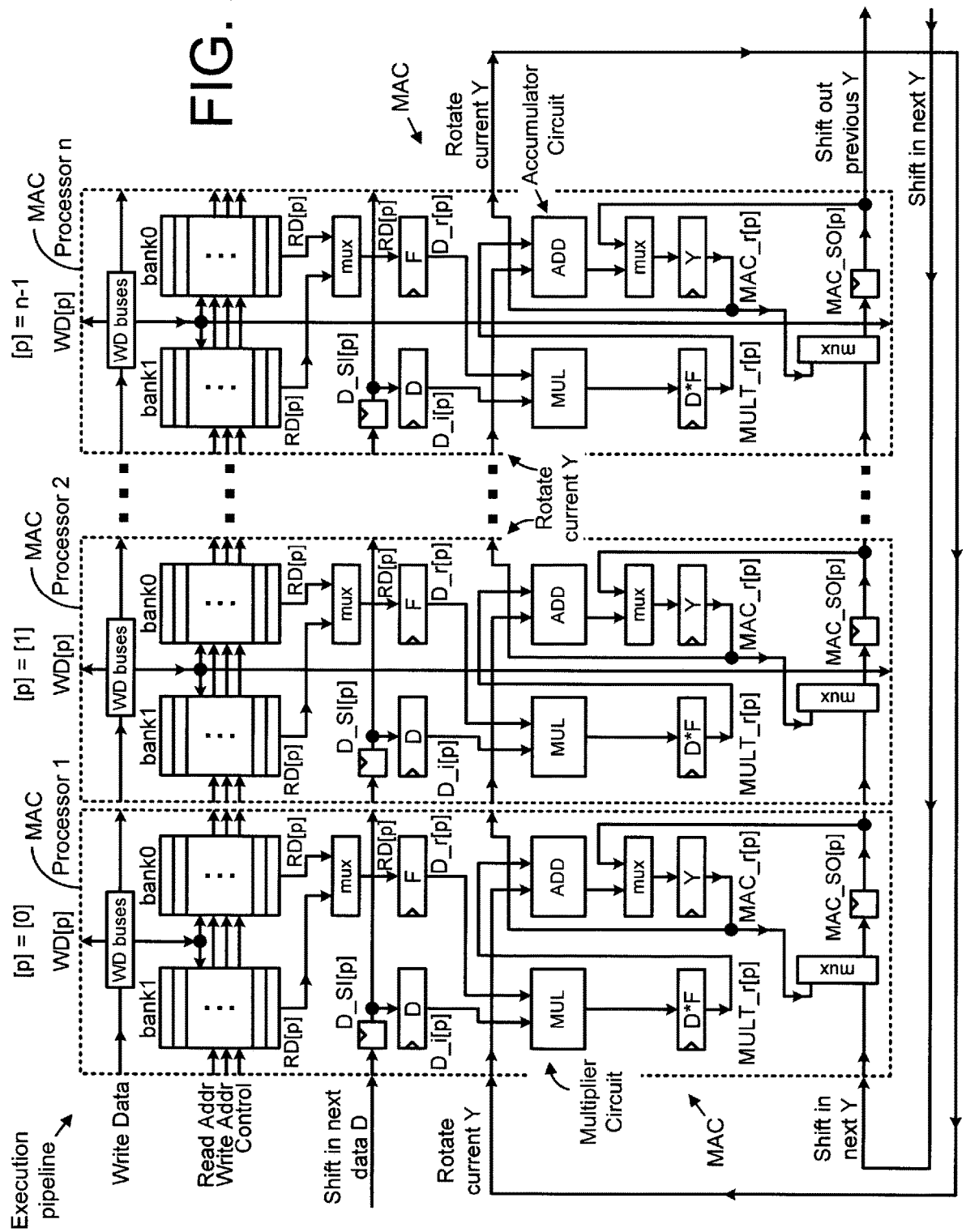
Figure 2E:
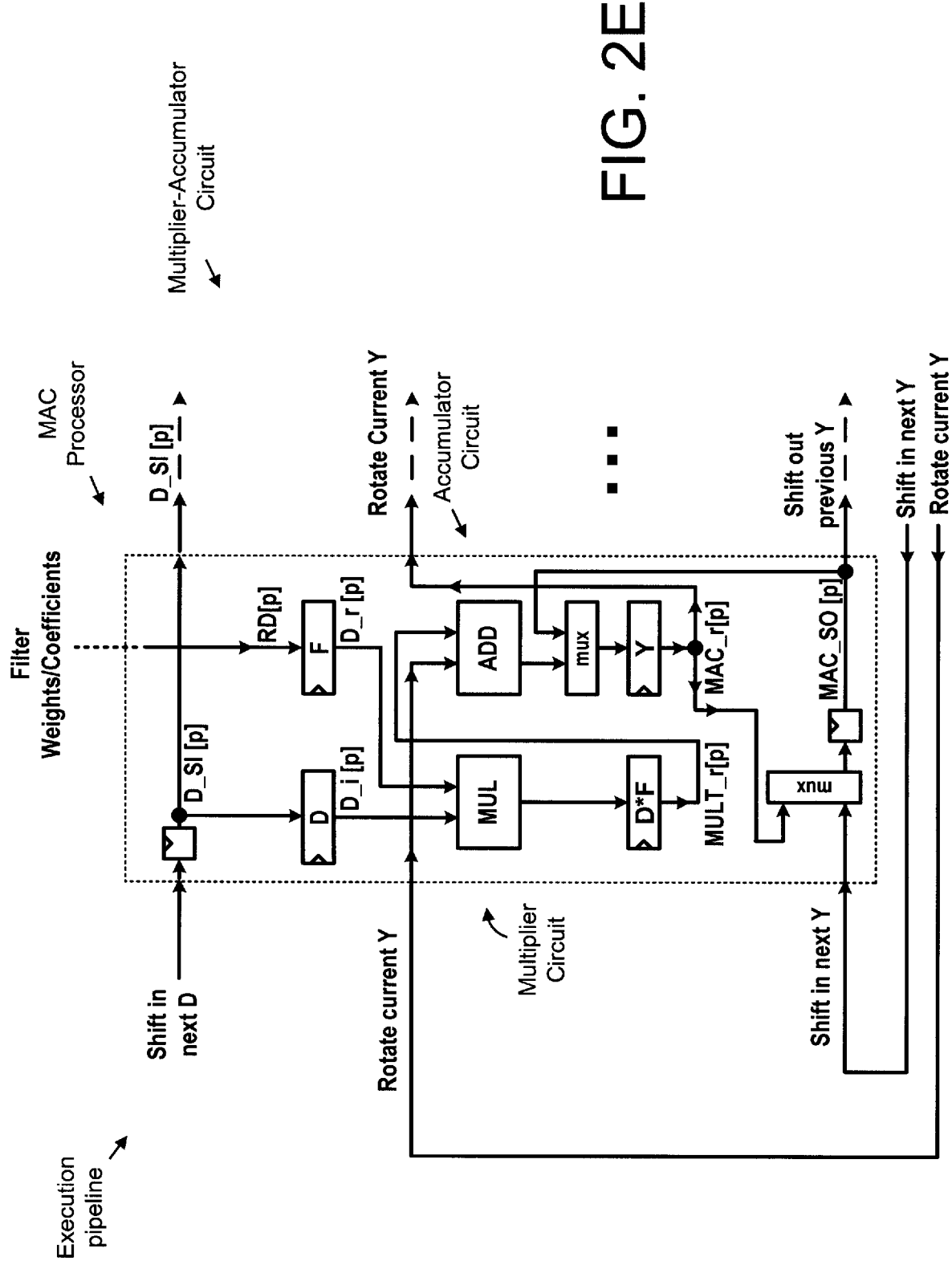
Figure 3A:
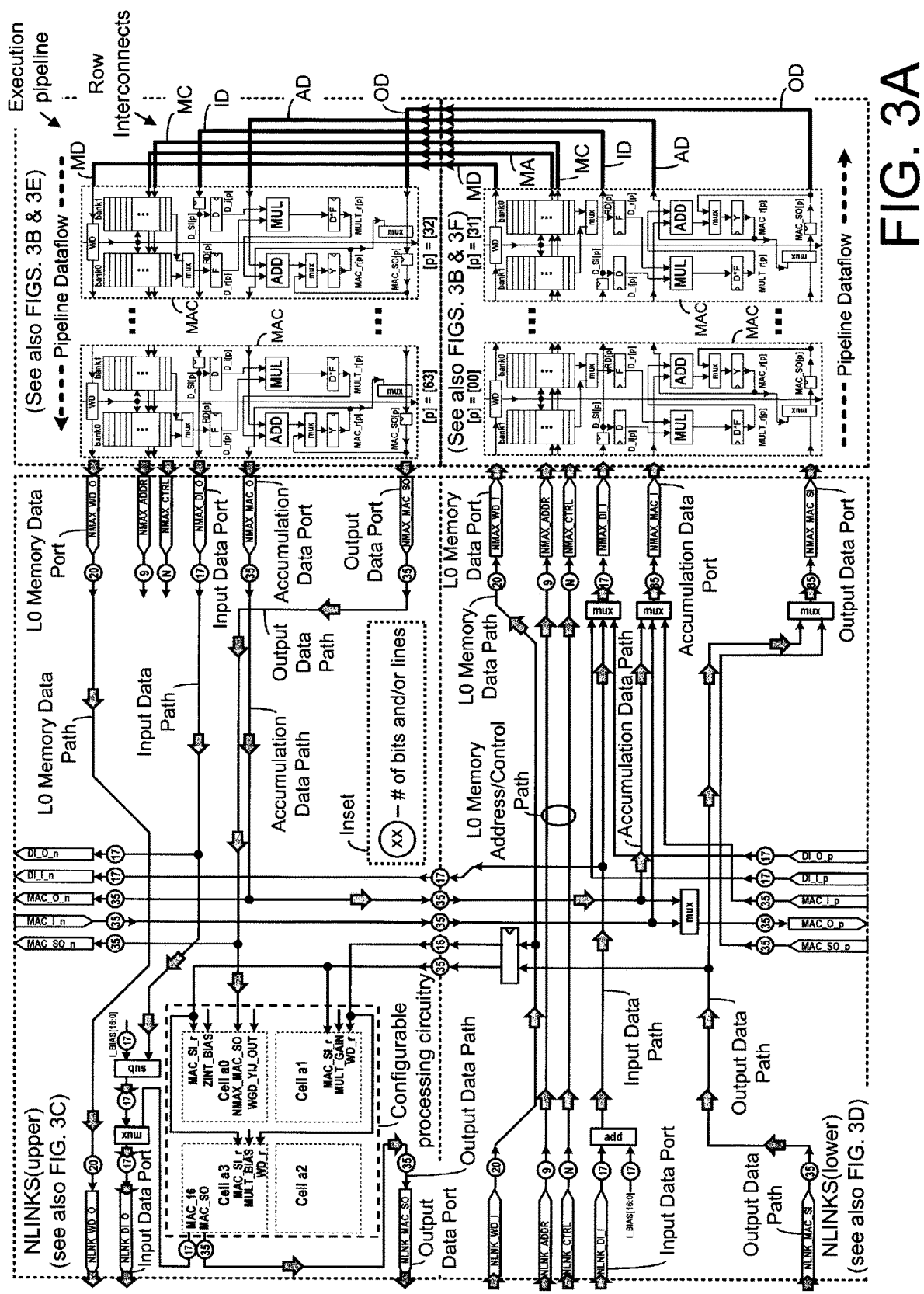
Figure 3B:
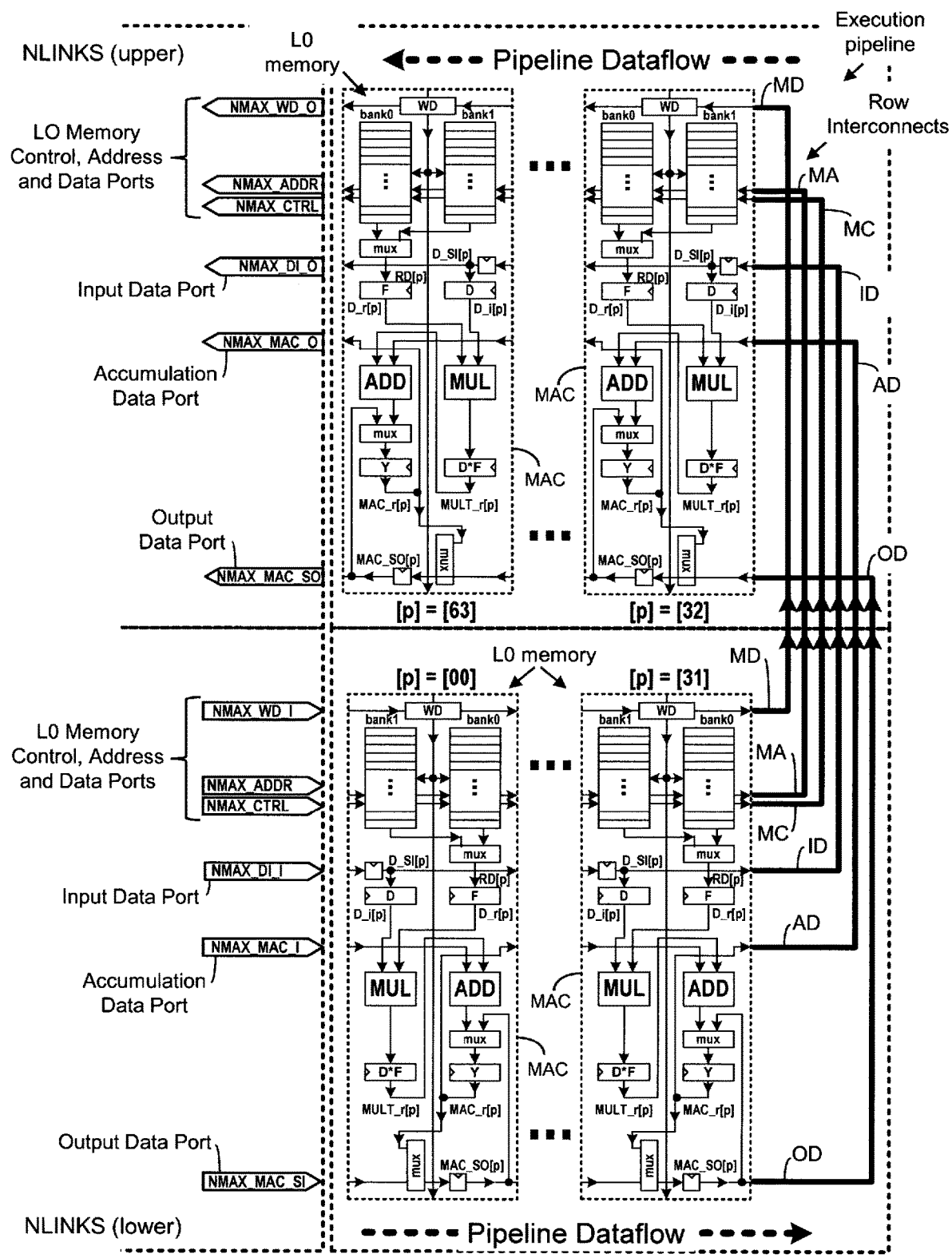
Figure 3C:
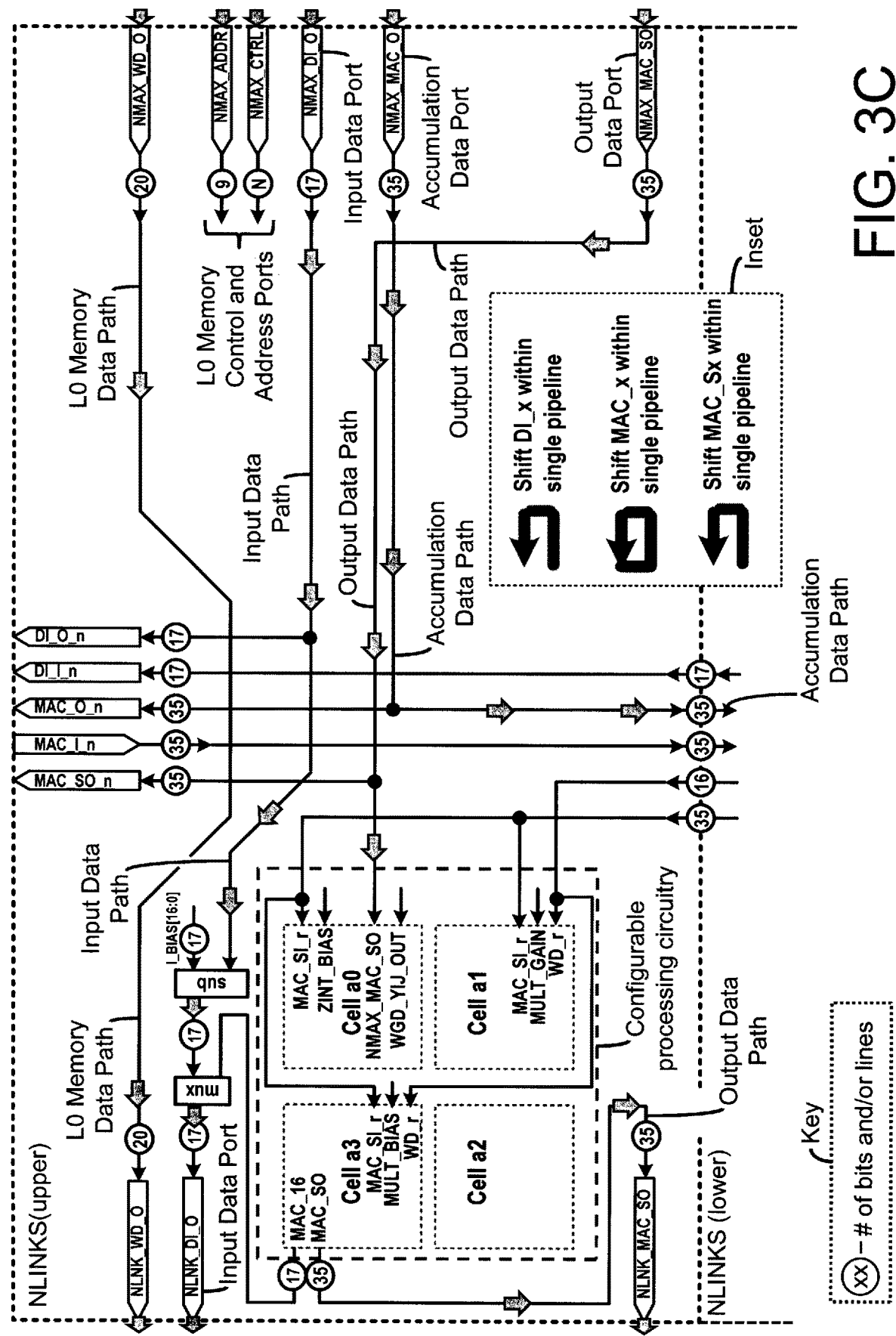
Figure 3D:
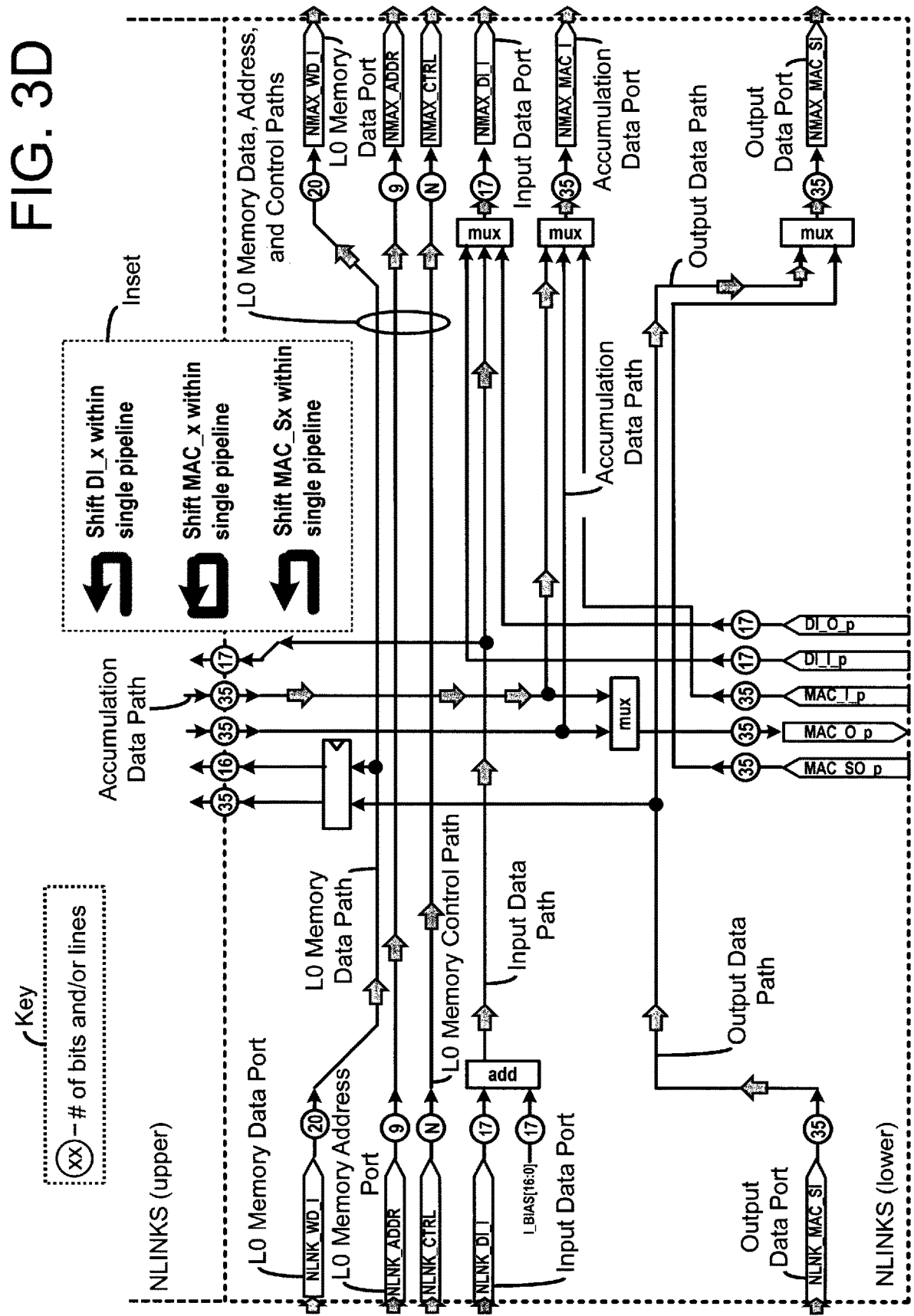
Figure 3E:
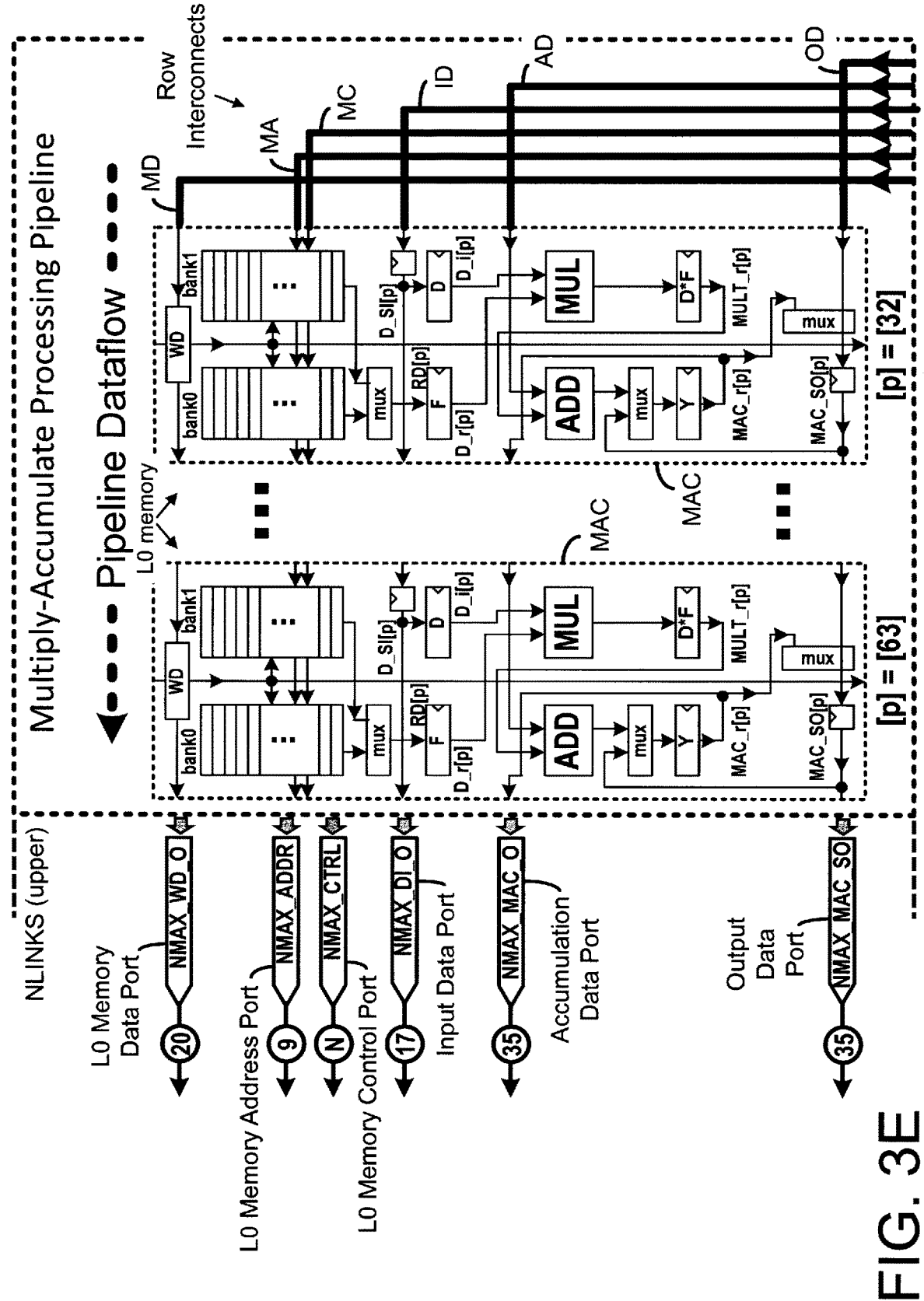
Figure 3F:
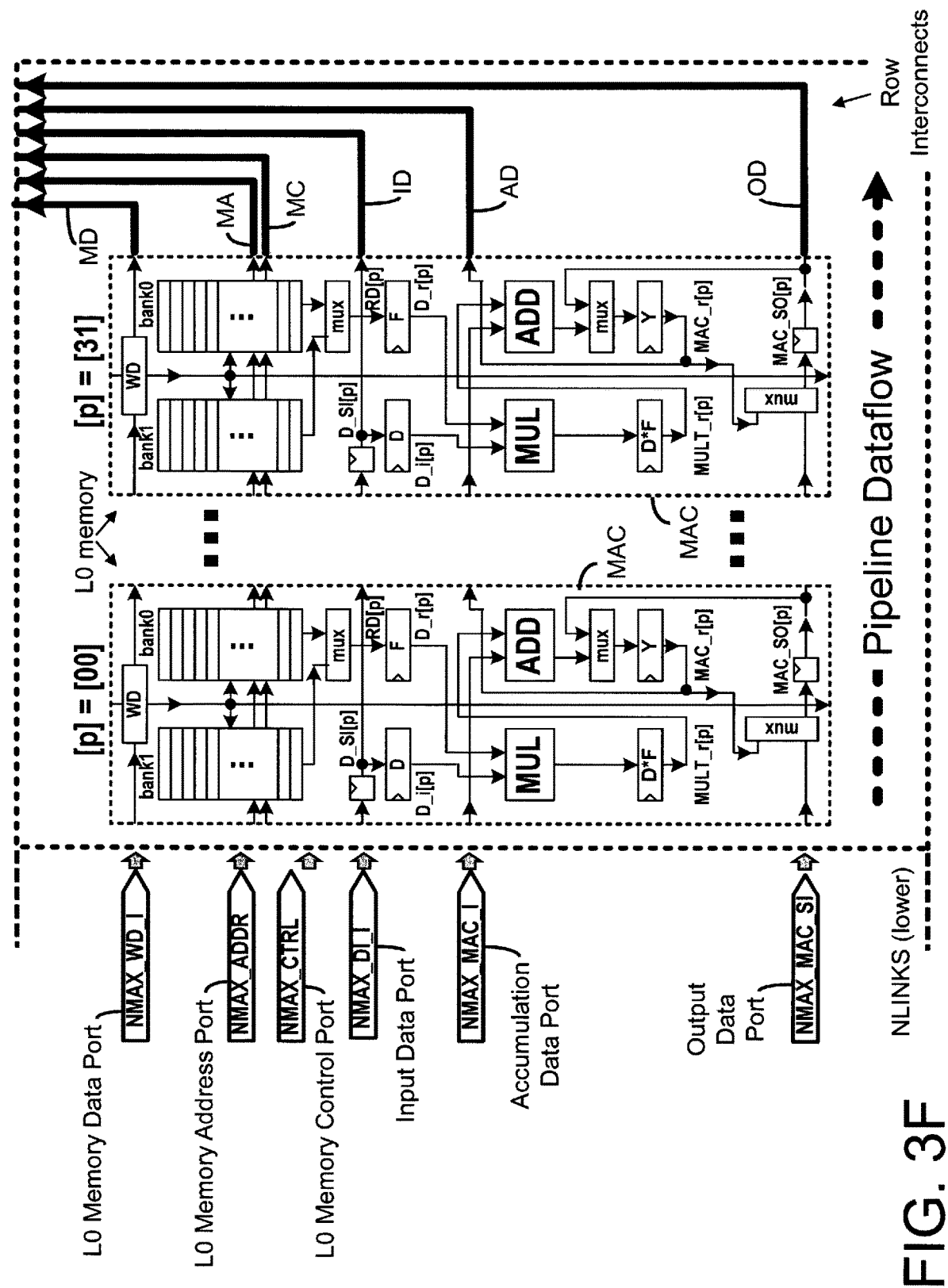
Figure 4:
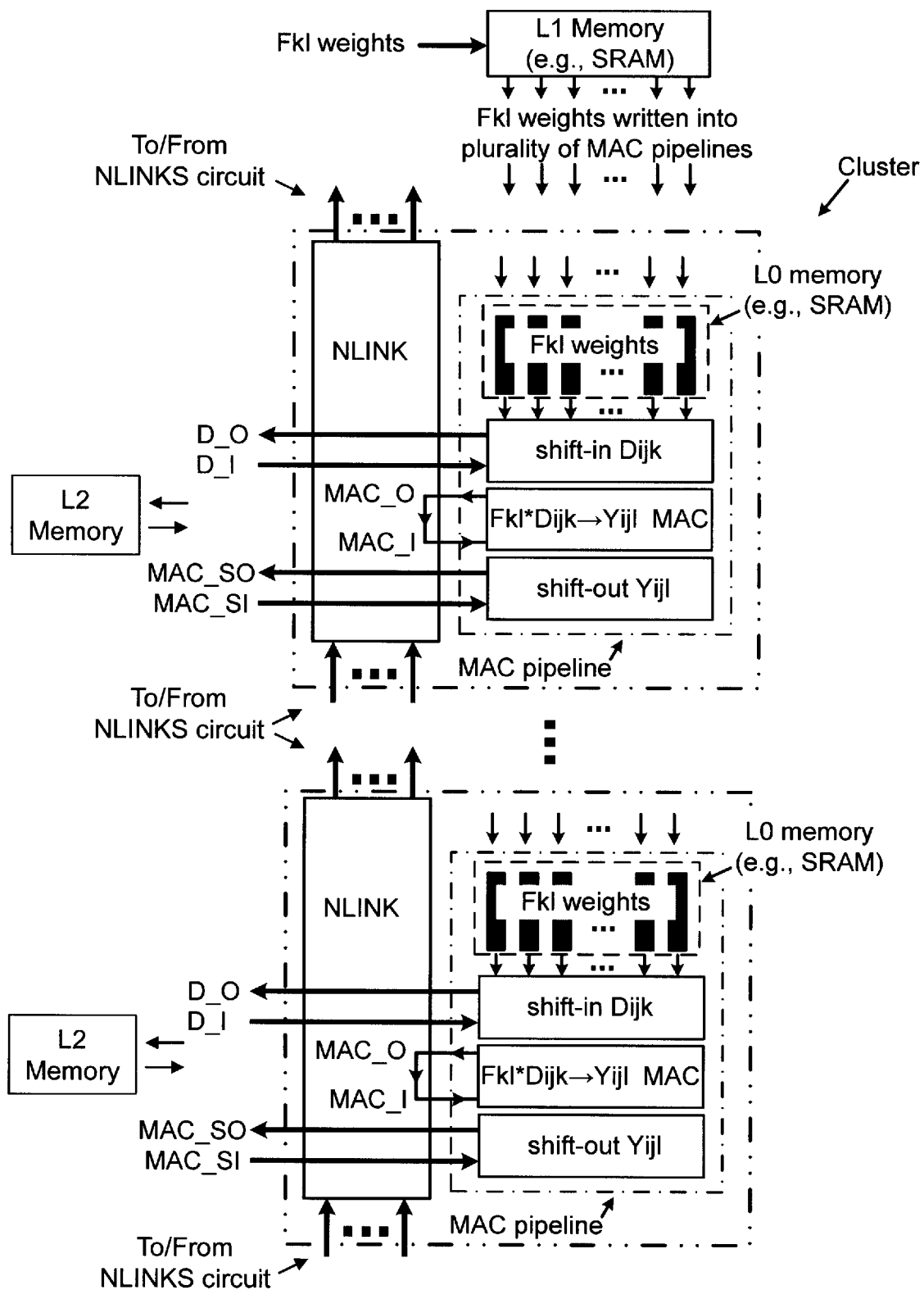
Figure 5A:
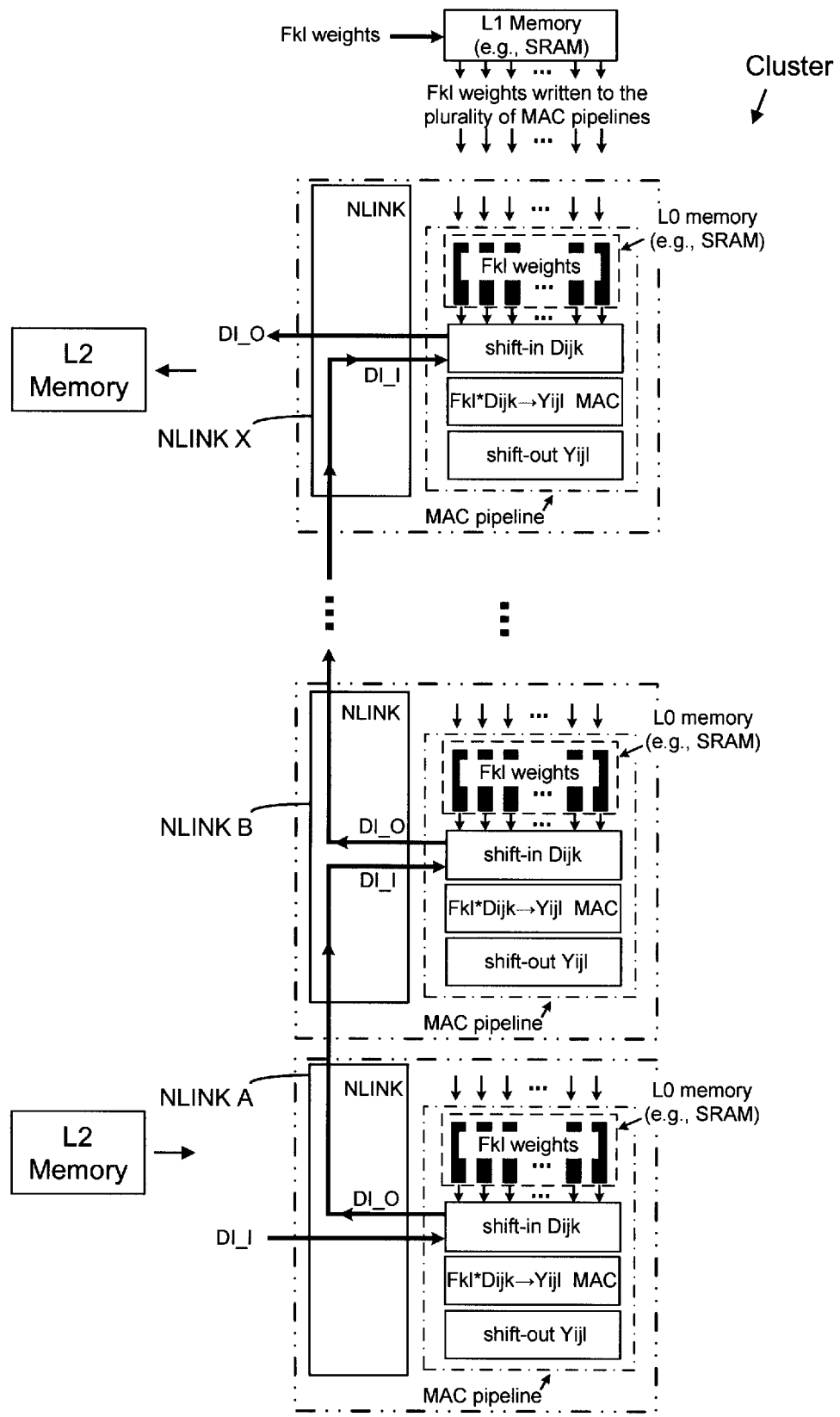
Figure 5B:
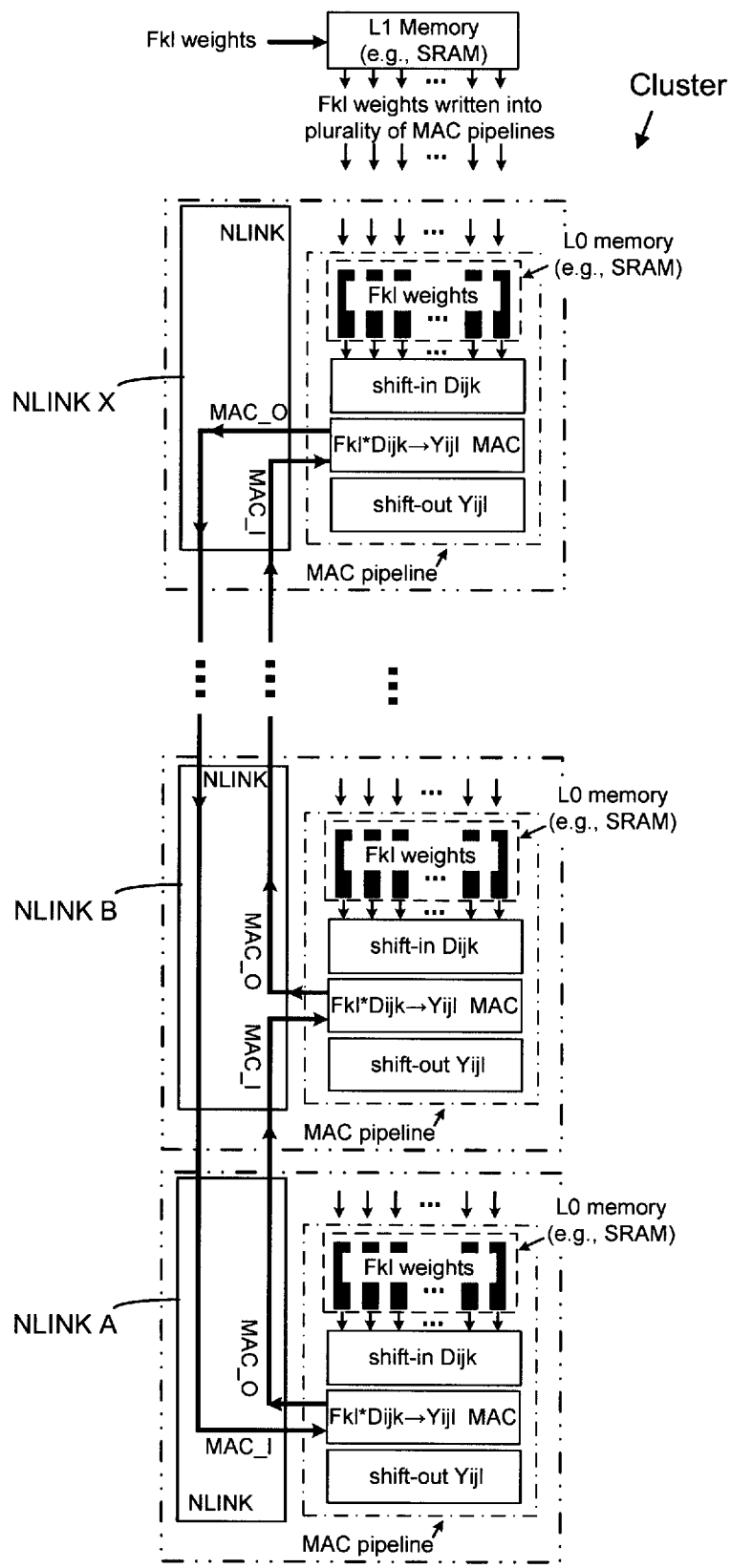
Figure 5C:
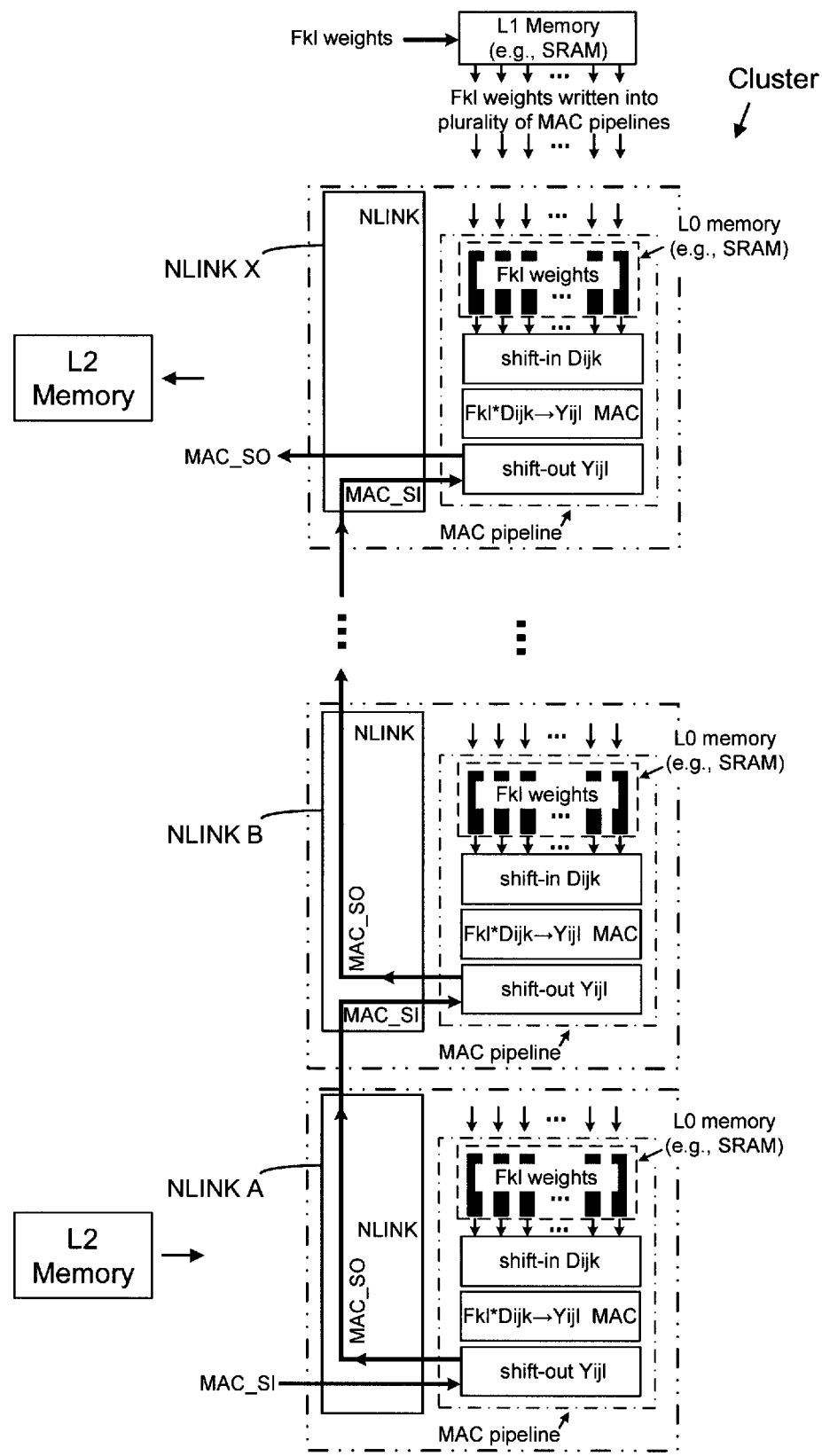
Figure 6A:
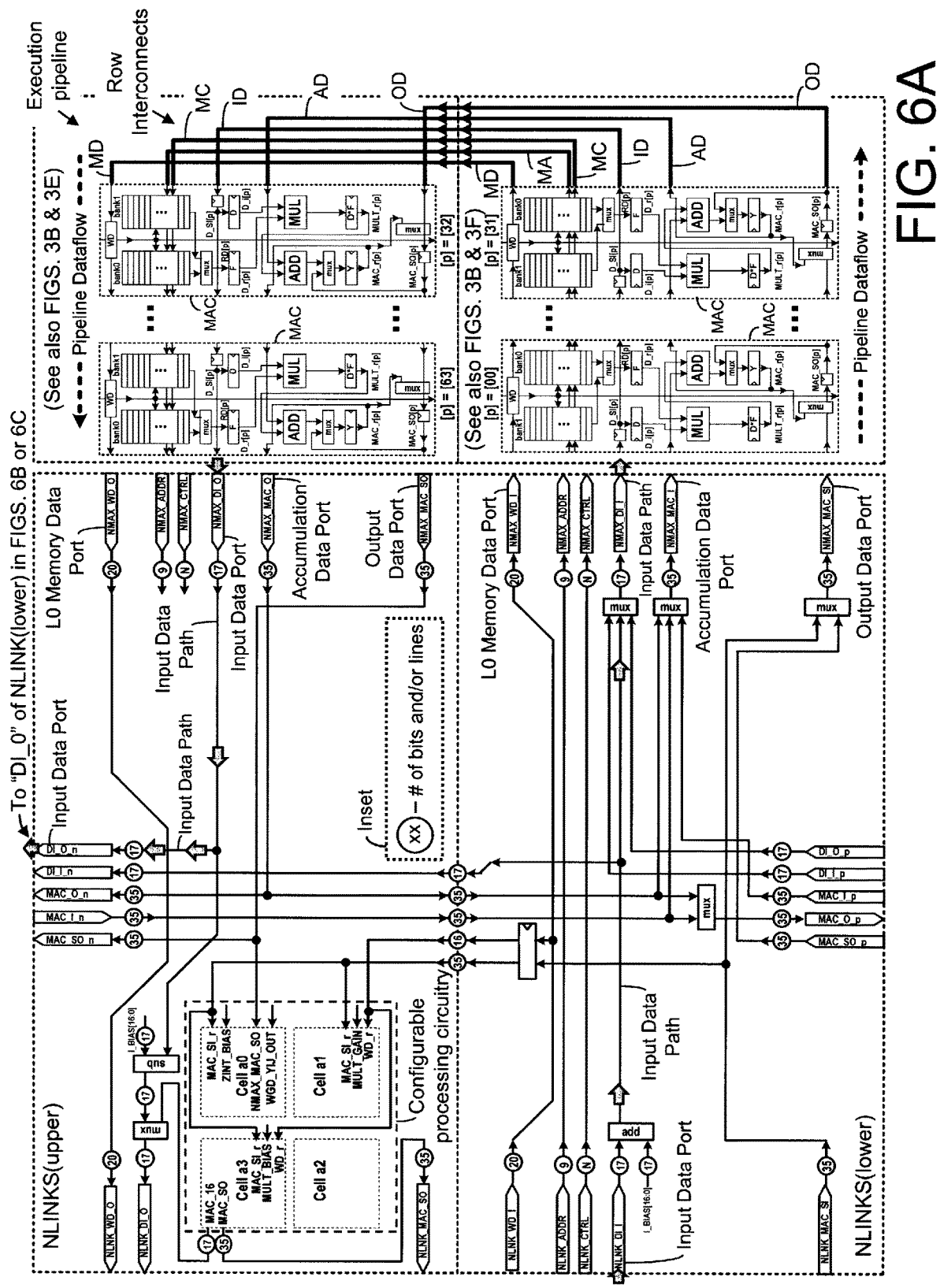
Figure 6B:
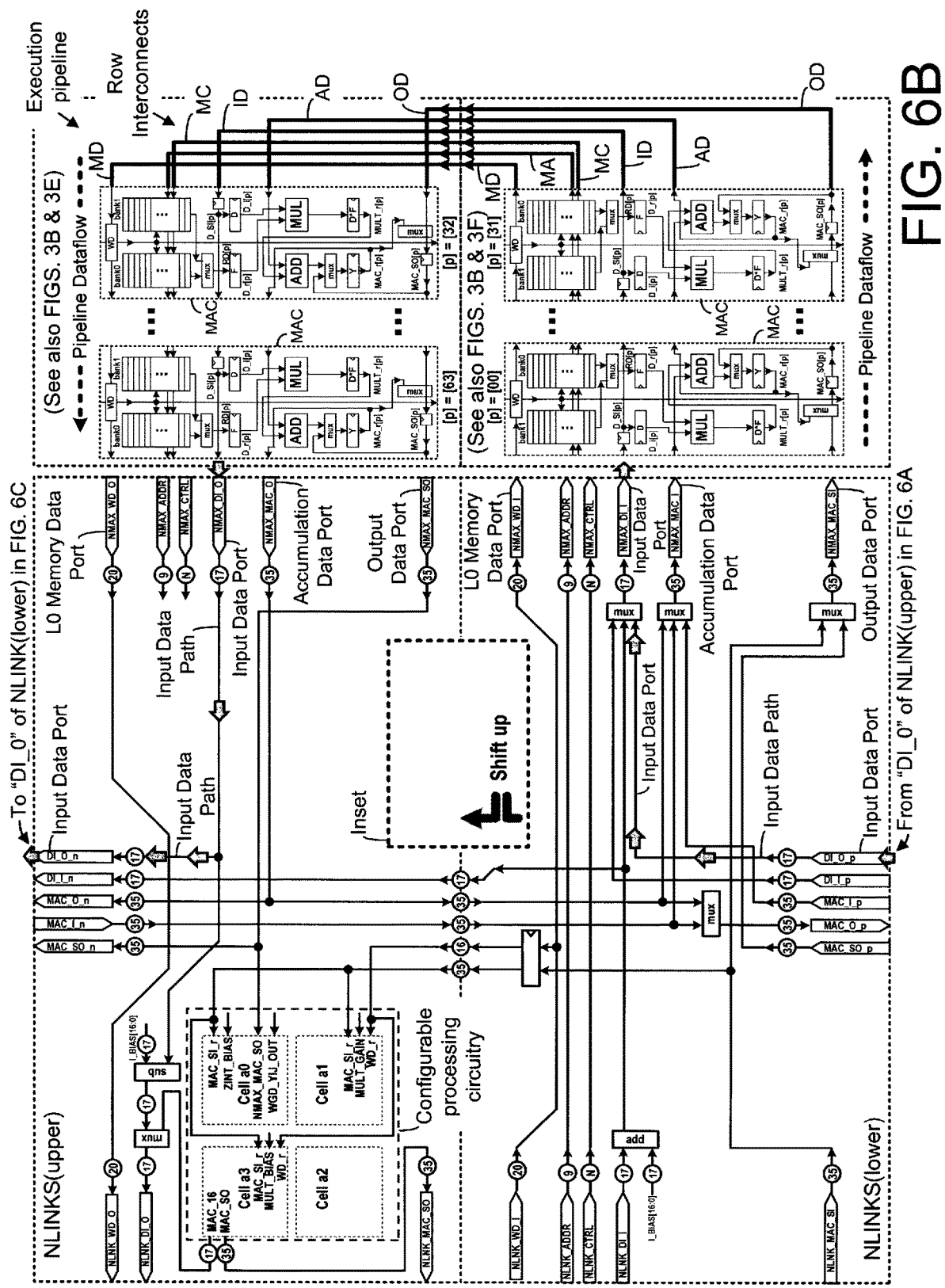
Figure 6C:
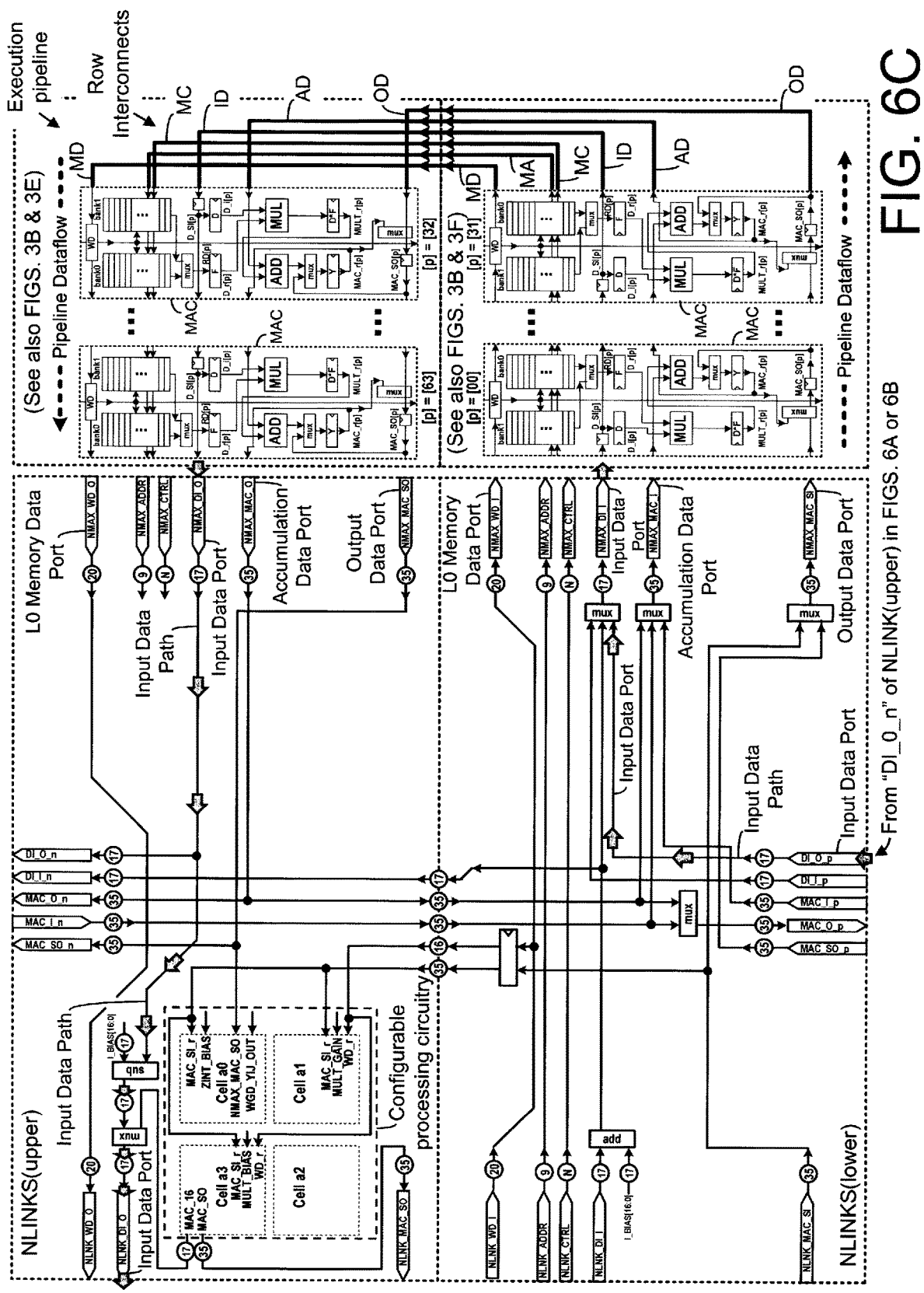
Figure 7A:
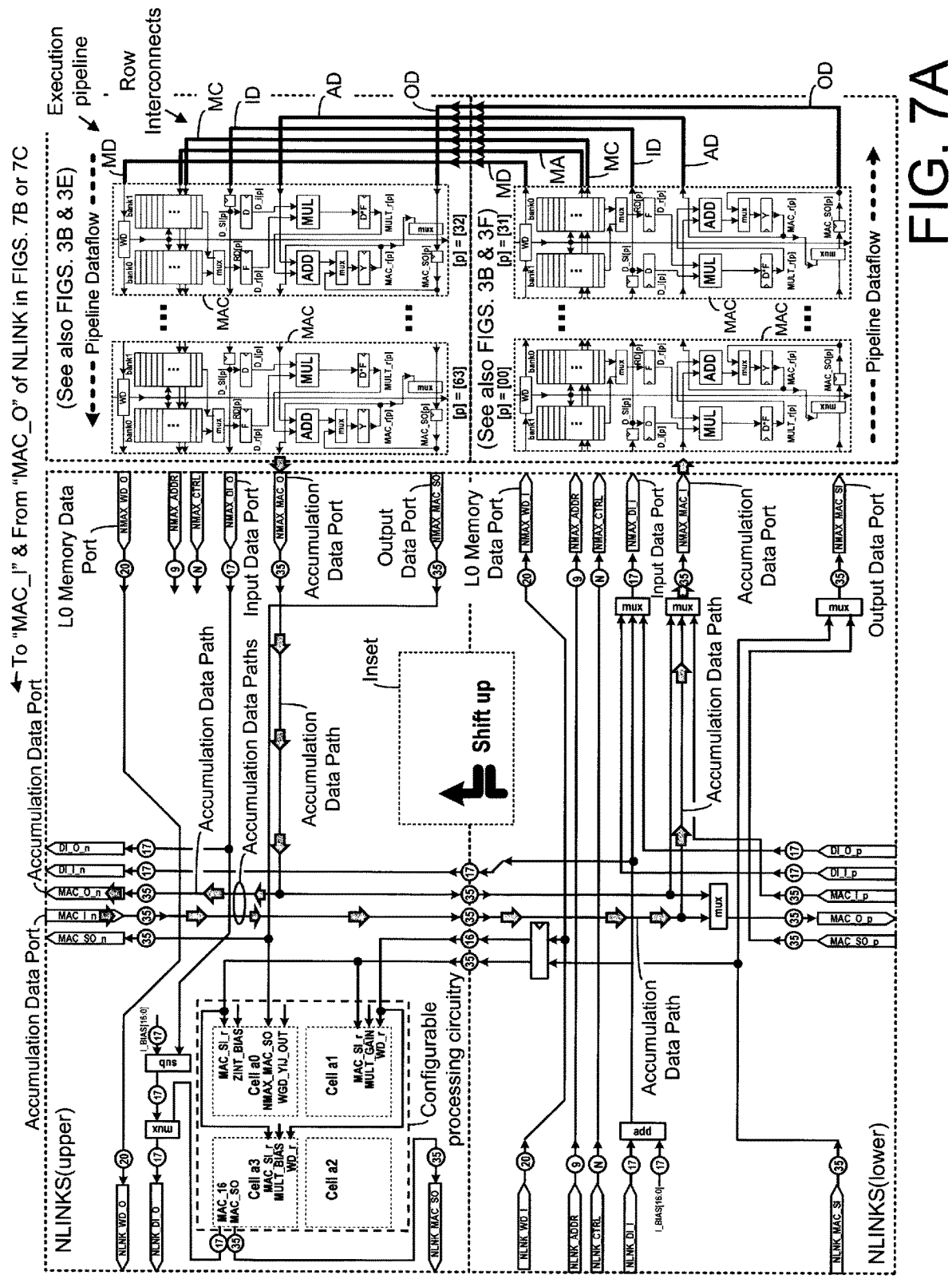
Figure 7B:
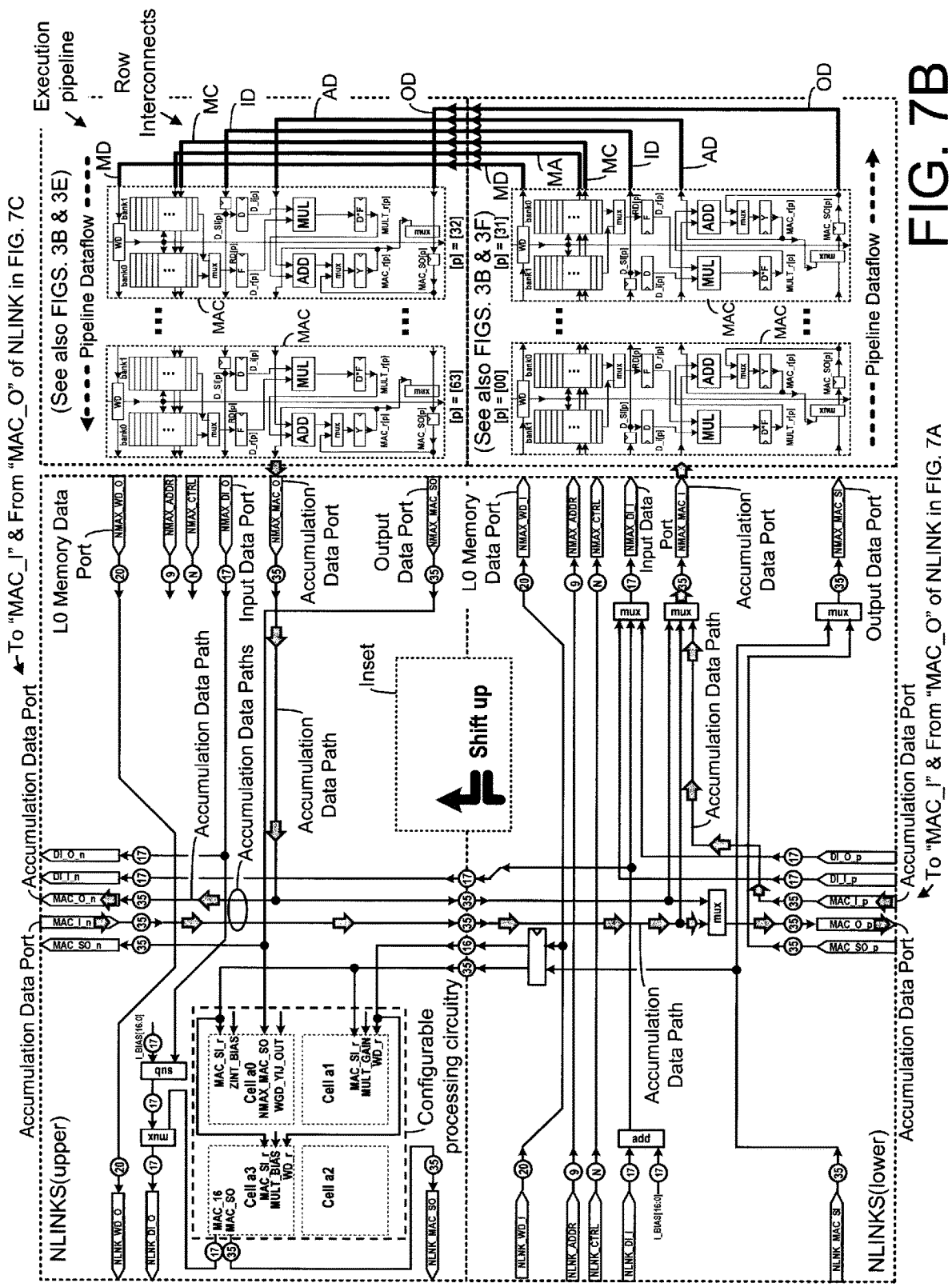
Figure 7C:
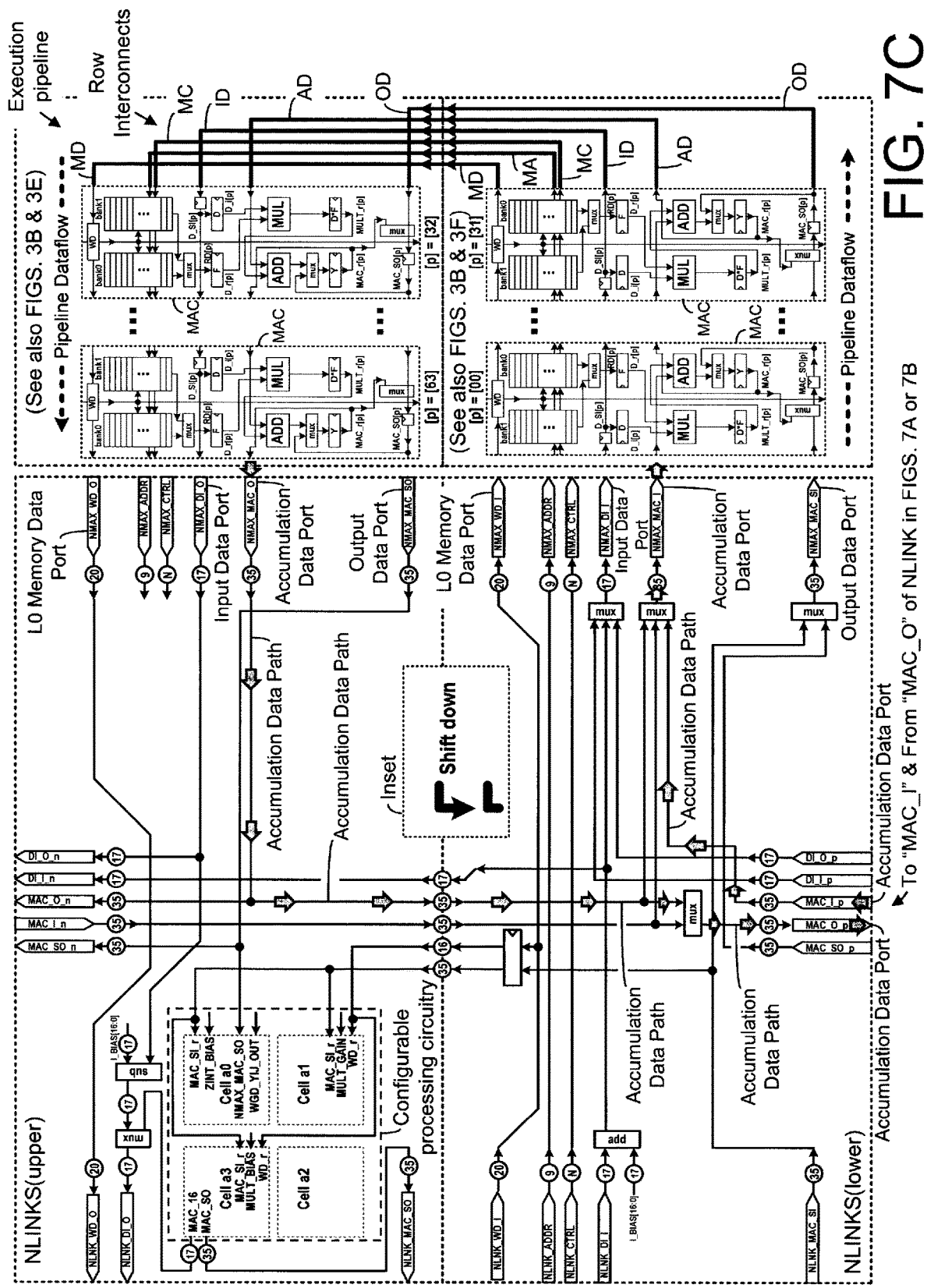
Figure 8A:
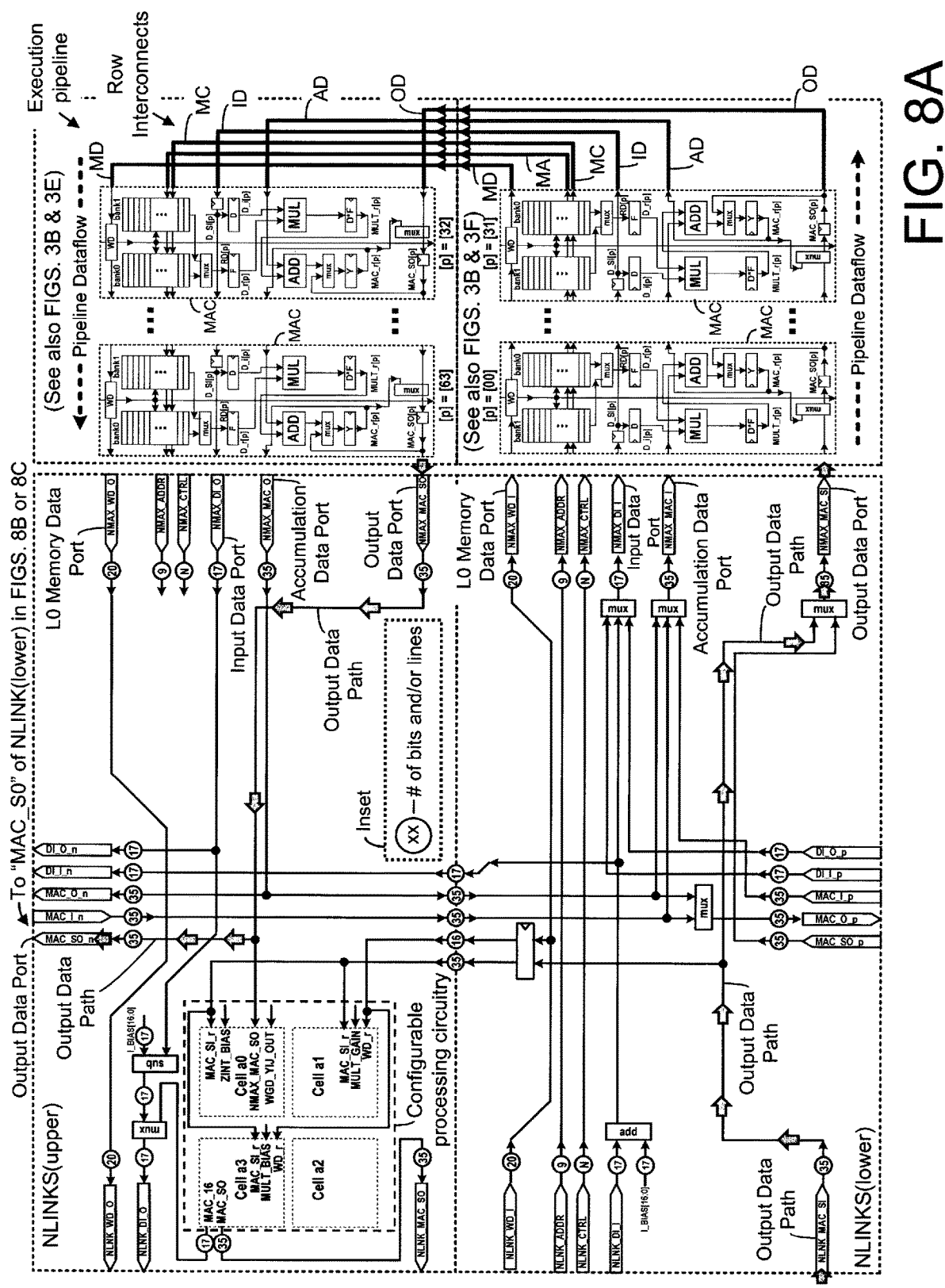
Figure 8B:
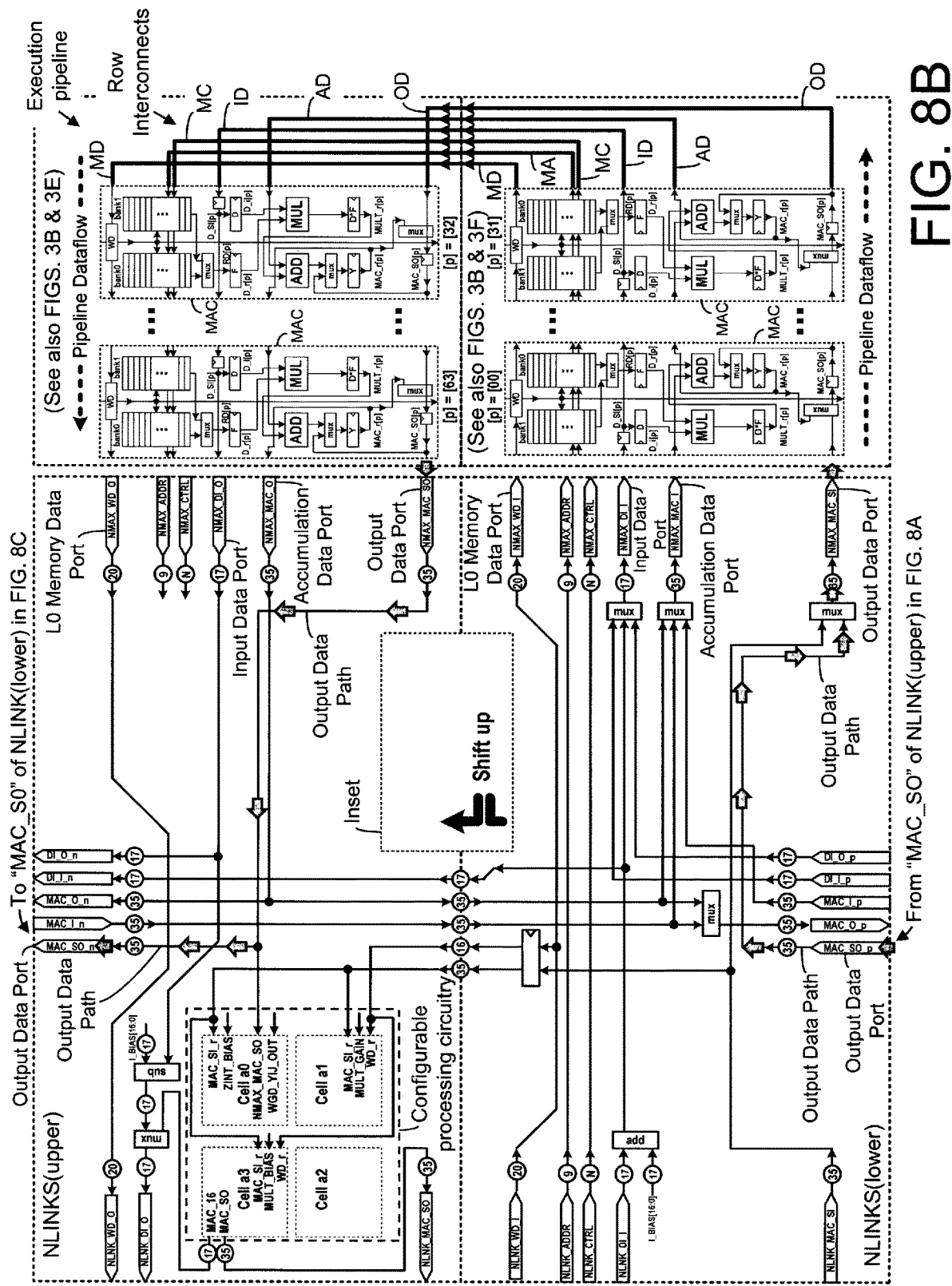
Figure 8C:
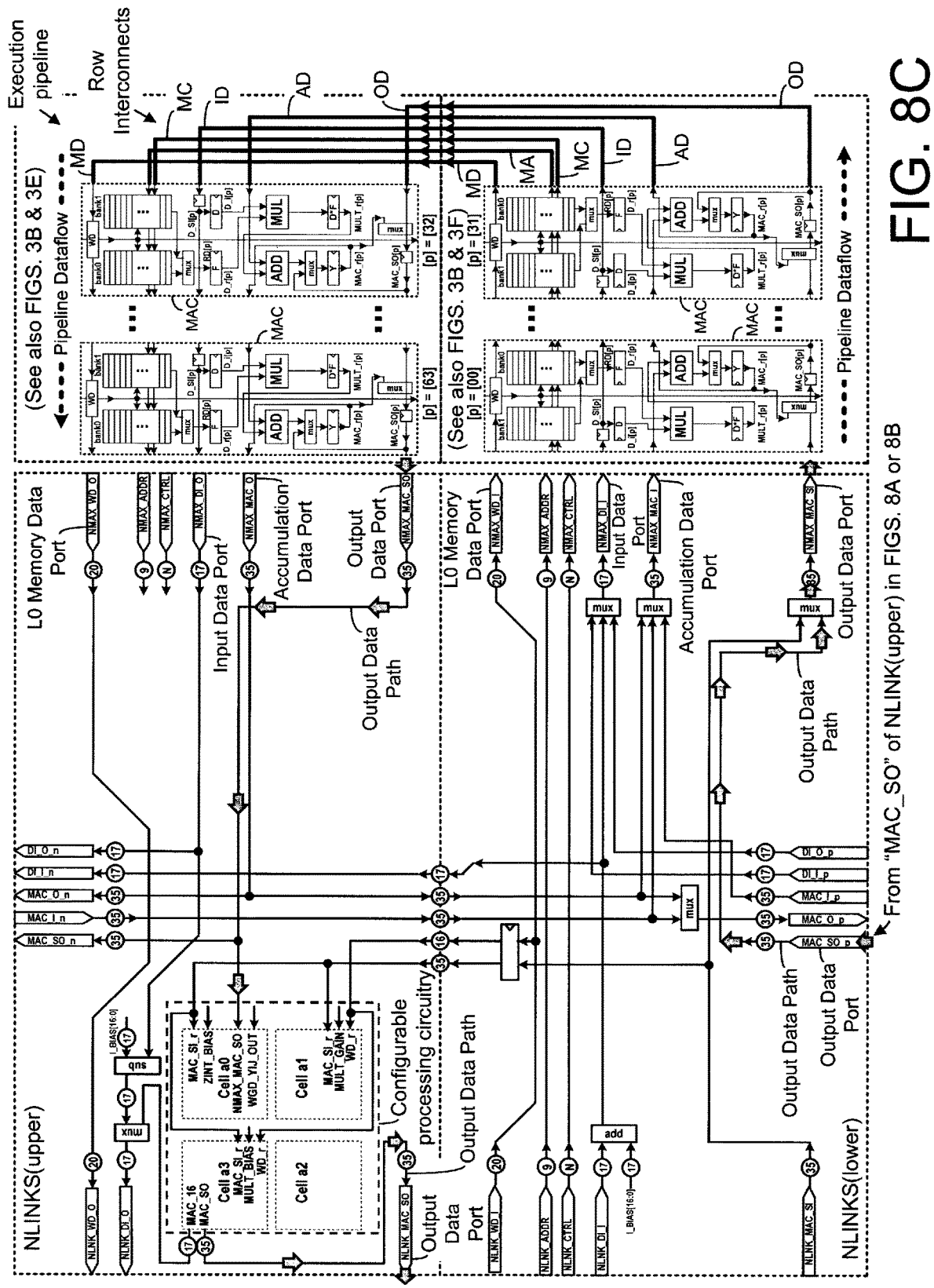
Figure 9:
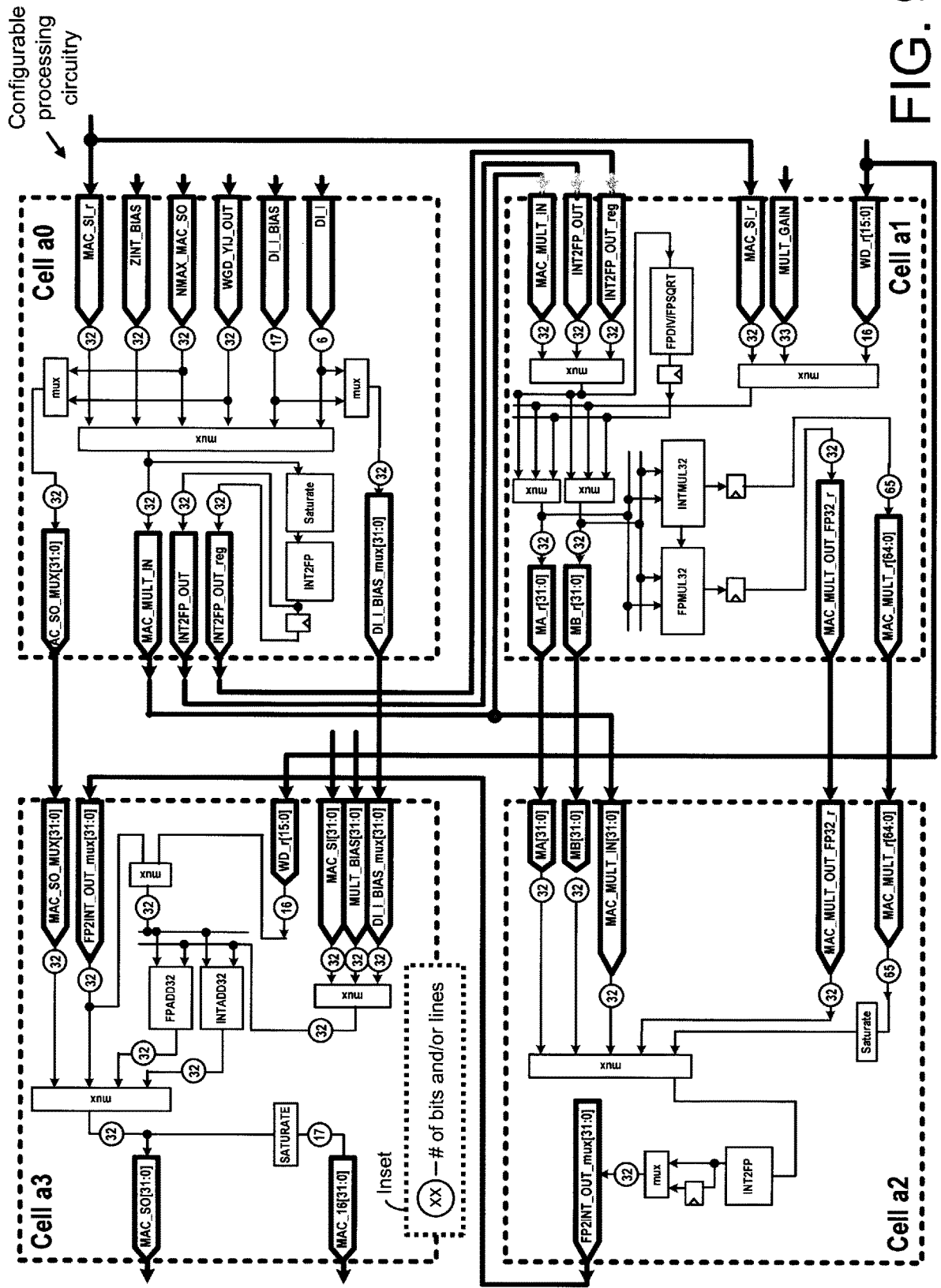

FIG. 1A is a schematic block diagram of a logical overview of an exemplary multiplier-accumulator execution pipeline connected in a linear pipeline configuration, according to one or more aspects of the present inventions, wherein the multiplier-accumulator execution pipeline includes multiplier-accumulator circuitry ("MAC"), which is illustrated in block diagram form; notably, the multiplier-accumulator circuitry includes one or more of the multiplier-accumulator circuits (although the individual multiplier-accumulator circuits are not specifically illustrated here); the plurality of MACs are is illustrated in block diagram form; an exemplary multiplier-accumulator circuit is illustrated in schematic block diagram form in Inset A; notably, in this exemplary embodiment, "m" (e.g., 64 in one illustrative embodiment) multiplier-accumulator circuits are connected in a linear execution pipeline to operate concurrently whereby the processing circuits perform m×m (e.g., 64×64) multiply-accumulate operations in each m (e.g., 64) cycle interval (e.g., a cycle may be nominally 1 ns); notably, each m (e.g., 64) cycle interval processes a Dd/Yd (depth) column of input and output pixels/data at a particular (i,j) location (the indexes for the width Dw/Yw and height Dh/Yh dimensions of this exemplary embodiment—Dw=512, Dh=256, and Dd=128, and the Yw=512, Yh=256, and Yd=64) wherein the r (e.g., 64) cycle execution interval is repeated for each of the Dw*Dh depth columns for this stage; in addition, in one embodiment, the filter weights or weight data are loaded into memory (e.g., L1/L0 SRAM memories) before the multiplier-accumulator circuitry starts processing (see, e.g., the '345 and '306 applications); in one embodiment, the L1 SRAM memory may provide data to a plurality of L0 SRAM memories, wherein each linear pipeline (like that illustrated in block diagram form in FIG. 2D) is associated with a dedicated L0 SRAM memory—which is one of the plurality of L0 SRAM memories associated with the L1 SRAM memory (which, in one embodiment, is dedicated to one of a plurality of clusters);

FIG. 1B is a high-level block diagram layout of an integrated circuit or a portion of an integrated circuit (which may be referred to, at times, as an X1 component) including a plurality of multi-bit MAC execution pipelines having a plurality of multiplier-accumulator circuits each of which implement multiply and accumulate operations, according to certain aspects of the present inventions; the multi-bit MAC execution pipelines and/or the plurality of multiplier-accumulator circuits may be configured to implement one or more processing architectures or techniques (singly or in combination with one or more X1 components); in this illustrative embodiment, the multi-bit MAC execution pipelines are organized into clusters (in this illustrative embodiment, four clusters wherein each cluster includes a plurality of multi-bit MAC execution pipelines (in this illustrative embodiment, each cluster includes 16, 64-MAC execution pipelines (each MAC may also be individually referred to below as a MAC circuit or MAC processor)); in one embodiment, the plurality of multiplier-accumulator circuits are configurable or programmable (one-time or multiple times, e.g., at start-up and/or in situ) to implement one or more pipelining processing architectures or techniques (see, e.g., the expanded view of a portion of the high-level block diagram of FIG. 1B in the lower right is a single MAC execution pipeline (in the illustrative embodiment, including, e.g., 64 multiplier-accumulator circuits or MAC processors) which correlates to the schematic block diagram of a logical overview of an exemplary multiplier-accumulator circuitry arranged in a linear execution pipeline configuration—see FIG. 1A); the processing component in this illustrative embodiment includes memory (e.g., L2 memory, L1 memory and L0 memory (e.g., SRAM)), a bus interfaces (e.g., a PHY and/or GPIO) to facilitate communication with circuitry external to the component and memory (e.g., SRAM and DRAM) for storage and use by the circuitry of the component, and a plurality of switches/multiplexers which are electrically interconnected to form a switch interconnect network "Network-on-Chip" ("NOC") to facilitate interconnecting the clusters of multiplier-accumulator circuits of the MAC execution pipelines; in one embodiment, the NOC includes a switch interconnect network (e.g., a mixed-mode interconnect network (i.e., a hierarchical switch matrix interconnect network and a mesh, torus or the like interconnect network (hereinafter collectively "mesh network" or "mesh interconnect network")), associated data storage elements, input pins and/or look-up tables (LUTs) that, when programmed, determine the operation of the switches/multiplexers; in one embodiment, one or more (or all) of the clusters includes one or more computing elements (e.g., a plurality of multiplier-accumulator circuitry—labeled as "NMAX Rows"—see, e.g., the '345 and '306 applications); notably, in one embodiment, each MAC execution pipeline (which, in one embodiment, consists of a plurality of serially interconnected multiplier-accumulator circuits) is connected to an associated L0 memory (e.g., SRAM memory) that is dedicated to that processing pipeline; the associated L0 memory stores filter weights used by the multiplier circuitry of each multiplier-accumulator circuit of that particular MAC processing pipeline in performance of the multiply operations, wherein each MAC processing pipeline of a given cluster is connected to an associated L0 memory (which, in one embodiment, is dedicated to the multiplier-accumulator circuits of that MAC processing pipeline); a plurality (e.g., 16) MAC execution pipelines of a MAC cluster (and, in particular, the L0 memory of each MAC execution pipeline of the cluster) is coupled to an associated L1 memory (e.g., SRAM memory); here, the L1 memory is connected to and shared by each of the MAC execution pipelines of the cluster to receive filter weights to be stored in the L0 memory associated with each MAC execution pipeline of the cluster; in one embodiment, the L1 memory is associated with and dedicated to the plurality of pipelines of the MAC cluster; that is, in one embodiment, the L1 memory connect to and provide data to a plurality of L0 memories, wherein each MAC pipeline (like that illustrated in block diagram form in FIG. 2D) is associated with a dedicated L0 memory—which is one of the plurality of L0 SRAM memories associated with the L1 memory (which, in one embodiment, is associated with and dedicated to one of the plurality of clusters of the X1 component); notably, the shift-in and shift-out paths of each 64-MAC execution pipeline is coupled to L2 memory (e.g., SRAM memory) wherein the L2 memory also couples to the L1 memory and L0 memory; the NOC couples the L2 memory to the PHY (physical interface) which may connect to L3 memory (e.g., external DRAM); the NOC also couples to a PCIe or PHY which, in turn, may provide interconnection to or communication with circuitry external to the X1 processing component (e.g., an external processor, such as a host processor); the NOC, in one embodiment, may also connect a plurality of X1 components (e.g., via GPIO input/output PHYs) which allow multiple X1 components to process related data (e.g., image data), as discussed herein, in accordance with one or more aspects of the present inventions;

FIGS. 2A and 2B illustrate schematic block diagrams of exemplary memory architectures for storage of the filter weights wherein the multiplier circuitry of each multiplier-accumulator circuit is connected to memory to receive the filter weights to perform the multiply operations, according to one or more aspects of the present inventions; in one embodiment, each memory is associated with the multiplier circuitry of one multiplier-accumulator circuit wherein each multiplier-accumulator circuit includes a dedicated memory (e.g., SRAM) to locally store the filter weights (often referred to as L0 memory); where the exemplary memory architecture includes a plurality of memories which are selectively output to the multiplier circuitry of the associated multiplier-accumulator circuit, memory output selection circuitry (e.g., a multiplexer) may connect the appropriate memory (which stores the filter weights associated with the data that is currently being processed by the multiplier-accumulator circuit); in one exemplary embodiment, the memory includes a plurality of separately addressable memories wherein the read/write operations of each memory are separately controllable relative to the read/write operations of the other memory of the plurality of memories (see FIG. 2B); as such, data (i.e., filter weights) may be read from a first memory (i.e., a read operation) while data (i.e., filter weights) may be concurrently written to a second memory (i.e., a write operation); the output of only one of the memories is provided to the multiplier circuitry of the associated multiplier-accumulator circuit at a given time (e.g., for a set of filter weights associated with a set of data under processing)—see, e.g., memory output selection circuitry (e.g., a multiplexer) in FIG. 2B;

FIG. 2C illustrates a schematic block diagram of an exemplary memory architecture to store filter weights or coefficients used by multiplier circuitry of an associated multiplier-accumulator circuit, according to one or more aspects of the present inventions; in this embodiment, the memory (e.g., SRAM) includes a plurality of memory banks (in this illustrative embodiment, 2) and is dedicated to and associated with one of the plurality of multiplier-accumulator circuits to locally store the filter weights (again, often referred to as L0 memory); the memory banks are separately addressable memory wherein the read/write operations of each memory bank are separately controllable relative to other memory bank such that, for example, memory banks 1 may be read from (wherein the filter weight data are applied to the multiplier circuitry of the associated MAC) while memory bank 0 is being written to (i.e., storing filter weights of another set of filter weights); in operation, the data from only one of the banks is output to the multiplier circuitry of an associated multiplier-accumulator circuit at a given time (e.g., for a set of filter weights associated with a set of data under processing) via the multiplexer which is controlled by a memory bank select control signal; notably, in one embodiment, the write data bus may be connected to another memory (e.g., L1 memory—which may be SRAM) which provides sets of filter weights to store in the appropriate/selected memory bank; in operation, in one embodiment, the multiplier-accumulator circuit may ping-pong read operations, on a set of multiply operations basis, between the two memory banks to reduce or minimize the temporal delay or overhead stemming from the availability of "new" filter weights or values to the multiplier-accumulator circuits during the data processing performed by the multiplier-accumulator circuit; similarly, the control/configure circuitry may ping-pong write operations, on a set of multiply operations basis, between the two "local" memory banks associated with the multiplier-accumulator circuit so that while filter weights are being read from one of the memory banks (e.g., memory bank 1), the other memory bank (e.g., memory bank 0) is receiving and storing the next set of filter weights to be used by the multiplier-accumulator circuit during data processing of the next set of data; as reflected in FIG. 1B, in one embodiment, the L1 memory may be associated with the L0 memory banks of a plurality of MACs (e.g., the MACs of the cluster associated with the L1 memory;

FIG. 2D illustrates a schematic block diagram of the exemplary memory architecture of FIG. 2C in conjunction with a schematic block diagram of a logical overview of a linear pipeline configuration of an exemplary multiplier-accumulator execution or processing pipeline (see FIGS. 1A and 1B) having a plurality of MAC processors, wherein each MAC processor includes a multiplier-accumulator circuit having a multiplier circuit ("MUL") to perform/implement the multiply operations and accumulator circuit ("ADD") to perform/implement the accumulate operations, according to one or more aspects of the present inventions; moreover, each MAC Processor includes two memory banks (e.g., SRAM memory such as L0 memory) that are dedicated to the multiplier-accumulator circuit to store filter weights used by the multiplier circuitry of the associated multiplier-accumulator circuit; in this illustrative embodiment, the MAC execution or processing pipeline includes n multiplier-accumulator processing circuits (e.g., n=64), each circuit, in one embodiment, including two dedicated memory banks to store at least two different sets of filter weights—each set of filter weights associated with and used in processing a set of data) wherein each memory bank may be alternately read for use in processing a given set of associated data and alternately written after processing the given set of associated data; notably, in the logical overview of a linear pipeline configuration of this exemplary MAC execution or processing pipeline, n processing (MAC) circuits (e.g., n=64) are connected in the execution pipeline and operate concurrently whereby the multiplier-accumulator processing circuits 64×64 multiply-accumulate operations in each 64 cycle interval (here, a cycle may be, e.g., nominally 1 ns); thereafter, next 64 input pixels/data are shifted-in and the previous output pixels/data are shifted-out during the same 64 cycle intervals; each 64 cycle interval processes a Dd/Yd (depth) column of input and output pixels/data at a particular (i,j) location (the indexes for the width Dw/Yw and height Dh/Yh dimensions); the 64 cycle execution interval is repeated for each of the Dw*Dh depth columns for this stage; the filter weights or weight data are loaded into memory (e.g., the L1 and/or L0 (i.e., L1/L0) SRAM memories) from, for example, an external memory or processor before the stage processing started (see, e.g., the '345 and '306 applications); notably, the individual MACs may, at times, be referred to herein as MAC processors, MAC circuits, or MAC processing circuits;

FIG. 2E illustrates schematic block diagrams of an exemplary multiplier-accumulator execution or processing pipelines including a plurality of serially connected MACs wherein the output of each accumulator circuit ("ADD") of the MACs is coupled to the input of the immediately following accumulator circuit ("ADD") of the MACs of the linear processing pipeline wherein, in this way, accumulation values ("Y") generated by the MACs (see, MAC_r[p]) are rotated, transferred or moved (e.g., before, during or at the completion of each execution cycle of the execution sequence (i.e., set of associated execution cycles)) through the plurality of serially connected MACs of the pipeline such that each accumulation value (see, MAC_r[p]—"Rotate current Y") generated by a MAC is output before, during or at the completion of each execution cycle to the immediately following MAC of the linear pipeline and employed in the accumulation operation of the accumulator circuit ("ADD") of that immediately following MAC, according to one or more aspects of the present inventions; notably, each MAC includes a multiplier circuit ("MUL") to perform/implement the multiply operations and accumulator circuit ("ADD") to perform/implement the accumulate operations, according to one or more aspects of the present inventions; in this exemplary embodiment, MAC processor may include or read from one memory bank (see FIG. 2A) or more of memory banks (see FIG. 2B; e.g., two SRAM memory banks—see FIG. 2C) that may be dedicated to the MAC of the MAC processing circuit to store filter weights used by the multiplier circuit of the associated MAC; as noted above, the individual MACs may, at times, be referred to herein as "MAC processors" or "MAC processing circuits"; notably, the linear processing pipeline, and the MACs that are incorporated in such pipeline, may be configured to rotate, transfer or move (before, during or at the completion of an execution cycle) the input data values (rather than the accumulation values—which are maintained, stored or held, in the particular MAC during each execution cycle of the execution sequence), as described and illustrated in U.S. Provisional Patent Application No. 63/156,263 "MAC Processing Pipelines, Circuitry to Configure Same, and Methods of Operating Same", filed Mar. 3, 2021; the '263 application is incorporated by reference herein in its entirety; here, in operation, after input or loading of the initial data input values into the MACs of the linear MAC processing pipeline, the input data values are rotated, transferred or moved, on a cycle-by-cycle basis, from one MAC of the linear pipeline to the immediately following MAC of the pipeline and employed in the multiply operation of the multiplier circuit of that next MAC of the processing pipeline as described and/or illustrated in the '263 application;

FIG. 3A illustrates a schematic block diagram of an exemplary circuit, connected to multiplier-accumulator circuitry, to configure and control the multiplier-accumulator circuitry (which includes a plurality of MACs interconnected in a serial/linear pipeline (in this illustrative embodiment, 64 MACs, multiplier-accumulator circuits or MAC processors)), according to aspects of the present inventions; in one embodiment, the circuit (referred to, at times, as "control/configure circuit", "NLINK", or "NLINK circuit") is associated with and dedicated to interface with a plurality of interconnected (e.g., serially) multiplier-accumulator circuits and/or one or more rows of interconnected (e.g., serially) multiplier-accumulator circuits; in one embodiment, an integrated circuit having one or more control/configure circuits interfaces with a plurality of multi-bit MAC execution pipelines, each pipeline including a plurality of interconnected (e.g., serially) multiplier-accumulator circuits (see, e.g., FIG. 1B), wherein each control/configure circuit controls one of the plurality of multi-bit MAC execution pipelines, according to certain aspects of the present inventions; in this illustrative embodiment (implementing one exemplary processing pipeline embodiment), (i) the L0 memory control, address and data signal paths in the NLINK circuit provide control, address and data signals, generated by logic circuitry (not illustrated), to the L0 memory in each MAC of the pipeline to manage or control memory operation during the execution sequence(s), (ii) the input data signal path in the NLINK circuit and MAC execution pipeline of this embodiment denotes the signal path of the input data to be processed, via the MACs, during the execution sequence(s), (iii) the accumulation data path in the NLINK circuit and execution pipeline of this embodiment denotes the ongoing/accumulating MAC accumulation totals generated by the MACs during the execution sequence(s), and (iv) the output data path in the NLINK circuit and MAC execution pipeline of this embodiment denotes the output data generated by execution sequence(s) (i.e., input data that was processed via the multiplier-accumulator circuits or MAC processors of the execution pipeline); the "row interconnects" connect two rows of serially connected MACs to form or provide one linear MAC pipeline wherein the signal lines: "OD" denote the output data path, "AD" denote the accumulation data path, "ID" denote the input data path, "MC" denotes L0 memory control path, "MA" denotes L0 memory address path, and "MD" denotes L0 memory address path; the circle with a number therein located in each data path indicates the number of bits and/or conductors or lines (e.g., data or control) of the particular path or port—see the Inset; for the avoidance of doubt, the block/data width, data path and/or port width set forth therein are merely exemplary and not limiting in any respect; notably, a "port" is a physical point of entry to/exit from the control/configure or NLINK circuit; all physical forms of entry to or exit from the control/configure or NLINK circuit are intended to fall within the scope of the present inventions (for example, a conductor or metal routing in/of an integrated circuit);

FIG. 3B illustrates the schematic block diagram of the exemplary embodiment of a MAC execution or processing pipeline illustrated in FIG. 3A;

FIGS. 3C-3F illustrate selected/specific portions, as indicated in FIG. 3A, of the schematic block diagram of the exemplary control/configure circuit and multiplier-accumulator circuitry (e.g., a plurality of MACs serially connected into a linear MAC processing pipeline) of FIG. 3A, in accordance with an embodiment of certain aspects of the present inventions; the insets in FIGS. 3C and 3D provide a general key of the (i) input data flow in the one MAC pipeline and one associated NLINK circuit (("Shift of data input DI_x within single pipeline" refers to the path of the input data), (ii) the multiply and accumulate operation flow in one the MAC pipeline and one associated NLINK circuit ("Shift MAC_x within single pipeline" refers to the path of the accumulation data of the multiply-accumulate operation), and (iii) the output data flow of the accumulation operation with prior results in one MAC pipeline in connection with associated NLINK circuit ("Shift MAC_Sx within single pipeline" refers to the output data path corresponding to the accumulation operation with prior results)); as mentioned above, the "row interconnects" connect the two rows of serially connected MACs (to form one linear MAC pipeline (comprised of the MACs of the two serially connected rows of MACs) having "n" MAC circuits, wherein in this illustrative embodiment, n=64); the signal lines of the row interconnects include: "OD" denote the output data path, "AD" denote the accumulation data path, "ID" denote the input data path, "MC" denotes L0 memory control path, "MA" denotes L0 memory address path, and "MD" denotes L0 memory address path; the circle with a number therein located in each data path indicates the number of bits and/or conductors or lines (e.g., data or control) of the particular path or port—see the "key" in the FIGS. 3C and 3D; for the avoidance of doubt, the block/data width, data path and/or port width set forth are merely exemplary and not limiting in any respect; notably, a "port" is a physical point of entry to/exit from the control/configure or NLINK circuit; all physical forms of entry to or exit from the control/configure or NLINK circuit are intended to fall within the scope of the present inventions (for example, a conductor or metal routing in/of an integrated circuit); again, a "port" is a physical point of entry to/exit from the control/configure or NLINK circuit; all physical forms of entry to or exit from the control/configure or NLINK circuit are intended to fall within the scope of the present inventions (for example, a conductor or metal routing in/of an integrated circuit);

FIG. 4 illustrates an exemplary embodiment of a plurality of control/configure circuits or NLINK circuits in conjunction with MAC pipelines wherein each NLINK circuit is connected (and, in one embodiment, dedicated) to an associated MAC pipeline (which includes a plurality of serially connected MACs), according to certain aspects of the present inventions; in one embodiment, the NLINK circuits are configurable to connect to one or more other NLINK circuits (wherein each NLINK circuit is associated with a plurality of MACs configured in one or more MAC pipelines), for example, to control, configure and connect a linear MAC execution or processing pipeline that is configured to perform, for example, multiply-accumulate operations; notably, in this illustrative embodiment, each control/configure (NLINK) circuit—MAC pipeline pair form a separate operable processing pipeline that is configured to perform, for example, multiply-accumulate processing according to certain aspects of the present inventions; in the exemplary embodiment, each control/configure circuit (labeled "NLINK") includes MAC_I/MAC_O ports to form a circular path (e.g., a ring path) for intermediate accumulation values to traverse through the plurality of MACs of the linear MAC execution pipeline (which includes a plurality of the connected (e.g., serially) multiply-accumulate circuits (labeled "MAC pipeline" and illustrated in block diagram depicting exemplary multiplier-accumulator circuitry (including, e.g., 64 MACs)—see FIGS. 1A and 1B); notably, the DI_I and MAC_SI ports will be read from memory (e.g., external memory such as L2 memory) and the data therefrom input into the MAC pipeline, and the MAC_SO port may be used to read the data processed via the MAC pipeline and thereafter and written to an external memory (e.g., external memory such as L2 memory); notably, as mentioned above, a "port" is a physical point of entry to/exit from the control/configure or NLINK circuit; all physical forms of entry to or exit from the control/configure or NLINK circuit are intended to fall within the scope of the present inventions (for example, a conductor or metal routing in/of an integrated circuit);

FIGS. 5A-5C illustrate different signal paths of an exemplary interconnect architecture of a plurality of control/configure or NLINK circuits connected in series, wherein each NLINK circuit connected (and, in one embodiment, dedicated) to an associated multiplier-accumulator circuit pipeline which, when the control/configure or NLINK circuits are connected, is a portion of a composite/larger linear MAC pipeline that is formed by serially connected MACs associated with each of the serially connected of the illustrative pipeline architecture, according to certain aspects of the present inventions, wherein FIG. 5A illustrates an exemplary interconnect architecture of a plurality of control/configure or NLINK circuits connected in series to form a single shifting data path for the input data (DI) operand that traverse through the plurality of processing circuitry in a cluster (or portion thereof), according to certain aspects of the present inventions; here, the NLINK circuits are configured to connect to one or more other NLINK circuits via the DI_O and DI_I ports of the control/configure or NLINK circuit to form a single shifting chain of a processing pipeline wherein, each control/configure or NLINK circuit connected (and, in one embodiment, dedicated) to a plurality of associated multiplier-accumulator circuits; FIG. 5B illustrates an exemplary interconnect architecture of a plurality of control/configure or NLINK circuits connected in series to form a circular shifting data path (e.g., a ring path) for intermediate accumulation values to traverse through the plurality of processing circuitry in a cluster (or portion thereof), according to certain aspects of the present inventions; here, the NLINK circuits are configured to connect to one or more other NLINK circuits via the MAC_I and MAC_O ports of the control/configure or NLINK circuit to form the circular shifting chain of a processing pipeline wherein, each control/configure or NLINK circuit connected (and, in one embodiment, dedicated) to a plurality of associated multiplier-accumulator circuits; and FIG. 5C illustrates an exemplary interconnect architecture of a plurality of control/configure or NLINK circuits connected in series to form a shifting data path for final accumulation values to traverse through the plurality of processing circuitry in a cluster (or portion thereof), according to certain aspects of the present inventions; here, the NLINK circuits are configured to connect to one or more other NLINK circuits via the MAC_SI and MAC_SO ports of the control/configure or NLINK circuit to form the shifting chain of a processing pipeline wherein, each control/configure or NLINK circuit connected (and, in one embodiment, dedicated) to a plurality of associated multiplier-accumulator circuits; notably, many of the connections, signals and signal paths/lines between the control/configure or NLINK circuits in FIGS. 5A-5C have been omitted for purposes of clarity;

FIGS. 6A-6C illustrate more detailed schematic block diagram of exemplary control/configure circuits or NLINK circuits configured to route the input data DI_I and DI_O between a plurality of NLINK circuits, as illustrated in FIG. 5A, to form a single shifting chain of the input data DI operand that traverses the processing pipeline of the plurality (here, 64) of multiplier-accumulator circuits or MAC processors (in the illustrated embodiment, organized into a plurality of two associated rows of interconnected (e.g., serially) multiplier-accumulator circuits) wherein each of the two associated rows of interconnected (e.g., serially) multiplier-accumulator circuits are associated with a control/configure circuit or NLINK circuit, according to certain aspects of the present inventions; in this illustrative embodiment, one of the control/configure or NLINK circuits (see FIG. 6A), which may be a "bottom", "end" or "edge" NLINK circuit (see NLINK A in FIG. 5A of the overall, complete or composite pipeline—which includes a plurality of NLINK circuits and associated pipelines) of the overall, complete or composite pipeline—which includes a plurality of NLINK circuits and associated pipelines) is configured to receive input data from, for example, memory (via the DI_I port) and route such data to the processing pipelines associated therewith to the DI_O port in an NLINK circuit to connect to (and output data to) the DI_I signal and port in an adjacent NLINK circuit (for example, (see NLINK B in FIG. 5A of the overall, complete or composite pipeline—which includes a plurality of NLINK circuits and associated pipelines) and/or the DI_I signal in an NLINK circuit to connect to (and input data from) the DI_O signal and port in an adjacent NLINK circuit (here, "below"—illustrated in FIG. 5A); each adjacent NLINK circuit is associated with and dedicated to a different plurality of multiplier-accumulator circuits or MAC processors (for example, which are organized into two rows of interconnected (e.g., serially) multiplier-accumulator circuits and are disposed adjacent thereto; in this illustrative embodiment, one or more (or all) NLINK circuit that are interior to the end or edge NLINK circuit (of the overall, joined, combined or complete pipeline—which includes a plurality of NLINK circuits and associated pipelines—see FIG. 5A) is/are configured to connect DI_O signal and port in an adjacent NLINK circuit and route the signal path to and through the execution pipeline associated therewith to the DI_O port in that NLINK circuit to connect to (and output data to) the DI_I signal and port in an adjacent NLINK circuit—according to FIG. 6B; notably, the inset in NLINK circuit illustrated in FIG. 6B provides a general key of the input data flow or path through the NLINK circuits and associated MAC pipeline ("Shift-up" refers to the path of the input data to, for example, the adjacent NLINK circuit) to another/different NLINK circuit and its associated MAC pipeline which, in this embodiment, is adjacent thereto; in this illustrative embodiment, one of the control/configure circuit or NLINK circuits (see FIG. 6C), which may be a "top" or a second "end" or "edge" NLINK circuit (see NLINK X in FIG. 5A of the overall joined, combined or complete pipeline—which includes a plurality of NLINK circuits and associated pipelines—see FIG. 5A), is configured to receive data from another NLINK circuit (see FIGS. 5A and 6B) and route such data to the processing pipelines associated therewith to the DI_O port in an NLINK circuit to connect and output data to, for example, memory and port in an adjacent NLINK circuit (here, the NLINK disposed above—see FIG. 5A); notably, the second end or edge NLINK circuit is relative to the first end or edge NLINK circuit of FIG. 6A; as noted above, a "port" (e.g., the DI_I port, DI_O port) is a physical point of entry to and exit from the control/configure or NLINK circuit; the circle with a number therein located in data paths (see Inset in FIG. 6A) indicates the number of bits and/or conductors or lines (e.g., data or control) of the particular path or port in one exemplary embodiment; for the avoidance of doubt, the block/data width, data path and/or port width set forth therein are merely exemplary and not limiting in any respect; notably, many other connections, signal paths, and signals between the NLINK circuits (and between an NLINK circuit and its associated execution pipeline) have been omitted for purposes of clarity (e.g., memory address, data and control paths, accumulation data path, and output data path); several of such connections, signal paths, and signals are, however, illustrated in FIG. 3A-3F; notably, however, in one embodiment, certain connections, signal paths, and signals are not modified (relative to FIGS. 3A-3F) to implement the pipeline architecture of this exemplary embodiment (e.g., memory address, data and control paths, accumulation data path, and output data path);

FIG. 7A-7C illustrate more detailed schematic block diagrams of exemplary control/configure circuits or NLINK circuits configured to route MAC_I and MAC_O between a plurality of NLINK circuits, as illustrated in FIG. 5B, to form a circular shifting path (e.g., a ring) for intermediate accumulation values that traverses the processing pipeline of a plurality (here, 64) of multiplier-accumulator circuits or MAC processors (here, organized into two rows of interconnected (e.g., serially) multiplier-accumulator circuits) which are associated with each control/configure circuit or NLINK circuit incorporated into the overall, joined, combined or complete pipeline formed via connection of the MAC circuits of each MAC processor associated with the interconnected NLINK circuits (see FIG. 5B), according to certain aspects of the present inventions; in this illustrative embodiment, the accumulation data path illustrates the circuit configuration of the NLINK circuits to provide connection for/between the plurality of NLINK circuits (through the associated MAC processing pipelines associated with such NLINK circuits) to implement the circular shifting path (e.g., a ring) for intermediate accumulation values; specifically, in this illustrative embodiment, the control/configure circuit or NLINK circuits (see FIG. 7A), which may be a "bottom" or a first end or edge NLINK circuit (e.g., NLINK A—of the overall, complete or composite pipeline—which includes a plurality of NLINK circuits and associated pipelines—see FIG. 5B) which is configured to receive accumulation data from NLINK "X", via the MAC_I port) and route such data to the processing pipeline associated therewith to the MAC_O port in NLINK circuit A to connect to (and output data to) the MAC_I port of an adjacent NLINK circuit (e.g., NLINK B, the NLINK disposed "above"—see FIGS. 5B and 7B); each adjacent NLINK circuit is associated with a different plurality of multiplier-accumulator circuits or MAC processors (for example, which are organized into two rows of interconnected (e.g., serially) multiplier-accumulator circuits and are disposed adjacent to (here, above); in this illustrative embodiment, one or more (or all) NLINK circuit that are interior to the end or edge NLINK circuit (of the overall, joined, combined or complete pipeline—which includes a plurality of NLINK circuits and associated pipelines—see FIG. 5B) is/are configured to connect MAC_I and MAC_O ports in an adjacent NLINK circuit and route the accumulation data signal path to and through the execution pipeline associated therewith to the MAC_O port in that NLINK circuit to connect to (and output data to) the MAC_O signal and port in an adjacent NLINK circuit (see FIG. 7B); in this illustrative embodiment, one of the control/configure circuit or NLINK circuits (NLINK X—see FIGS. 5B and 7B), which may be a top, end or edge NLINK circuit (of the overall, joined, combined or complete pipeline—which includes a plurality of NLINK circuits and associated pipelines) is configured to receive data from the NLINK circuit below (see FIG. 7B) and route such data to the processing pipelines associated therewith to the MAC_O port in an NLINK circuit to connect and output data to an adjacent NLINK circuit (here, the NLINK disposed below—see FIG. 5B) to complete the circular shifting path; thus, the plurality of NLINKS and associated MAC pipelines are interconnected to form a "ring" in connection with the accumulation data path via the MAC_O ports and port and the MAC_I ports and the accumulation data paths in an NLINK circuits (see FIG. 5B); notably, each NLINK circuit is associated with a different plurality of multiplier-accumulator circuits or MAC processors (for example, which are organized into two rows of interconnected (e.g., serially) multiplier-accumulator circuits) which may be incorporated into the overall, joined, combined or complete pipeline via configuration of the NLINK circuit; notably, the inset in NLINK circuit illustrated in FIG. 7B provides a general key of the multiply and accumulate operation data flow in and out of a single MAC pipeline ("Shift up" path of the accumulation data of the multiply-accumulate operation) and associated NLINK from a preceding NLINK (and its associated MAC pipeline) and to a following NLINK (and its associated MAC pipeline); the circle with a number therein located in data paths indicates the number of bits and/or conductors or lines (e.g., data or control) of the particular path or port in one exemplary embodiment; for the avoidance of doubt, the block/data width, data path and/or port width set forth are merely exemplary and not limiting in any respect; as noted, a "port" (e.g., the MAC_I port, MAC_O port) is a physical point of entry to and exit from the control/configure or NLINK circuit; notably, many other connections, signal paths, and signals between the control/configure or NLINK circuits (and between an NLINK circuit and its associated execution pipeline) have been omitted for purposes of clarity (e.g., memory address, data and control paths, input data path, and output data path); certain connections, signal paths, and signals (which, in one embodiment, are not modified in order to implement the architecture of this embodiment) are, however, illustrated in FIG. 3A-3F (e.g., memory address, data and control paths, input data path, and/or output data path);

FIGS. 8A-8C illustrates a more detailed schematic block diagram of exemplary control/configure circuits or NLINK circuits configured to route MAC_SI and MAC_SO signals between a plurality of NLINK circuits, as illustrated in FIG. 5C, to form a shifting path (e.g., a ring) for final accumulation values that traverses the processing pipeline of the plurality (here, 64) of multiplier-accumulator circuits or MAC data processors (in the illustrated embodiment, organized into a plurality of two associated rows of interconnected (e.g., serially) multiplier-accumulator circuits) wherein each of the two associated rows of interconnected (e.g., serially) multiplier-accumulator circuits are associated with and dedicated to a control/configure circuit or NLINK circuit, according to certain aspects of the present inventions; in this illustrative embodiment, one of the control/configure circuit or NLINK circuits (see FIG. 8A), which may be a bottom, end or edge NLINK circuit (see NLINK A in FIG. 5C of the overall, complete or composite pipeline—which includes a plurality of NLINK circuits and associated pipelines) is configured to receive data from memory (via the MAC_SI port) and route such data to the processing pipelines associated therewith to the MAC_SO port in an NLINK circuit to connect to (and output data to) the MAC_SO signal and port in an adjacent NLINK circuit (e.g., see NLINK B in FIG. 5C of the overall, complete or composite pipeline) and/or the MAC_SO port in an NLINK circuit to connect to (and input data from) the MAC_SO port in an adjacent NLINK circuit (here, the NLINK disposed, below—see FIG. 5C); each adjacent NLINK circuit is associated with a different plurality of multiplier-accumulator circuits or MAC processors (for example, which are organized into two rows of interconnected (e.g., serially) multiplier-accumulator circuits and are disposed adjacent to (here, above); in this illustrative embodiment, one or more (or all) NLINK circuit that are interior to the end or edge NLINK circuit (of the overall, joined, combined or complete pipeline—which includes a plurality of NLINK circuits and associated pipelines—see FIG. 5C) is/are configured to connect MAC_SI and MAC_SO ports in an adjacent NLINK circuit and route the signal path to and through the execution pipeline associated therewith to the MAC_SO port in that NLINK circuit to connect to (and output data to) the MAC_SO signal and port in an adjacent NLINK circuit (see FIG. 8B); notably, the inset in NLINK circuit illustrated in FIG. 8B provides a general key of the data flow through the NLINK circuits and associated pipeline ("Shift-up" refers to the output data path of the accumulation operation with prior results in a MAC pipeline and its associated NLINK circuit from a preceding NLINK (and its associated MAC pipeline) and to a following NLINK (and its associated MAC pipeline) which, in this embodiment, is adjacent thereto; in this illustrative embodiment, one of the control/configure circuit or NLINK circuits (see FIG. 8C), which may be a "top" or second end or edge NLINK circuit (see NLINK X in FIG. 5C of the overall, complete or composite pipeline—which includes a plurality of NLINK circuits and associated pipelines), is configured to receive data from another NLINK circuit (see FIG. 8B) and route such data to the processing pipelines associated therewith to the MAC_SO port in an NLINK circuit to connect and output data to, for example, memory and port in an adjacent NLINK circuit (here, the NLINK disposed above—see FIG. 5C); notably, many other connections, signal paths, and signals between the control/configure or NLINK circuits (and between an NLINK circuit and its associated execution pipeline) have been omitted for purposes of clarity (e.g., memory address, data and control paths, input data path, and accumulation data path); certain such connections, signal paths, and signals (which, in one embodiment, are not modified in order to implement the architecture of this embodiment—e.g., (e.g., memory address, data and control paths, input data path, and accumulation data path) are, however, illustrated in FIG. 3A-3F; the circle with a number therein located in data paths (see Inset in FIG. 8A) indicates the number of bits and/or conductors or lines (e.g., data or control) of the particular path or port in one exemplary embodiment; for the avoidance of doubt, the block/data width, data path and/or port width set forth therein are merely exemplary and not limiting in any respect; as noted above, a "port" (e.g., the MAC_SI port, MAC_SO port) is a physical point of entry to and exit from the control/configure or NLINK circuit; all physical forms of entry to or exit from the control/configure or NLINK circuit are intended to fall within the scope of the present inventions (for example, a conductor or metal routing in/of an integrated circuit); and FIG. 9 illustrates an exemplary configurable processing circuitry to implement additional data processing operations including, for example, pre-processing of data operands and post-processing of accumulation results, in accordance with an embodiment of certain aspects of the present inventions; notably, the configurable processing circuit may be organized into four circuit blocks (a0, a1, a2, a3) wherein each circuit block of the configurable processing circuitry may be configured to perform one or more operations; moreover, the configurable processing circuitry includes additional programmable/configurable circuitry to establish, configure or "steer" the data path to implement one or more pre-processing operations (e.g., pre-process the data operands) and/or one or more post-processing operations (e.g., further/subsequent processing of the accumulation results from the MAC processing pipeline (which may be the joined, combined or complete MAC processing pipeline where a plurality of smaller MAC processing pipeline are joined or combined via configuration of NLINK circuits associated with the smaller MAC processing pipelines—see FIGS. 5A-5C); the configurable processing circuitry may be one-time programmable (e.g., at manufacture via, e.g., a programmable fuse array) or multiple-times programmable (including, e.g., at start-up/power-up, initialization, and/or in situ (i.e., during operation of the integrated circuit)); in one embodiment, the configuration is programmed before operation or implementation of an execution sequence of the processing pipeline via multiplexers to establish a data path into one or more selected processing circuits or to by-pass such circuits; notably, the configurable processing circuitry, and connections thereto, are superimposed (for illustration purposes) in the detailed schematic block diagram of an exemplary configuration of the control/configure circuit or NLINK circuit illustrated in FIGS. 3A, 3C, 6A-6C, 7 and 8A-8C (see, the left side of "NLINK (upper)" section of each exemplary configuration of the control/configure circuit or NLINK circuit); in one embodiment, the configurable processing circuitry is accessible to any (or all) of the NLINK circuits, for example, via the interconnect network (see, FIG. 1B) wherein the interconnect network is configurable to connect the configurable processing circuitry to one or more NLINK circuits and the MAC processing pipelines associated therewith; the circle with a number therein located in signal paths indicates the number of bits and/or conductors or lines (e.g., data) of the particular path or port in one exemplary embodiment; for the avoidance of doubt, the block/data width, data path or port width set forth therein is merely exemplary and not limiting in any respect.

As stated above, the pseudo-code, operations, configurations, block/data width, data path width, bandwidths, data lengths, values, processes and/or algorithms described and/or illustrated in the FIGURES are exemplary and the inventions hereof are not limited to any particular or exemplary circuit, logical, block, functional and/or physical diagrams, number of multiplier-accumulator circuits employed in an execution pipeline, number of execution pipelines employed in a particular processing configuration/architecture, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams. Moreover, although the illustrative/exemplary embodiments include a plurality of memories (e.g., L3 memory, L2 memory, L1 memory, L0 memory) which are assigned, allocated and/or used to store certain data (e.g., filter weights) and/or in certain organizations. Indeed, the organizations of the memories may be changed wherein one or more of memories may be added, and/or one or more memories may be omitted and/or combined/consolidated with other memories—for example, (i) the L3 memory or L2 memory and/or (ii) the L1 memory or L0 memory.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed or illustrated separately herein.

DETAILED DESCRIPTION

In a first aspect, the present inventions are directed to circuitry to configure and control multiplier-accumulator circuitry (and methods of operating and configuring such circuitry) including a plurality of multiplier-accumulator execution or processing pipelines. The circuitry of this aspect of the inventions configures (e.g., one-time or more than one-time programmable) and controls the multiplier-accumulator circuitry to implement one or more execution or processing pipelines to process data, for example, in parallel or concurrently. In one embodiment, the control/configure circuit controls the loading of filter weights into memory employed by the multiplier-accumulator circuitry to implement multiplication operations. In this regard, the control/configure circuit may facilitate or control writing filter weights or values to the plurality of multiplier-accumulator circuits and storing such filter weights in memory to be accessed by the circuits to perform the multiply operations. For example, the control/configure circuit may connect the plurality of multiplier-accumulator circuits (or rows/banks of interconnected (in series) multiplier-accumulator circuits) to memory to facilitate storing filter weights in a "local" memory accessible by the multiplier-accumulator circuits. With reference to FIG. 2A, in one embodiment, each of the multiplier-accumulator circuits includes "local" memory (e.g., SRAM or registers) to "locally" store the filter weights or values for use in connection with the multiply operations of the multiplier circuitry of the associated MAC. In this regard, the memory connects and outputs filter weights/values to the multiplier circuitry of the associated MAC. Notably, in one embodiment, each "local" memory may be dedicated to the associated MAC.

With reference to FIG. 2B, in one embodiment, each multiplier-accumulator circuit includes a plurality of "local" memory/register banks (e.g., Memory a—Memory x) to store a plurality of different sets of filter weights (each set of filter weights may be associated with a different set of data to be processed by the MAC). For example, with reference to FIGS. 2B and 2C, the plurality of "local" memory/register banks may include a first memory/register bank and a second memory/register bank to store two different sets of filter weights including a first set of filter weights for use in "current" multiply operations and a second set of filter weights for use in multiply operations immediately after the current multiply operations (i.e., immediately after completion of the "current" multiply operations which employ the first set of filter weights).

In operation, the multiplier-accumulator circuits may read the first filter weights from the first memory during a first set of multiply operations and, upon completion of the first set of multiply operations (associated with processing of a first set of data), read the second set of filter weights from the second memory in connection with a second set of multiply operations (associated with processing of a second set of data using the second set of filter weights). In this way, the multiplier-accumulator circuit may ping-pong read operations, on a set of multiply operations basis, between the plurality of "local" memory/register banks. That is, the multiplier-accumulator circuits may read/access the first set of filter weights (i.e., stored in a first "local" memory/register bank) for use in the current multiply operations in connection with processing a first set of input data and, upon completion, immediately read/access the next/second set of filter weights, which are stored in a second "local" memory/register bank, in connection with processing a second set of data. Here, because the second set of filter weights may be written to and stored in second memory/register bank during or before completion of the multiply operations using the first set of filter weights that are stored in the first memory/register bank, there is no delay or overhead time stemming from reading, access to and availability of next or second set of filter weights (stored in the second "local" memory/register bank) to the multiplier-accumulator circuits during the data processing (of, for example, a second set of input data) performed by the multiplier-accumulator circuits of the multiplier-accumulator execution or processing pipeline.

Notably, the memory output selection circuit (e.g., one or more multiplexers) may responsively control which (and when) memory/register bank of the plurality of memory/register banks is connected to the multiplier circuitry of the multiplier-accumulator circuit. In this way, the memory output selection circuit responsively controls the ping-pong read operations and the connection of the memory/register bank to the multiplier circuitry of the multiplier-accumulator circuit.

Moreover, the control/configure circuit may alternately write new or updated sets of filter weights to the plurality of "local" memory/register banks. For example, with continued reference to FIGS. 2B and 2C, the control/configure circuit may ping-pong write operations, on a set of multiply operations basis, between the two "local" memory/register banks associated with each multiplier-accumulator circuit of the multiplier-accumulator execution or processing pipeline. That is, during reading of a first set of filter weights or upon completion of a set of multiply operations using a first set of filter weights that is stored in a first memory/register bank, a new set of filter weights may be written (e.g., immediately written) to the first memory/register bank to be used in processing after the completion of the set of multiply operations using a second set of filter weights (i.e., the set of filter weights stored in the second "local" memory/register bank). Here, the control/configure circuit provides or writes the new/next set of filter weights into the first "local" memory/register bank while the multiplier-accumulator circuits perform the multiply operations using a second set of filter weights (which are stored in the second "local" memory/register). That new, next or third set of filter weights (which are stored in the first "local" memory/register bank associated with each multiplier-accumulator circuit) may overwrite the first set of filter weights. Moreover, the new, next or third set of filter weights are then available to the multiplier-accumulator circuits during or immediately after data processing (via the multiplier circuitry of the associated multiplier-accumulator circuit) is completed using the second set of filter weights or values that were stored in a second "local" memory/register bank. In this way, there is no delay or overhead time introduced into the multiplier-accumulator execution or processing pipeline due to writing, updating or providing "new" filter weights or values to the "local" memory/register banks to be used circuits during the data processing.

With reference to FIG. 2D, in one embodiment, a plurality of multiplier-accumulator circuits (e.g., n=64) are configured (via the control/configure circuitry) in a linear multiplier-accumulator execution or processing pipeline. In this embodiment, the MACs are associated with and connected to a plurality of "local" memory/register banks (which are associated with and dedicated to a particular MAC), to store a plurality of different sets of filter weights, to be employed in connection with the multiply operations associated with the processing of a given set of input data by the multiplier circuitry of the MAC. Here, each MAC Processor includes two memory/register banks (e.g., L0 such as SRAM). In this embodiment, the two memory/register banks are independent memory banks such that in each execution cycle, one of the banks for each MAC may be read (using the shared read address bus), placing the read data on an associated RD[p] signal line that is input into the multiplexer ("mux") while the other memory bank may be written to (with filter weights to be employed in the next execution cycle). The read data are moved/written into the F register (D_r[p]) to be used in the execution cycle. The F register (D_r[p]) is written with a new filter weights (Fkl value) for each execution cycle.

As noted above, during the execution cycle, the other memory/register bank (i.e., the bank that is not being read from during the execution cycle) is available to store filter weights via write operations (using a WA address bus that, in one embodiment, is shared/common between the memory/register banks). Here, write data (i.e., filter weight values) may be written into the memory bank not being accessed by the multiplier-accumulator circuit during the current processing operations. In one embodiment, filter weight data (e.g., the next set of filter weights to be used in processing) may be read from a larger memory (e.g., an L1 SRAM which is external to the MAC Processor) and subsequently stored in the memory/register bank (L0 SRAM) without interfering with the current/on-going set of execution cycles of the current processing operations.

Notably, with reference to FIGS. 2D and 2E, each MAC or MAC processor of the linear pipeline may employ or interface with a single memory/register bank embodiment (see, e.g., FIG. 2A), a two memory/register bank embodiment (see, e.g., FIG. 2C), or a more than two memory/register bank embodiment (see, e.g., FIG. 2B).

Regarding the execution cycle, with reference to FIGS. 2D and 2E, each multiplier-accumulator circuit (which may also be referred to as "processing element" or "MAC processor") includes the shifting chain (D_SI[p]) for the data input (DIJk data). In one embodiment, the next Dijk data are shifted in while the current Dijk data are used in the current set of execution cycles. The current Dijk data are stored in the D_i[p] register during the current set of execution cycles without changing.

Further, each multiplier-accumulator circuit includes a shifting chain (MAC_SO[p]) for preloading the Yijl sum. The next set of Yijl sums are shifted in while the current set of Yijl sums are calculated/generated during the current set of execution cycles. In this embodiment, each multiplier-accumulator circuit also uses the shifting chain (MAC_SO[p]) for unloading or outputting the Yijl sum. The previous Yijl sums are shifted out while the current Yijl sums are generated in the current set of execution cycles. Notably, the concurrent use of the Yijl shifting chain (MAC_SO[p]) both preloading and unloading will be discussed in more detail below.

In each execution cycle, the filter weight value (Fkl value) in the D_r[p] register is multiplied by the Dijk value in the D_i[p] register, via multiplier circuitry, and the result is output to the MULT_r[p] register. In the next pipeline cycle this product (i.e., D*F value) is added to the Yijl accumulation value in the MAC_r[p−1] register (in the previous multiplier-accumulator circuit) and the result is stored in the MAC_r[p] register. This execution process is repeated for the current set of execution cycles. Notably, the Yijl accumulation values move (rotate) during the current set of execution cycles.

The control/configure circuit, in one aspect of the present inventions, configures (e.g., one-time or more than one-time programmable) and controls the multiplier-accumulator circuitry to implement one or more execution or processing pipelines to process data, for example, in parallel or concurrently. In one embodiment, the circuitry configures and controls a plurality of separate multiplier-accumulator circuits or rows/banks of interconnected (in series) multiplier-accumulator circuits to implement data processing via pipelined multiply and accumulate operations to, for example, increase throughput of the multiplier-accumulator execution or processing pipeline in connection with processing data (e.g., image data).

In one embodiment, the circuitry to control and configure the multiplier-accumulator circuitry (referred to, at times, as control/configure circuitry) includes circuitry to control, configure and/or program (e.g., one-time or more than one-time programmable) the execution or processing path(s) of the multiplier-accumulator circuits comprising the MAC processing pipelines. For example, in one embodiment, the control/configure circuitry may configure or connect a selected number of multiplier-accumulator circuits or rows/banks of multiplier-accumulator circuits to, among other things, implement a predetermined multiplier-accumulator execution or processing pipeline or architecture thereof. Here, the control/configure circuitry may configure or determine the multiplier-accumulator circuits or rows/banks of interconnected multiplier-accumulator circuits that are interconnected (in series) and employed to perform the multiply and accumulate operations and/or the pipelining architecture or configuration implemented via connection of multiplier-accumulator circuits (or rows/banks of interconnected multiplier-accumulator circuits) employed to perform the multiply and accumulate operations. Thus, in one embodiment, the control/configure circuitry (which may include a plurality of control/configure circuits) configures or implements an architecture of the execution or processing pipeline by controlling or providing connection(s) between multiplier-accumulator circuits and/or rows of interconnected multiplier-accumulator circuits.

For example, the control/configure circuit or NLINK circuit connect to multiplier-accumulator circuitry (which includes a plurality (illustrated here as 64) multiplier-accumulator circuits or MAC processors) to, among other things, configure the overall execution pipeline by providing, transferring or "steering" data between one or more MAC pipeline(s), via programmable or configurable interconnect paths. In addition, the control/configure circuit may configure the interconnection between the multiplier-accumulator circuitry and one or more memories—including external memories (e.g., L3 memory, such as external DRAM)—that may be shared by one or more (or all) of the clusters of MAC execution pipelines. These memories may store, for example, the input image pixels Dijk, output image pixels Yijl (i.e., image data processed via the circuitry of the MAC pipeline(s), as well as filter weight values Fijklm employed in connection with such data processing. (See, FIGS. 1A, 1B, 2D and 2E).

Notably, the configuration may be implemented, for example, in situ (i.e., during operation of the integrated circuit) to, for example, meet or exceed temporal-based system requirements or constraints. Moreover, the configuration implemented by the control/configure circuitry may be one-time programmable (e.g., at manufacture via, e.g., a programmable fuse array) or multiple-times programmable (including, e.g., at start-up/power-up, initialization, and/or in situ).

With reference to FIG. 3A, in one exemplary configuration, the control/configure or NLINK circuit (which, in one embodiment, is dedicated to the associated execution pipeline) connects to the execution pipeline via a plurality of ports including (i) the DI_I, MAC_SI, DI_O, MAC_SO ports, which connect the execution pipeline to memory that is external to the pipeline (e.g., L2 memory such as SRAM), and (ii) the MAC_I, MAC_O ports which connect the plurality of multiplier-accumulator circuits (or the two rows of multiplier-accumulator circuits) into ring configuration or architecture. Thus, in this exemplary embodiment, the control/configure or NLINK circuit is configured to provide input data to execution pipeline (e.g., from memory) and receive the output/processed data from the execution pipeline (e.g., to output to memory)—wherein the pipeline includes those MACs that are associated with and dedicated to the NLINK circuit. Moreover, the control/configure or NLINK circuit is not configured to interface, communicate or interact with other or adjacent control/configure or NLINK circuit(s) and/or other or adjacent MAC processing pipelines (see, e.g., FIG. 1B).

Notably, as mentioned above, a "port" is a physical point of entry to and/or exit from the control/configure or NLINK circuit; all physical forms of entry to or exit from the control/configure or NLINK circuit are intended to fall within the scope of the present inventions (for example, a conductor or metal routing in/of an integrated circuit).

With reference to FIGS. 3A, 3B, 3E and 3F, the execution pipeline in this embodiment includes a plurality of multiplier-accumulator circuits (each labeled "MAC") that are connected in series to form a linear execution pipeline of a plurality of rows of MACs, that are interconnected via row interconnects. In operation, the execution pipeline receives input data at DI_I (see "Input Data Port" in NLINK(lower)), processes the data via concatenating the multiply and accumulate operations, and outputs processed data at MAC_SO (see "Output Data Port" in NLINK(upper)). As noted above, the control/configure or NLINK circuit configures two rows of multiplier-accumulator circuits into ring configuration or architecture via connecting the MAC_I, MAC_O ports, and thereby the processing operations of the plurality of multiplier-accumulator circuits of the execution pipeline.

With reference to FIGS. 3A-3F, the signals traversed on the L0 Memory data, address and control paths in the NLINK and execution pipeline denote the control and address information that manages and controls the execution sequences of the processing. The control and address signals are generated by control logic circuitry (not illustrated—and which, in one embodiment, is external to the NLINK and execution pipeline). In addition, such control logic also manages or controls write data (i.e., the filter weights) and write sequences in relation to each L0 memory (e.g., SRAM) which is associated with and dedicated to the multiplier-accumulator circuits in the execution pipeline. The write data (filter weights) is read from memory external to the execution pipeline (L1 memory—e.g., SRAM) (see, e.g., FIGS. 1A and 1B). Notably, a sequence to write data into one of the banks of each L0 memory associated with the multiplier-accumulator circuits is performed/completed before the execution process using the filter weights associated with that sequence is initiated.

With continued reference to FIGS. 3A-3F, the signals traversed on the Input Data Path in the NLINK and execution pipeline denote input data (e.g., image data) applied to or received by the MAC pipeline and processed by/in an execution sequence. The input data may be stored in L2 memory (e.g., SRAM) and provided (i.e., read from memory) to the NLINK via the control logic circuitry (not illustrated). In one embodiment, this input data are provided to the pipeline in sets or groups (e.g., 64 element groups or sets wherein each element is 17 bits in size/length). A set or group of input data is shifted in serially through the DI_I port and loaded into the pipeline in parallel to the D register in each of the multiplier-accumulator circuits of the execution pipeline. The end of the serial path is the DI_O output port in the NLINK circuit (see "Input Data Port" in NLINK (upper)). The input data path in the NLINK(upper) may not be used in this illustrative pipeline architecture/configuration.

The accumulation data paths in the NLINK and execution pipeline denote the ongoing MAC accumulation totals generated by multiplier-accumulator circuits during the execution sequence. In each cycle, each multiplier-accumulator circuit multiplies a filter weight value (from L0 memory) by the (static) value in the D register, adds the total to its accumulation register Y, and passes Y to the right for the next cycle. The Y accumulation values (here, 64) rotate counter-clockwise, and at the end of each cycle interval (e.g., 64-cycle interval) the accumulation values are loaded into the output shift register MAC_S. Note that the Accumulation Data Ports (MAC_O port and MAC_I port) in the NLINK circuit, and the data path therebetween, are configured and enabled to allow the Y value to be rotated through each of the MACs of the execution pipeline (see also FIG. 2D).

With continued reference to FIGS. 3A-3F, the signals on the output data path in the NLINK circuit and execution pipeline denote output data generated by an execution sequence (the accumulation operation with prior results in a MAC pipeline and one associated NLINK circuit (notably, "Shift MAC_Sx within single pipeline" refers to the output data path corresponding to the accumulation operation with prior results)). The output data are parallel loaded from the accumulation registers Y (here, 64) into the MAC_SO registers (here, 64). In one embodiment, this output data may be written to memory external to the NLINK circuit and execution pipeline (e.g., L2 memory (SRAM)) via the control logic circuitry (not illustrated). In one embodiment, the output data are returned as 64 element groups, with each element 35 bits in length/size. A group of output data is shifted out and stored in memory serially through the Output data Port (MAC_SO port). The serial bus (MAC_SO and MAC_SI) may also be used to preload initial accumulation values/totals before initiation of the first execution cycle of each execution sequence. These initial accumulation totals are provided (e.g., serially shifted in) to the NLINK circuit and execution pipeline via the MAC_SI port and loaded in parallel to the Y register in each multiplier-accumulator circuit of the execution pipeline (see also FIG. 2D). In one exemplary embodiment, the initial accumulation data are 35 bits in size/length.

In one embodiment, a plurality of control/configure or NLINK circuits may be interconnected to, for example, configure a data processing circuit that includes a plurality of MAC pipelines—each pipeline associated with one of the interconnected control/configure or NLINK circuits. In one embodiment, a plurality (or all) of the MAC pipelines of, for example, a cluster of MAC pipelines are employed in the processing operation of the circuit, via the control/configure or NLINK circuits associated with such MAC pipelines. For example, with reference to FIG. 4, in one embodiment, each NLINK circuit of the plurality of NLINK circuits (e.g., associated with a plurality (or all) of the MAC pipelines of a cluster) are configured to provide data (e.g., image data), via the DI_I and MAC_SI ports, to the associated MAC pipeline (which includes a plurality of interconnected multiply-accumulate circuits). In this embodiment, the MAC_I/MAC_O ports of each NLINK circuit are connected to provide a ring topology or architecture of the interconnected multiply-accumulate circuits of the associated MAC pipeline. Also, the DI_I and MAC_SI ports are configured to provide data to each of the MAC pipelines (data which is read from memory (e.g., L2)) for processing, and the MAC_SO is output and written to a memory (L2). In this embodiment, partially processed data (from a given MAC pipeline) is exchanged, via the NLINK circuits, between memory (e.g., L2) and each MAC pipeline of the plurality of MAC pipelines to implement the processing operation.

Notably, as intimated above, the input data need not be written back to memory and, as such, the Input Data Port (DI_O port) may remain unconnected at the output of the NLINK (see FIG. 3C).

In one embodiment, a plurality of control/configure or NLINK circuits, and MAC pipelines associated therewith, may be configured and interconnected into a single shifting chain wherein a plurality of the MAC pipelines (for example, of one cluster) are employed in the processing operation, via the control/configure or NLINK circuits associated with such MAC pipelines, and configuration thereof. Here, the data processing pipeline includes a plurality of MAC pipelines (each of which is associated with one of the interconnected NLINK circuits) that are interconnected into a single shifting chain via programmable or configurable connections between the plurality of control/configure or NLINK circuits as well as connections between the plurality of MAC pipelines via or provided/implemented by the NLINK circuits.

For example, with reference to FIG. 5A, in one embodiment a single shifting chain is provided via interconnecting the DI/I and DI/O ports of adjacent NLINK circuits (and by extension, each MAC pipeline associated with each NLINK circuit of the interconnected NLINK circuits). Here, the DI_O port of an NLINK circuit is connected to the DI_I port of an adjacent NLINK circuit (e.g., in the illustrated embodiment, an NLINK circuit that is disposed "above" wherein the data flow is from bottom to top (NLINK A to NLINK B, etc., to NLINK X)). Notably, the data flow may be top to bottom (i.e., NLINK X, etc. to NLINK B to NLINK A)—or any other direction or path—all of which are intended to fall within the scope of the present inventions.

With continued reference to FIG. 5A, in this illustrated embodiment, the DI_I port of the bottom-most NLINK circuit is configured to receive input data (e.g., read from an external memory (e.g., L2 memory—SRAM)). The DI_O port of that bottom-most NLINK circuit is input into the DI_I port of the NLINK circuit adjacent thereto. Thus, the shifting chain of the processing operations in this embodiment employ the DI/I and DI/O ports of adjacent NLINK circuits to form a shifting path for the data input (DI) operand that traverses through each multiplier-accumulator circuit of each MAC pipeline of the plurality of MAC pipelines.

In one embodiment, a plurality of the MAC pipelines of a given cluster are incorporated in the shifting chain. (See, e.g., FIG. 1B). In another embodiment, all of the MAC pipelines of a given cluster are incorporated in the shifting chain. Notably, the DI_O port of the upper-most NLINK circuit may or may not be output to memory. In one embodiment, the DI_O port in the last NLINK circuit of the interconnected circuits is unconnected (See, e.g., NLINK X in FIG. 5A).

With reference to FIGS. 6A-6C, in one embodiment of the shifting chain illustrated in FIG. 5A, the NLINK circuits are configured to provide the appropriate DI_I-DI_O routing therebetween to load data for the combined pipeline (which consists of a plurality of pipelines (wherein each pipeline of the plurality, in the illustrative embodiment, includes two rows of multiply-accumulate circuits—see, e.g., FIGS. 3A, 3B, 3E and 3F). Here, the input data signals and signal paths associated with the Input Data Path in FIGS. 6A-6C illustrate the connections of the DI_I-DI_O routing between the NLINK circuits (see DI_I-DI_O routing in FIG. 5A). The connections configure the DI_I port of one of the NLINK circuits (a "first NLINK circuit"—e.g., NLINK A) to receive input data (e.g., from memory (e.g., L2 memory)) and provide that input data to the associated execution pipeline for processing, and then to the DI_O port. (See FIG. 6A). The DI_O port of that first NLINK circuit is configured to output the initial data to an adjacent NLINK circuit (the "second NLINK circuit"—e.g., NLINK B), via the Input Data Port (see NLINKS upper) and, by extension, the execution pipeline associated with that adjacent NLINK circuit. (See FIG. 6B). Here, the DI_I port of the second NLINK circuit is connected to the DI_O port of that first NLINK circuit to provide the partially processed data to the execution pipeline associated with the second NLINK circuit. That is, the DI_O signal in an NLINK circuit to be connected to the DI_I signal in the adjacent NLINK circuit (here, located above the first NLINK circuit—see FIG. 5A). The DI_O port of that second NLINK circuit is configured to output the further partially processed data to another adjacent NLINK circuit (the "third NLINK circuit") and the execution pipeline associated with that third NLINK circuit. And so on—e.g., NLINK X. As noted herein, a "port" (e.g., the DI_I port, DI_O port) is a physical point of entry to and exit from the control/configure or NLINK circuit; all physical forms of entry to or exit from the control/configure or NLINK circuit are intended to fall within the scope of the present inventions (for example, a conductor or metal routing in/of an integrated circuit).

With reference to FIG. 6C, one of the control/configure circuit or NLINK circuits, which may be a top, end or edge NLINK circuit (NLINK X in FIG. 5A of the overall, complete or combined pipeline—which includes a plurality of NLINK circuits and associated pipelines) is configured to receive data from another NLINK circuit (like that in FIG. 6B) and route such data to the processing pipelines associated therewith to the DI_O port in an NLINK circuit to connect and output data to, for example, memory (e.g., L2 memory—such as SRAM). Notably, other connections and configurations of the NLINK circuit of FIGS. 6A-6C (e.g., between an NLINK circuit and its associated execution pipeline) are like those illustrated in FIG. 3A but are not set forth in FIGS. 6A-6C for the purposes of clarity (e.g., memory address, data and control paths, accumulation data path, and/or output data path—see, e.g., FIGS. 3A-3F).

Briefly, in operation, the execution pipeline associated with each NLINK circuit of the interconnected NLINK circuits are loaded with data, before data processing, via data read from memory which data are shifted in, over the input data path (FIG. 6A) as well as output data path, which load the accumulation operation with prior results in one MAC pipeline and one associated NLINK circuit ("Shift MAC_Sx within single pipeline" refers to the output data path corresponding to the accumulation operation with prior results—see, e.g., FIG. 3A), to each pipeline of the interconnected NLINK circuits that form the overall/larger/composite pipeline (which is a combination of all of the pipelines associated with the interconnected NLINK circuits). (See FIGS. 5A and 6A-6C). In one embodiment, a plurality of the MAC pipelines of a given cluster are incorporated in the circular-shifting-path or ring architecture via the associated NLINK circuits that are interconnected in the architecture. In another embodiment, all of the MAC pipelines of a given cluster are incorporated in the circular-shifting-path or ring architecture consisting of all of the MAC pipelines that are connected together, as illustrated in FIG. 5A, via the associated NLINK circuits.

Notably, the size or length of the composite or combined MAC pipeline is configurable via configuring the NLINK circuits to incorporate the associated the execution pipeline into a composite pipeline (which is a combination of all of the pipelines associated with the interconnected NLINK circuits). The size, length or number of MACs in the MAC pipeline is configurable (larger/increased or smaller/decreased) via configuring the NLINK circuits that are associated with (and, in one embodiment, dedicated to) the plurality of MAC pipelines that comprise the composite or combined MAC pipeline. For example, a larger composite pipeline includes more interconnected NLINK circuits (each of which are associated with one or more MAC pipelines) which interconnect a larger number of MAC pipelines (and a larger number of MACs) into the composite or combined MAC pipeline. In contrast, a smaller composite pipeline includes fewer interconnected NLINK circuits which interconnect fewer number of MAC pipelines (and fewer number of MACs) into the composite or combined MAC pipeline. As mentioned above, the configuration implemented by the control/configure circuitry may be one-time programmable (e.g., at manufacture via, e.g., a programmable fuse array) or multiple-times programmable (including, e.g., at start-up/power-up, initialization, and/or in situ).

In another embodiment, a single shifting path is configured in circular-shifting-path (a ring) for intermediate accumulation values via interconnecting the MAC_I and MAC_O ports of adjacent NLINK circuits to interconnect the MAC circuitry. With reference to FIG. 5B, the MAC_O port of an NLINK circuit (e.g., NLINK A) is connected to the MAC_I port of an adjacent NLINK circuit (e.g., in the illustrated embodiment, NLINK B—the NLINK circuit that is disposed "above" NLINK A wherein the data flow is from bottom to top). In this illustrated embodiment, the MAC_I port of the bottom-most NLINK circuit is configured to receive intermediate accumulation data from the upper most LINK circuit via the MAC_O port thereof to complete the ring architecture (e.g., in the illustrated embodiment, NLINK X—the NLINK circuit that is disposed on the "top", end or edge of the NLINKs wherein the data flow is from top to bottom in completing the ring). The MAC_O port of the bottom-most NLINK circuit is input into the MAC_I port of the NLINK circuit adjacent thereto. Thus, the circular-shifting-path or ring architecture of the processing operations in this embodiment employ the MAC_I and MAC_O ports of adjacent NLINK circuits to form a path for that traverses through each multiplier-accumulator circuit of each MAC pipeline of the plurality of MAC pipelines to transmit or provide intermediate accumulation values through/between the plurality of MAC pipelines.

In one embodiment, a plurality of the MAC pipelines of a given cluster are incorporated in the circular-shifting-path or ring architecture via the associated NLINK circuits that are interconnected in the architecture as reflected in FIG. 5B. In another embodiment, all of the MAC pipelines of a given cluster are incorporated in the circular-shifting-path or ring architecture via configuration of the associated NLINK circuits.

With reference to FIG. 7A-7C, in one embodiment of the single shifting path configured in circular-shifting-path or ring architecture illustrated in FIG. 5B, the NLINK circuit is configured to provide the appropriate MAC_I and MAC_O routing. First, the signal paths labeled "Accumulation Data Path" illustrate connections like that of the configuration illustrated in FIG. 3A wherein the MAC_I/MAC_O ports of each NLINK circuit are connected to provide a ring topology or architecture of the interconnected multiply-accumulate circuits of the associated MAC pipeline. The Accumulation Data Paths transfer accumulation data of the intermediate accumulations to an adjacent NLINK circuit (the "second NLINK circuit"—see, e.g., NLINK B in FIG. 5B) and, by extension, to the execution pipeline associated with that adjacent NLINK circuit wherein the intermediate accumulations are input into the MAC pipeline thereof. The accumulation data paths through the NLINK circuit (and not traversing the pipeline) configure the NLINK to output the MAC_O signal in the top-most NLINK to be connected, through the NLINK circuits, to the MAC_I signal in the bottom-most NLINK circuit (see, e.g., NLINK X in FIG. 5B). That is, the signals on the accumulation data paths that are not applied to the pipeline illustrate the connections of the MAC_I and MAC_O routing between the adjacent NLINK circuits (see MAC_I and MAC_O routing in FIG. 5B).

Notably, other connections and configurations of the NLINK circuit of FIGS. 7A-7C (e.g., between an NLINK circuit and its associated execution pipeline) are like those illustrated in FIG. 3A but are not set forth in FIG. 7A-7C for the purposes of clarity (e.g., memory address, data and control paths, input data path, and accumulation data path—see, e.g., FIGS. 3A-3F). In addition, although the data flow has been described from bottom to top (FIGS. 5A-5C and 7A-7C), the data flow may be top to bottom (i.e., NLINK X, etc. to NLINK B to NLINK A)—or any other direction or path—all of which are intended to fall within the scope of the present inventions. Moreover, as noted herein, a "port" (e.g., the MAC_I and MAC_O port) is a physical point of entry to and exit from the control/configure or NLINK circuit; all physical forms of entry to or exit from the control/configure or NLINK circuit are intended to fall within the scope of the present inventions (for example, conductor or metal routing in/of an integrated circuit).

Briefly, in operation, the execution pipeline associated with each NLINK circuit of the interconnected NLINK circuits are loaded with data, before data processing, via data read from, for example, memory which input data are shifted in, over the input data path (see, e.g., FIGS. 6A-6C) as well as the output data (which may represent accumulation data of prior results ("Shift MAC_Sx within single pipeline" refers to the output data path corresponding to the accumulation operation with prior results—see, e.g., FIG. 3A), to each pipeline of the interconnected NLINK circuits that form the overall/larger pipeline (which is a combination of all of the pipelines associated with the connected NLINK circuits). (See FIGS. 5B and 7A-7C). In one embodiment, all of the MAC pipelines of a given cluster are incorporated in the closed loop or ring architecture consisting of all of the MAC pipelines that are connected together via the associated NLINK circuits.

Notably, the size or length of the overall, complete or combined pipeline is configurable via configuring the NLINK circuits to incorporate the associated the execution pipeline into the overall, larger, combined or composite pipeline (which is a combination of all of the pipelines associated with the connected NLINK circuits). As mentioned above, the configuration implemented by the control/configure circuitry may be one-time programmable (e.g., at manufacture/test via, e.g., a programmable fuse array) or multiple-times programmable (including, e.g., at start-up/power-up, initialization, and/or in situ).

In another embodiment, a single shifting path is configured in circular-shifting-path (a ring) for final accumulation values via interconnecting the MAC_SI and MAC_SO ports of adjacent NLINK circuits. With reference to FIG. 5C, the MAC_SO port of an NLINK circuit is connected to the MAC_SI port of an adjacent NLINK circuit (e.g., in the illustrated embodiment, an NLINK circuit that is disposed "above" (e.g., NLINK B relative to NLINK A) wherein the data flow is from bottom to top). In this illustrated embodiment, the MAC_SI port of the bottom-most NLINK circuit is configured to receive input data from memory (e.g., L2 memory such as SRAM). In addition, the upper most LINK circuit is configured to output data to memory via the MAC_SO port thereof. The MAC_SO port of the bottom-most NLINK circuit (NLINK A) is input into the MAC_SI port of the NLINK circuit adjacent thereto (NLINK B). Thus, the single shifting path implemented via circular-shifting-path for final accumulation values of the processing operations in this embodiment employ the MAC_SI and MAC_SO ports of adjacent NLINK circuits to form a path for that traverses through each multiplier-accumulator circuit of each MAC pipeline of the plurality of MAC pipelines to transmit or provide intermediate accumulation values through/between the plurality of MAC pipelines. In one embodiment, all of the MAC pipelines of a given cluster are incorporated in the circular-shifting-path or ring architecture. In another embodiment, a plurality (but not all) of the MAC pipelines of a given cluster are incorporated in the circular-shifting-path or ring architecture.

With reference to FIGS. 8A-8C, in one embodiment of the single shifting path configured in circular-shifting-path or ring architecture illustrated in FIG. 5C, the NLINK circuit is configured to provide the appropriate MAC_SI and MAC_SO routing. First, certain configurations of the NLINK circuit (e.g., the ports identified as Input Data Port and Accumulation Data Port) are like those illustrated in FIG. 3A but are not set forth in FIGS. 8A-8C for the purposes of clarity. The output data paths in the NLINK circuit illustrate the configuration to implement a circular-shifting-path (a ring) architecture for final accumulation values of each of the processing sequence(s).

The NLINK circuit is configured to provide the appropriate MAC_SI-MAC_SO routing to load data for the combined pipeline (which consists of a plurality of pipelines (wherein each pipeline of the plurality, in the illustrative embodiment, includes two rows of multiply-accumulate circuits—see, e.g., FIGS. 3A, 3B, 3E and 3F). With reference to FIG. 8A, the output data path of this embodiment configures the MAC_SI port of one of the NLINK circuits (the "first NLINK circuit"—e.g., NLINK A in FIG. 5C) to receive data (e.g., from memory) and provide that data to the associated execution pipeline for processing, and to the MAC_SO port. The MAC_SO port of that first NLINK circuit is configured to output the data to an adjacent NLINK circuit (the "second NLINK circuit"—e.g., NLINK A in FIG. 5C), via the Output Data Port in the NLINK upper illustrated FIG. 8A. Thereafter, the data are provided to the execution pipeline associated with that adjacent NLINK circuit via the MAC_SO/MAC_SI ports (see NLINK lower illustrated FIG. 8) of that adjacent NLINK circuit. Here, the MAC_SO port of the second NLINK circuit (e.g., NLINK B in FIG. 5C) is connected to the MAC_SI port of the pipeline. The MAC_SO port of that second NLINK circuit is configured to connect to and output the processed data to another adjacent NLINK circuit (the "third NLINK circuit") and the execution pipeline associated with that third NLINK circuit. And so on. (e.g., NLINK X in FIG. 5C). This configuration of the NLINK circuit connects the MAC_SO-MAC_SI—to facilitate pipeline operations.

As noted herein, a "port" (e.g., the MAC_SI port, MAC_SO port) is a physical point of entry to and exit from the control/configure or NLINK circuit; all physical forms of entry to or exit from the control/configure or NLINK circuit are intended to fall within the scope of the present inventions (for example, a conductor or metal routing in/of an integrated circuit).

With reference to FIG. 8C, one of the control/configure circuit or NLINK circuits, which may be a top, end or edge NLINK circuit (of the overall, complete or combined pipeline—which includes a plurality of NLINK circuits and associated pipelines—see NLINK X in FIG. 5C) is configured to receive data from another NLINK circuit (see FIG. 8B) and route such the path to the processing pipelines associated therewith to the MAC_SO port in the NLINK circuit to connect and output data to, for example, memory (e.g., L2 memory—such as SRAM). Notably, certain other signal/data paths and configurations of the NLINK circuit of FIGS. 8A-8C (e.g., between an NLINK circuit and its associated execution pipeline) are like those illustrated in FIG. 3A (e.g., the input data paths) but are not set forth in FIGS. 8A-8C for the purposes of clarity (e.g., memory address, data and control paths, input data path, and accumulation data path—see, e.g., FIGS. 3A-3F).

Briefly, in operation, the execution pipeline associated with each NLINK circuit of the interconnected NLINK circuits are loaded with data of the final accumulation data values, before data processing, via data read from memory which data are shifted in, over the output data path (see FIG. 8A), to each pipeline of the interconnected NLINK circuits that form the overall/larger pipeline (which is a combination of all of the pipelines associated with the connected NLINK circuits). (See FIGS. 5C and 8A-8C). As noted above, in one embodiment, all of the MAC pipelines of a given cluster are incorporated in the circular-shifting-path or ring architecture consisting of all of the MAC pipelines that are connected together, as illustrated in FIG. 5C, via the associated NLINK circuits.

Notably, the size or length of the overall, complete or combined pipeline is configurable via configuring the NLINK circuits to incorporate the associated the execution pipeline into the overall, larger, combined or composite pipeline (which is a combination of all of the pipelines associated with the connected NLINK circuits)—or configuring the NLINK circuits to incorporate the associated the execution pipeline into the smaller, combined or composite pipeline (which is a combination of fewer of the pipelines associated with the connected NLINK circuits). As mentioned above, the configuration implemented by the control/configure circuitry may be one-time programmable (e.g., at manufacture via, e.g., a programmable fuse array) or multiple-times programmable (including, e.g., at start-up/power-up, initialization, and/or in situ).

In yet another embodiment, an exemplary pipeline and interconnect architecture of control/configure or NLINK circuits, and MAC pipelines associated therewith, includes connecting a plurality of such MAC execution pipelines in series via serial connection of a plurality of control/configure or NLINK circuits wherein the pipeline architecture includes two or three/all of the following: (i) a single shifting chain or path is provided via interconnecting the DI/I and DI/O ports of adjacent NLINK circuits and each MAC pipeline associated with each NLINK circuit of the interconnected NLINK circuits (see FIGS. 5A and 6A-6C), (ii) a single shifting path is configured in circular-shifting-path (a ring) for intermediate accumulation values via interconnecting the MAC_I and MAC_O ports of adjacent NLINK circuits to interconnect the MAC circuitry (see FIGS. 5B and 7A-7C), and (iii) a single shifting path is configured in circular-shifting-path (a ring) for final accumulation values via interconnecting the MAC_SI and MAC_SO ports of adjacent NLINK circuits (see FIGS. 5C and 8A-8C). In this embodiment, each control/configure circuit connected in series is associated with (and, in one embodiment, dedicated and/or directly connected to) one of the plurality of MAC pipelines that comprise the composite MAC execution pipeline wherein, when the control/configure or NLINK circuits are connected, each multiplier-accumulator circuit pipeline is a portion of a composite/larger linear MAC pipeline that is formed by the serially connected MACs associated with each of the serially connected MAC pipelines. (See FIGS. 5A-5C). Moreover, certain signal/data paths and configurations of the NLINK circuit (e.g., between an NLINK circuit and its associated execution pipeline) may be implemented like that in FIGS. 3A-3F (e.g., memory address, data and control paths).

Notably, in this embodiment (i.e., FIGS. 5A-5C), the size or length of the composite, complete or combined pipeline is configurable via programming or configuring the NLINK circuits to incorporate the associated the execution pipeline into a larger composite pipeline (which is a combination of all of the pipelines associated with the connected NLINK circuits) or into a smaller composite pipeline (which includes fewer interconnected NLINK circuits and fewer associated MAC pipelines). As mentioned above, the configuration implemented by the control/configure circuitry may be one-time programmable (e.g., at manufacture via, e.g., a programmable fuse array) or multiple-times programmable (including, e.g., at start-up/power-up, initialization, and/or in situ).

With reference to FIG. 9, the integrated circuit may include configurable processing circuitry to implement additional data processing operations including, for example, pre-processing of data operands and post-processing of accumulation results, in accordance with an embodiment of certain aspects of the present inventions. Here, the configurable processing circuit is organized into four circuit blocks (a0, a1, a2, a3) wherein each circuit block of the configurable processing circuitry may be configured to perform one or more operations. Moreover, the configurable processing circuitry includes additional programmable/configurable circuitry to establish, configure or "steer" the data path to implement one or more pre-processing operations (e.g., pre-process the data operands) and/or one or more post-processing operations (e.g., further/subsequent processing of the accumulation results from the MAC processing pipeline—which may be a composite, complete or combined MAC processing pipeline—see, e.g., FIGS. 5A-5C).

The configurable processing circuitry includes circuits to perform one or more floating point and fixed point operations (whether pre-processing of the input data and/or post-processing of the accumulation results) including, for example, addition/subtraction with register value, multiplication by register value, conversion of value from integer data format to floating point data format, conversion of value from floating point data format to integer data format, adjustment in format precision of value (e.g., increasing precision of a value or decreasing precision of the value), one or more conversion(s) with monadic function(s) (e.g., one or more of the following: inverse, square root, inverse square root, hyperbolic tangent, sigmoid, etc.). With continued reference to FIG. 9, the multiplexers in the configurable processing circuitry configure and establish a data path, and/or steer the data through the data path, to the selected processing circuit(s) to implement one or more selected operation(s) and/or bypass one or more operation(s). In one embodiment, the paths and/or steering are configured, via control of the multiplexers of the configurable processing circuitry, before initiation of an execution sequence (i.e., processing by the MAC execution pipeline).

For example, in one embodiment, the configurable processing circuitry may include activation circuitry to implement one or more operations or processes, including, for example, linear and/or non-linear activation operations and/or threshold functions, as described and/or illustrated in U.S. Patent Application No. 63/144,553, entitled "MAC Processing Pipeline having Activation Circuitry, and Methods of Operating Same", filed Feb. 2, 2021. Here, the activation circuitry may be connected to the output of the MAC processing pipeline to further process data (e.g., filter image data) initially processed by the MAC processing pipeline. The activation circuitry may include one or more circuits to process such data via one or more operations, including, for example, linear and/or non-linear activation operations and/or threshold functions. The one or more circuits, alone or in combination, may perform a particular operation, including, for example, a particular linear or non-linear activation operation or threshold function. The '553 application is hereby incorporated by reference herein in its entirety.

Notably, the configurable processing circuitry may be one-time programmable (e.g., at manufacture via, e.g., a programmable fuse array) or multiple-times programmable (including, e.g., at start-up/power-up, initialization, and/or in situ (i.e., during operation of the integrated circuit)). In one embodiment, the configuration is programmed before operation or implementation of an execution sequence of the processing pipeline via multiplexers to establish a data path into one or more selected processing circuits or to by-pass such circuits.

The configurable processing circuitry, and connections thereto, are superimposed (for illustration purposes) in the detailed schematic block diagram of an exemplary configuration of the control/configure circuit or NLINK circuit illustrated in FIGS. 3A, 3C, 6A-6C, 7A-7C, and 8A-8C (see, the left side of "NLINK (upper)" section of each exemplary configuration of the control/configure circuit or NLINK circuit). In one embodiment. in one embodiment, the configurable processing circuitry is accessible to any (or all) of the NLINK circuits, for example, via the interconnect network (see, FIG. 1B) wherein the interconnect network is configurable to connect the configurable processing circuitry to one or more NLINK circuits and the MAC processing pipelines associated therewith.

The configurable processing circuitry may be one-time programmable (e.g., at manufacture via, e.g., a programmable fuse array) or multiple-times programmable (including, e.g., at start-up/power-up, initialization, and/or in situ (i.e., during operation of the integrated circuit)). In one embodiment, the configuration is programmed before operation or implementation of an execution sequence of the processing pipeline via multiplexers to establish a data path into one or more selected processing circuits or to by-pass such circuits.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

For example, in one embodiment, the linear processing pipeline, and the MACs that are incorporated in such pipeline, may be configured to rotate, transfer or move (before, during or at the completion of an execution cycle) the input data values (rather than the accumulation values—which are maintained, stored or held, in the particular MAC during each execution cycle of the execution sequence), as described and illustrated in U.S. Provisional Patent Application No. 63/156,263 "MAC Processing Pipelines, Circuitry to Configure Same, and Methods of Operating Same", filed Mar. 3, 2021; the '263 application is incorporated by reference herein in its entirety. In short, in operation, after input or loading of the initial data input values into the MACs of the linear MAC processing pipeline, the input data values are rotated, transferred or moved, on a cycle-by-cycle basis, from one MAC of the linear pipeline to the immediately following MAC of the pipeline and employed in the multiply operation of the multiplier circuit of that next MAC of the processing pipeline as described and/or illustrated in the '263 application.

For example, the extent or length of the concatenation (i.e., number of multiplier-accumulator circuits interconnected to implement or perform the multiply and accumulate operations) may be adjusted (i.e., increased or decreased), for example, in situ (i.e., during operation of the integrated circuit), for example, to meet system requirements or constraints (e.g., temporal-based requirements of system performance) via configuration of the NLINK circuits. Indeed, in one embodiment, the rows of multiplier-accumulator circuits may be connected or disconnected to adjust the extent or length of the concatenation (i.e., increase or decrease the number of multiplier-accumulator circuits interconnected to perform the multiply and accumulate operations in, e.g., the execution or processing pipeline) via control of circuitry (e.g., multiplexers) in NLINK circuits associated with rows of multiplier-accumulator circuits. (See, e.g., the '345 and '306 applications, FIGS. 7A-7C and FIGS. 6A-6C, respectively, and the text associated therewith).

The MAC processing pipelines or architectures, and circuitry to configure and control such pipelines/architectures, of the present inventions may employ or implement the concurrent and/or parallel processing techniques, architectures, pipelines, and configurations described and/or illustrated in U.S. patent application Ser. No. 16/816,164, entitled "Multiplier-Accumulator Processing Pipelines and Processing Component, and Methods of Operating Same", filed Mar. 11, 2020) and U.S. Provisional Patent Application No. 62/831,413, entitled "Multiplier-Accumulator Circuitry and System having Processing Pipeline and Methods of Operating and Using Same", filed Apr. 9, 2019). Here, the control/configure circuitry (which includes a plurality of control/configure circuits) may be programmed to configure the pipelines to implement the concurrent and/or parallel processing techniques described and/or illustrated in the '164 and '413 applications to, for example, increase the throughput of data processing; such applications are incorporated by reference herein in their entirety.

In one embodiment, the MAC processing pipelines or architectures, and circuitry to configure and control such pipelines/architectures, of the present inventions may employ Winograd processing techniques to process the image data. Here, the conversion circuitry may convert the data format of the filter weights from the Gaussian floating point data format to a block-scaled-fraction format having appropriate characteristics that facilitate implementation Winograd processing techniques in connection with the multiplier-accumulator circuitry of the execution pipelines. The pre-processing and/or post-processing may be implemented in the configurable processing circuitry described and illustrated in FIG. 9. Notably, details of, among other things, the circuitry, structures, architectures, function and operation of the multiplier-accumulator execution pipelines implementing Winograd processing techniques are described and/or illustrated in: (1) U.S. patent application Ser. No. 16/796,111, entitled "Multiplier-Accumulator Circuitry having Processing Pipelines and Methods of Operating Same", filed Feb. 20, 2020, and/or (2) U.S. Provisional Patent Application No. 62/909,293, entitled "Multiplier-Accumulator Circuitry Processing Pipeline and Methods of Operating Same", filed Oct. 2, 2019). These patent applications are incorporated herein by reference.

Further, although the present inventions are described and illustrated in the context of multiplier-accumulator circuitry, the circuitry and operation of the present inventions may, in lieu of the multiplication circuitry, or in addition thereto, substitute/implement logarithmic addition circuitry and conversion circuitry to facilitate concatenating the logarithmic addition and accumulate operations consistent with the present inventions. For example, the present inventions may be employed in conjunction with U.S. patent application Ser. No. 17/092,175 (filed Nov. 6, 2020) and U.S. Provisional Patent Application No. 62/943,336, entitled "Logarithmic Addition-Accumulator Circuitry, Processing Pipeline including Same and Method of Operating Same", filed Dec. 4, 2019, which are incorporated herein by reference in their entirety. In this regard, pipelines implementing logarithmic addition-accumulator circuitry (and methods of operating such circuitry) wherein data (e.g., image data) is processed based a logarithmic format, for example, in connection with inferencing operations, may be employed in the processing pipelines, and circuitry to configure and control such pipelines, of the present inventions. Thus, although the present inventions are described and illustrated in the context of multiplier-accumulator circuitry, the circuitry and operation of the present inventions may, in lieu of the multiplication circuitry, or in addition thereto, substitute/implement logarithmic addition circuitry and conversion circuitry to facilitate concatenating the logarithmic addition and accumulate operations consistent with the present inventions.

Moreover, the present inventions may employ the circuitry, function and operation of enhancing the dynamic range of the filter weights or coefficients as described and/or illustrated in Non-Provisional patent application Ser. No. 17/074,670, entitled "MAC Processing Pipeline using Filter Weights having Enhanced Dynamic Range, and Methods of Operating Same", filed Oct. 20, 2020 and/or U.S. Provisional Patent Application No. 62/930,601, entitled "Processing Pipeline Circuitry using Filter Coefficients having Enhanced Dynamic Range and Methods of Operating Same", filed on Nov. 5, 2019. That is, the present inventions may use the circuitry and techniques to enhance the dynamic range of the filter weights or coefficients of the '601 provisional application. Such circuitry and techniques may be implemented in the configurable processing circuitry described and illustrated in FIG. 9. The '601 provisional application is incorporated by reference in its entirety.

In addition, the present inventions may employ various data formats of the input data and the filter weights. For example, the present inventions may employ the circuitry, function and operation of implementing a data format (or modifying a data format) of the input data and/or the filter weights as described and/or illustrated in (1a) U.S. Non-Provisional patent application Ser. No. 16/900,319 and (1b) U.S. Provisional Patent Application No. 62/865,113, and/or (2a) U.S. Non-Provisional patent application Ser. No. 17/140,169 and (2b) U.S. Provisional Patent Application No. 62/961,627. Such pre-processing and/or post-processing may be implemented in the configurable processing circuitry described and illustrated in FIG. 9. Notably, these four (4) applications are incorporated by reference herein by reference in their entirety.

Notably, the configuration, selection, modification and/or adjustment of the series of a plurality of multiplier-accumulator circuitry may be implemented, for example, in situ (i.e., during operation of the integrated circuit) to, for example, perform or provide a particular operation and/or meet or exceed system requirements or constraints (e.g., temporal-based requirements or constraints).

Moreover, although many of the embodiments described and illustrated herein connect or configure adjacent NLINKS circuits in relation to forming or providing a larger execution pipeline (relative to the pipeline associated with one NLINKS circuit), the embodiments may connect non-adjacent NLINKS circuits (and, by extension non-adjacent rows of multiplier-accumulator circuits) to facilitate pipelining processing and provide a concatenation architecture; for example, route selection circuitry (e.g., multiplexer(s)) of the NLINKS interface connector may be configured to connect the output of last multiplier-accumulator circuit of a row of multiplier-accumulator circuits to an input of a first multiplier-accumulator circuit of one or more different rows (adjacent and/or non-adjacent) of multiplier-accumulator circuits. For the avoidance of doubt, all of the embodiments described and illustrated herein may be implemented via non-adjacent NLINKS circuits (and, by extension non-adjacent rows of multiplier-accumulator circuits)—however, for the sake of brevity, such embodiments will not be illustrated or separately restated in the context of non-adjacent NLINKS circuits and non-adjacent rows of multiplier-accumulator circuits.

Importantly, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

Further, although the memory cells in certain embodiments are illustrated as static memory cells or storage elements, the present inventions may employ dynamic or static memory cells or storage elements. Indeed, as stated above, such memory cells may be latches, flip/flops or any other static/dynamic memory cell or memory cell circuit or storage element now known or later developed.

Notably, various circuits, circuitry and techniques disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, circuitry, layout and routing expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other formats and/or languages now known or later developed. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits, circuitry and techniques disclosed herein may be represented via simulations using computer aided design and/or testing tools. The simulation of the circuits, circuitry, layout and routing, and/or techniques implemented thereby, may be implemented by a computer system wherein characteristics and operations of such circuits, circuitry, layout and techniques implemented thereby, are imitated, replicated and/or predicted via a computer system. The present inventions are also directed to such simulations of the inventive circuits, circuitry and/or techniques implemented thereby, and, as such, are intended to fall within the scope of the present inventions. The computer-readable media corresponding to such simulations and/or testing tools are also intended to fall within the scope of the present inventions.

Notably, reference herein to "one embodiment" or "an embodiment" (or the like) means that a particular feature, structure, or characteristic described in connection with the embodiment may be included, employed and/or incorporated in one, some or all of the embodiments of the present inventions. The usages or appearances of the phrase "in one embodiment" or "in another embodiment" (or the like) in the specification are not referring to the same embodiment, nor are separate or alternative embodiments necessarily mutually exclusive of one or more other embodiments, nor limited to a single exclusive embodiment. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, an embodiment or implementation described herein as "exemplary" is not to be construed as ideal, preferred or advantageous, for example, over other embodiments or implementations; rather, it is intended convey or indicate the embodiment or embodiments are example embodiment(s).

Although the present inventions have been described in certain specific aspects, many additional modifications and variations would be apparent to those skilled in the art. It is therefore to be understood that the present inventions may be practiced otherwise than specifically described without departing from the scope and spirit of the present inventions. Thus, embodiments of the present inventions should be considered in all respects as illustrative/exemplary and not restrictive.

The terms "comprises," "comprising," "includes," "including," "have," and "having" or any other variation thereof, are intended to cover a non-exclusive inclusion, such that a process, method, circuit, article, or apparatus that comprises a list of parts or elements does not include only those parts or elements but may include other parts or elements not expressly listed or inherent to such process, method, article, or apparatus. Further, use of the terms "connect", "connected", "connecting" or "connection" herein should be broadly interpreted to include direct or indirect (e.g., via one or more conductors and/or intermediate devices/elements (active or passive) and/or via inductive or capacitive coupling)) unless intended otherwise (e.g., use of the terms "directly connect" or "directly connected").

The terms "a" and "an" herein do not denote a limitation of quantity, but rather denote the presence of at least one of the referenced item. Further, the terms "first," "second," and the like, herein do not denote any order, quantity, or importance, but rather are used to distinguish one element/circuit/feature from another.

In addition, the term "integrated circuit" means, among other things, any integrated circuit including, for example, a generic or non-specific integrated circuit, processor, controller, state machine, gate array, SoC, PGA and/or FPGA. The term "integrated circuit" also means, for example, a processor, controller, state machine and SoC—including an embedded FPGA.

Further, the term "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

Notably, the term "MAC circuit" means a multiplier-accumulator circuit of the multiplier-accumulator circuitry of the multiplier-accumulator pipeline. For example, a multiplier-accumulator circuit is described and illustrated in the exemplary embodiment of FIGS. 1A-1C of U.S. patent application Ser. No. 16/545,345, and the text associated therewith. In the claims, the term "MAC circuit" means a multiply-accumulator circuit, for example, like that described and illustrated in the exemplary embodiment of FIGS. 1A-1C, and the text associated therewith, of U.S. patent application Ser. No. 16/545,345. Notably, however, the term "MAC circuit" is not limited to the particular circuit, logical, block, functional and/or physical diagrams, block/data width, data path width, bandwidths, and processes illustrated and/or described in accordance with, for example, the exemplary embodiment of FIGS. 1A-1C of U.S. patent application Ser. No. 16/545,345.

In the claims, "row" means row, column, and/or row and column. For example, in the claims, a "row of MAC circuits" means (i) a row of MAC circuits, (ii) a column of MAC circuits and/or (iii) a row of MAC circuits and a column of MAC circuits—all of which are intended to fall within the meaning of row of MAC circuits in connection with the scope of the claim. In the claims, "column" means column, row, and/or column and row. For example, in the claims, a "column of control/configure circuits" means (i) a column of control/configure circuits, (ii) a row of control/configure circuits and/or (iii) a column of control/configure circuits and a row of control/configure circuits—all of which are intended to fall within the meaning of column of control/configure circuits in connection with the scope of the claim.

What is claimed is:

1. An integrated circuit comprising:
a plurality of multiplier-accumulator circuits organized into a plurality of groups, wherein each group of multiplier-accumulator circuits includes a plurality of multiplier-accumulator circuits that is connected in series to perform a plurality of multiply and accumulate operations, wherein each multiplier-accumulator circuit of the plurality of multiplier-accumulator circuits of each group includes:
a multiplier to multiply data by a multiplier weight data and generate a product data, and
an accumulator, coupled to the multiplier of the associated multiplier-accumulator circuit, to add input data and the product data of the associated multiplier to generate sum data;
a plurality of control/configure circuits, wherein each control/configure circuit connects directly to and is associated with one of the groups of multiplier-accumulator circuits, wherein each control/configure circuit includes:
a plurality of data paths wherein each data path includes:
a first end that directly connects to an input of a first multiplier-accumulator circuit of the plurality of serially connected multiplier-accumulator circuits of the associated group of multiplier-accumulator circuits,
a second end that directly connects to an output of a last multiplier-accumulator circuit of the plurality of serially connected multiplier-accumulator circuits of the associated group of multiplier-accumulator circuits, wherein the first end of the data path couples to the second end of the data path through the plurality of serially connected multiplier-accumulator circuits of the associated group of the plurality of multiplier-accumulator circuits,
a third end that is configurable to connect to an end of a corresponding data path of a different one of the plurality of control/configure circuits, and
a fourth end;
wherein the plurality of data paths of each control/configure circuit includes:
a first data path to receive input data to be processed into each multiplier-accumulator circuit of the plurality of serially connected multiplier-accumulator circuits of each group of the plurality of multiplier-accumulator circuits at a start of an execution sequence.

2. The integrated circuit of claim 1 wherein:
the plurality of control/configure circuits includes a first control/configure circuit, a second control/configure circuit and a third control/configure circuit,
the third end of the first data path of the first control/configure circuit is configured to connect to the third end of the first data path of the second control/configure circuit, and
the fourth end of the first data path of the first control/configure circuit is coupled to a first memory which stores the input data.

3. The integrated circuit of claim 2 wherein:
the fourth end of the first data path of the second control/configure circuit is coupled to the third end of the first data path of the third control/configure circuits.

4. The integrated circuit of claim 2 wherein:
the plurality of data paths of each control/configure circuit further includes a second data path to output data from each multiplier-accumulator circuit of the plurality of serially connected multiplier-accumulator circuits of each group of the plurality of multiplier- accumulator circuits at an end of an execution sequence,
the third end of the second data path of the first control/configure circuit is configured to connect to the third end of the second data path of the second control/configure circuit,
the fourth end of the second data path of the second control/configure circuit is coupled to the third end of the second data path of the third control/configure circuit, and
wherein the integrated circuit further includes configurable processing circuitry, coupled to the fourth end of the second data path of the third control/configure circuit to: (i) receive the output data from each multiplier-accumulator circuit of the plurality of serially connected multiplier-accumulator circuits of each group of the plurality of multiplier-accumulator circuits and (ii) process the output data wherein the processed output data are stored in the second memory.

5. The integrated circuit of claim 4 wherein:
the configurable processing circuitry includes a plurality of configurable data paths and one or more circuits connected therein, wherein the one or more circuits process the output data via addition/subtraction with a register value, multiplication by a register value, conversion from integer data format to floating point data format, conversion from floating point data format to integer data format, adjustment in format precision, and/or monadic function(s) including: inverse, square root, inverse square root, hyperbolic tangent and/or sigmoid.

6. The integrated circuit of claim 1 wherein:
the plurality of data paths of each control/configure circuit further includes a third data path to rotate partial accumulation values to each multiplier-accumulator circuit of the plurality of serially connected multiplier-accumulator circuits of each group of the plurality of multiplier-accumulator circuits during an execution sequence.

7. An integrated circuit comprising:
a plurality of multiplier-accumulator circuits organized into a plurality of groups, wherein each group of multiplier-accumulator circuits includes a plurality of multiplier-accumulator circuits that is connected in series to perform a plurality of multiply and accumulate operations, wherein each multiplier-accumulator circuit of the plurality of multiplier-accumulator circuits of each group includes:
  a multiplier to multiply data by a multiplier weight data and generate a product data, and
  an accumulator, coupled to the multiplier of the associated multiplier-accumulator circuit, to add input data and the product data of the associated multiplier to generate sum data;
a plurality of control/configure circuits, wherein each control/configure circuit connects directly to and is associated with one of the groups of multiplier-accumulator circuits, wherein each control/configure circuit includes:
  a plurality of data paths wherein each data path includes:
    a first end that directly connects to an input of a first multiplier-accumulator circuit of the plurality of serially connected multiplier-accumulator circuits of the associated group of multiplier-accumulator circuits,
    a second end that directly connects to an output of a last multiplier-accumulator circuit of the plurality of serially connected multiplier-accumulator circuits of the associated group of multiplier-accumulator circuits, wherein the first end of the data path couples to the second end of the data path through the plurality of serially connected multiplier-accumulator circuits of the associated group of the plurality of multiplier-accumulator circuits,
    a third end that is configurable to connect to an end of a corresponding data path of a different one of the plurality of control/configure circuits, and
    a fourth end;
wherein the plurality of data paths of each control/configure circuit includes:
  a first data path to input accumulation values to and output accumulation values from each group of the plurality of multiplier-accumulator circuits during an execution sequence.

8. The integrated circuit of claim 7 wherein:
the first data path to input partial accumulation values to and output partial accumulation values from each group of the plurality of multiplier-accumulator circuits during an execution sequence.

9. The integrated circuit of claim 7 wherein:
the plurality of control/configure circuits includes a first control/configure circuit, a second control/configure circuit and a third control/configure circuit,
the third end of the first data path of the first control/configure circuit is configured to connect to the third end of the first data path of the second control/configure circuit,
the fourth end of the first data path of the second control/configure circuit is coupled to the third end of the first data path of the third control/configure circuit, and
the fourth end of the first data path of the third control/configure circuit is connected to the fourth end of the first data path of the first control/configure circuit.

10. The integrated circuit of claim 9 wherein:
the plurality of control/configure circuits are disposed in a row, and
the first control/configure circuit and the third control/configure circuit are located at first and second edges, respectively, of the plurality of control/configure circuits.

11. The integrated circuit of claim 9 wherein:
the plurality of data paths of each control/configure circuit further includes a second data path to output data from each multiplier-accumulator circuit of the plurality of serially connected multiplier-accumulator circuits of each group of the plurality of multiplier- accumulator circuits at an end of an execution sequence,
the third end of the second data path of the first control/configure circuit is configured to connect to the third end of the second data path of the second control/configure circuit, the fourth end of the second data path of the first control/configure circuit is coupled to a first memory which stores the output data, and the fourth end of the second data path of the second control/configure circuit is coupled to the third end of the second data path of the third control/configure circuit.

12. The integrated circuit of claim 11 wherein:
the fourth end of the second data path of the third control/configure circuit is coupled to the first memory which stores the output data.

13. The integrated circuit of claim 9 wherein:
the plurality of data paths of each control/configure circuit includes a second data path to input data from each multiplier-accumulator circuit of the plurality of serially connected multiplier-accumulator circuits of each group of the plurality of multiplier-accumulator circuits at an start of an execution sequence
the third end of the second data path of the first control/configure circuit is configured to connect to the third end of the second data path of the second control/configure circuit,
the fourth end of the second data path of the first control/configure circuit is coupled to a first memory which stores the input data, and
the fourth end of the second data path of the second control/configure circuit is coupled to the third end of the second data path of the third control/configure circuit.

14. The integrated circuit of claim 13 wherein:
the plurality of data paths of each control/configure circuit further includes a third data path to output data from each multiplier-accumulator circuit of the plurality of serially connected multiplier-accumulator circuits of each group of the plurality of multiplier-accumulator circuits at an end of an execution sequence,
the third end of the third data path of the first control/configure circuit is configured to connect to the third end of the third data path of the second control/configure circuit,
the fourth end of the third data path of the first control/configure circuit is coupled to a second memory which stores the output data, and
the fourth end of the third data path of the second control/configure circuit is coupled to the third end of the second data path of the third control/configure circuit.

15. The integrated circuit of claim 14 further including:
configurable processing circuitry, coupled to the fourth end of the third data path of the third control/configure circuit to: (i) receive the output data from each multiplier- accumulator circuit of the plurality of serially connected multiplier-accumulator circuits of each group of the plurality of multiplier-accumulator circuits and (ii) process the output data wherein the processed output data are stored in the second memory.

16. The integrated circuit of claim 15 wherein:
the configurable processing circuitry includes a plurality of configurable data path and one or more circuits connected therein, wherein the one or more circuits process the output data via addition/subtraction with a register value, multiplication by a register value, conversion from integer data format to floating point data format, conversion from floating point data format to integer data format, adjustment in format precision, and/or monadic function(s) including: inverse, square root, inverse square root, hyperbolic tangent and/or sigmoid.

17. An integrated circuit comprising:
a plurality of multiplier-accumulator circuits organized into a plurality of groups, wherein each group of multiplier-accumulator circuits includes a plurality of multiplier-accumulator circuits that is connected in series to perform a plurality of multiply and accumulate operations, wherein each multiplier-accumulator circuit of the plurality of multiplier-accumulator circuits of each group includes:
  a multiplier to multiply data by a multiplier weight data and generate a product data, and
  an accumulator, coupled to the multiplier of the associated multiplier-accumulator circuit, to add input data and the product data of the associated multiplier to generate sum data;
a plurality of control/configure circuits, wherein each control/configure circuit connects directly to and is associated with one of the groups of multiplier-accumulator circuits, wherein each control/configure circuit includes:
  a plurality of data paths wherein each data path includes:
    a first end that directly connects to an input of a first multiplier-accumulator circuit of the plurality of serially connected multiplier-accumulator circuits of the associated group of multiplier-accumulator circuits,
    a second end that directly connects to an output of a last multiplier-accumulator circuit of the plurality of serially connected multiplier-accumulator circuits of the associated group of multiplier-accumulator circuits, wherein the first end of the data path couples to the second end of the data path through the plurality of serially connected multiplier-accumulator circuits of the associated group of the plurality of multiplier-accumulator circuits,
    a third end that is configurable to connect to an end of a corresponding data path of a different one of the plurality of control/configure circuits, and
    a fourth end;
wherein the plurality of data paths of each control/configure circuit includes:
  a first data path to output data from each multiplier-accumulator circuit of the plurality of serially connected multiplier-accumulator circuits of each group of the plurality of multiplier-accumulator circuits.

18. The integrated circuit of claim 17 wherein:
the plurality of control/configure circuits includes a first control/configure circuit, a second control/configure circuit and a third control/configure circuit,
the third end of the first data path of the first control/configure circuit is configured to connect to the third end of the first data path of the second control/configure circuit,
the fourth end of the first data path of the first control/configure circuit is coupled to a memory which stores the output data, and
the fourth end of the first data path of the second control/configure circuit is coupled to the third end of the second data path of the third control/configure circuit.

19. The integrated circuit of claim 18 wherein:
the fourth end of the first data path of the third control/configure circuit is coupled to the memory which stores the output data at the end of the execution sequence.

20. The integrated circuit of claim 18 further including:
configurable processing circuitry, coupled between the fourth end of the first data path of the third control/ configure circuit and the memory, wherein the configurable processing circuitry is programmable to: (i) receive the output data from each multiplier-accumulator circuit of the plurality of serially connected multiplier-accumulator circuits of each group of the plurality of multiplier-accumulator circuits and (ii) post-process the output data and stores the post-processed output data in the memory.

21. The integrated circuit of claim 20 wherein:

the first data path receives data from memory, at the start of an execution sequence, to input into each multiplier-accumulator circuit of the plurality of serially connected multiplier-accumulator circuits of each group of the plurality of multiplier-accumulator circuits, and the fourth end of the first data path of the first control/configure circuit is coupled to the memory to receive the data from the memory at the start of an execution sequence.

22. The integrated circuit of claim 18 wherein:

the fourth end of the first data path of the third control/configure circuit is coupled to the memory, and the integrated circuit further includes:

configurable processing circuitry, coupled between the fourth end of the first data path of the third control/configure circuit and the memory, wherein the configurable processing circuitry includes at least one configurable data path and one or more circuits connected therein.

23. The integrated circuit of claim 22 wherein:

the at least one configurable data path includes at least one multiplexer, and the one or more circuits include one or more circuits to process the output data via addition/subtraction with a register value, multiplication by a register value, conversion from integer data format to floating point data format, conversion from floating point data format to integer data format, adjustment in format precision, and/or monadic function(s) including: inverse, square root, inverse square root, hyperbolic tangent and/or sigmoid.

* * * * *